(12) United States Patent
Sadananda

(10) Patent No.: US 7,283,741 B2
(45) Date of Patent: Oct. 16, 2007

(54) OPTICAL REROUTABLE REDUNDANCY SCHEME

(75) Inventor: Santosh Kumar Sadananda, Mountain View, CA (US)

(73) Assignee: Intellambda Systems, Inc., Fremont, CA (US)

( * ) Notice: Subject to any disclaimer, the term of this patent is extended or adjusted under 35 U.S.C. 154(b) by 0 days.

(21) Appl. No.: 10/862,142

(22) Filed: Jun. 3, 2004

(65) Prior Publication Data

US 2004/0258409 A1   Dec. 23, 2004

Related U.S. Application Data

(63) Continuation of application No. 10/754,931, filed on Jan. 9, 2004, which is a continuation-in-part of application No. 10/455,933, filed on Jun. 6, 2003.

(51) Int. Cl.
*H04J 14/00* (2006.01)

(52) U.S. Cl. ............................................. 398/5; 398/57

(58) Field of Classification Search .................... 398/1, 398/5, 7, 57
See application file for complete search history.

(56) References Cited

U.S. PATENT DOCUMENTS

| | | | |
|---|---|---|---|
| 5,351,146 A | 9/1994 | Chan et al. | |
| 5,781,537 A | 7/1998 | Ramaswami et al. | |
| 5,914,798 A | 6/1999 | Liu | |
| 6,069,894 A | 5/2000 | Holender, deceased et al. | |
| 6,111,673 A | 8/2000 | Chang et al. | |
| 6,304,349 B1 | 10/2001 | Alanyali et al. | |
| 6,445,844 B1 | 9/2002 | Neukermans et al. | |
| 6,738,354 B1 * | 5/2004 | Ashwood Smith | 370/248 |
| 7,013,084 B2 | 3/2006 | Battou et al. | |
| 7,171,124 B2 | 1/2007 | Smith et al. | |
| 2002/0018264 A1 | 2/2002 | Kodialam et al. | |
| 2002/0030864 A1 | 3/2002 | Chaudhuri et al. | |
| 2002/0097671 A1 | 7/2002 | Doverspike et al. | |
| 2002/0118647 A1 | 8/2002 | Maeno | |
| 2002/0120766 A1 | 8/2002 | Okajima et al. | |

(Continued)

FOREIGN PATENT DOCUMENTS

| | | |
|---|---|---|
| US | PCT/US04/17845 | 11/2004 |
| WO | PCT/US04/17735 | 11/2004 |

OTHER PUBLICATIONS

C. Assi et al., "A Hybrid Distributed Fault-Management Protocol for Combating Single-Fiber Failures in Mesh-based DWDM Optical Networks", Global Telecommunication Conference, Nov. 17-21, 2002.*

(Continued)

*Primary Examiner*—Shi K. Li
(74) *Attorney, Agent, or Firm*—Blakely, Sokoloff, Taylor & Zafman LLP

(57) ABSTRACT

A method and apparatus for an optical reroutable redundancy scheme. According to one embodiment of the invention, a wavelength division multiplexing optical network includes a number of nodes each having an optical cross connect and each having stored therein a database representing conversion free connectivity from that node to others of the nodes. In addition, each of the nodes employs a source based scheme with the database to provision optical circuits in real time and an optical reroutable redundancy scheme.

15 Claims, 29 Drawing Sheets

U.S. PATENT DOCUMENTS

| | | | |
|---|---|---|---|
| 2002/0126343 | A1 | 9/2002 | Fumagalli et al. |
| 2002/0154357 | A1 | 10/2002 | Ozveren et al. |
| 2002/0194339 | A1 | 12/2002 | Lin et al. |
| 2002/0196808 | A1 | 12/2002 | Karri et al. |
| 2003/0009582 | A1 | 1/2003 | Qiao et al. |
| 2003/0016414 | A1 | 1/2003 | Solheim et al. |
| 2003/0020982 | A1 | 1/2003 | Rychlicki et al. |
| 2003/0035166 | A1 | 2/2003 | Zhang et al. |
| 2003/0065811 | A1* | 4/2003 | Lin et al. ............ 709/232 |
| 2003/0074443 | A1 | 4/2003 | Melaku et al. |
| 2003/0090995 | A1 | 5/2003 | Illikkal et al. |
| 2003/0172356 | A1 | 9/2003 | Pulkkinen et al. |
| 2003/0198227 | A1 | 10/2003 | Matsuura et al. |
| 2004/0228323 | A1 | 11/2004 | Acharya et al. |

OTHER PUBLICATIONS

C. Assi et al., "Efficient Path Selection and Fast Restoration Algorithms for Shared Restorable Optical Networks", International Conference on Communications, ICC '03, May 11-15, 2003.*

S. Sengupta et al., "From Network Design to Dynamic Provisioning and Restoration in Optical Cross-Connect Mesh Networks: An Architectural and Algorithmic Overview", IEEE Network, Jul./Aug. 2001.*

"Graph Theory with Applications to Engineering and Computer Science" by Narsingh Deo, Prentice-Hall, 1974, pp. 20-21.*

G. Papadimitriou et al., "Optical Switching: Switch Fabrics, Techniques, and Architectures", Journal of Lightwave Technology, vol. 21, No. 2, Feb. 2003.*

J. Lang et al., "Link Management Protocol (LMP)", National Fiber Optical Engineers Conference (NFOEC) 2000.*

A. Shami et al., "Performance Evaluation of Two GMPLS-Based Distributed Control and Management Protocols for Dynamic Lightpath Provisioning in Future IP Networks", IEEE, 2002.*

"Telecommunication System Engineering" by R. Freeman, John Wiley & Sons, 1980, pp. 99-103.*

P. Ho et al., "A Novel Distributed Control Protocol in Dynamic Wavelength-Routed Optical Networks", IEEE Communications Magazine, Nov. 2002.*

P. Ho et al., "A Framework for Service-Guaranteed Shared Protection in WDM Mesh Networks", IEEE Communications Magazine, Feb. 2002.*

Capacity Performance of Dynamic Provisioning in Optical Networks (2001) Ramu Ramamurthy (pp. 40-48).

Dynamic Lightpath Establishment in Wavelength-Routed WDM Networks (2001) Hui Zang, Jason P. Jue (pp. 100-108).

Capacity Efficient Distributed Routing of Mesh-Restored Lightpaths in Optical Networks (2001) Sudipta Sengupta, Ramu Ramamurthy (5 pgs).

Inference of Shared Risk Link Groups, Internet Working Group, Internet Draft, Document: draft-many-inference-srig-01.txt, Category: Internet Draft, Expires: Jan. 2002; D. Papadimitriou, F. Poppe, J. Jones, S. Venkatachalam Alcatel, S. Dharanikota, R. Jain, Nayna Networks, R. Hartani, Caspian Networks, D. Griffith, NIST, Yong Xue, UUNet, Jul. 2001 (32 pages).

Inter-domain routing with Shared Risk Groups, draft-many-ccamp-srg-01.txt, CCAMP Working Group, Internet Draft, Document: draft-many-ccamp-srg-00.txt, Category: Internet Draft, Expires: Jun. 2002; S. Dharanikota, R. Jain (Nayna), D. Papadimitriou (Alcatel), R. Hartani (Cespian Networks), G. Bernstein (Ciena), V. Sharma (Metanoia), C. Brownmiller, Y. Xue (Worldcom), Dec. 2001 (32 pages).

Cisco MPLS Tunnel Builder Pro, Cisco Systems, Inc., 1992-2002 (10 pages).

International Telecommunication Union, ITU-T G.7715/Y.1706 (Jun. 2002), Series G: Transmission Systems and Media, Digital Systems and Networks, Digital terminal equipments—Operations, administration and maintenance features of transmission equipment, Series Y: Global Information Infrastructure and Internet Protocol Aspects, Internet protocol aspects—Operation, administration and maintenance, Architecture and requirements for routing in the automatically switched optical networks, ITU-T Recommendation G7715/Y.1706 (35 pages).

Effectiveness of Shared Risk Link Group Auto-Discovery in Optical Networks, Panagiotis Sebos, Jennifer Yates, Dan Rubenstein and Albert Greenberg 2000 (3 pages).

Survivable Networks Algorithms for Diverse Routing by Ramesh Bhandari, Ph.D, AT&T Laboratories, New Jersey, Kluwer Academic Publishers, Boston/Dordrecht/London 1999.

Standards Report, Standards Update: Routing for Optical Networks, Greg Bernstein, Grotto Networking, and Lyndon Ong, Ciena Corp., IEEE Optical Communications, Aug. 2003 (p. S4 and S6).

Calculation of Node disjoint path in Networks (5 pages).

Rajiv Ramaswami et al., "Optical Networks, A Practical Perspective" Second Edition, Morgan Kaufmann Publishers, ISBN 1-55860-655-6, San Francisco, CA, USA. (831 pages).

Optical Networking and Real-Time Provisioning: An Integrated Vision for the Next-Generation Internet; Chadi Assi, Abdallah Shami, and Mohamed Al. Ali, dated Jul./Aug. 2001 (pp. 36-45).

Yuji Imai, et al., "XCAST6: eXplicit Multicast on Ipv6", 2003 Symposium on Applications and the Internet Workshops, Jan. 27-31, 2003, pp. 238-243.

Jukan et al. (A. Jukan et al.), "Constraint-based Path Selection Methods for On-demand Provisioning in WDM Networks," IEEE INFOCOM 2002.

N. Golmie et al., "A Differentiated Optical Services Model for WDM Networks," IEEE Communications Magazine, Feb. 2000.

Date, "An Introduction to Database Systems" by C. Date, Addision-Wesley, 1986, pp. 5-9, 29-41.

S. Sengupta et al., "Analysis of Enhanced OSPF for Routing Lightpaths in Optical Mesh Networks," IEEE 2002.

Moy, RFC-2328, "OSPF Version 2," IETF, Apr. 1998.

"Graph Theory with Applications to Engineering and Computer Science" by N. Deo, Prentice-Hall, 1974.

Jukan et al., Service-Specific Wavelength Allocation in QoS-Routed Optical Networks. IEEE 1998, pp. 2272.

Braden et al., RFC-2205. Resource Reservation Protocol (RSVP)—Version 1 Functional Specification. IETF, Sep. 1997, pp. 34-35.

Francisco et al., End-to-End Signaling and Routing for Optical IP Networks. IEEE 2002, Fig. 5.

Postel, RFC-791, Internet Protocol, IETF Sep. 1981, pp. 16.

A. Shami et al., "Performance Evaluation of Two GMPLS-Based Distributed Control and Management Protocols for Dynamic Lightpath Provisioning in Future IP Networks," ICC 2002, Apr. 28-May 2, 2002.

P.Ho, et al., A Novel Distributed Control Protocol in Dynamic Wavelength-Routed Optical Networks;, IEEE Communications Magazine, Nov. 2002.

A. Sichani, et al., "A Novel Distributed Progressive Reservation Protocol for WDM All-Optical Networks", IEEE International Conference on Communication, ICC'03, May 11-14, 2003.

K. Teng, et al., "Limited Scope Probing: A Distributed Approach for QoS-Based Routing", IEEE 2001.

P. Ho, et al., "A Framework for Service-Guaranteed Shared Protection in WDM Mesh Networks", IEEE Communications Magazine, Feb. 2002, pp. 97-103.

Fawaz, et al., Management of Optical Networks, "Service Level Agreement and Provisional in Optical Networks", IEEE Communications Magazine, pp. 36-43.

Xiao, et al., "Designand Analysis of Improved Shortest Path Tree Update for Network Routing", NSF EIA-0103709, Texas ARP 009741-0028-2001, USA pp. 6.

http://tisure.netw/cs311/all-00/noes/graphs.html, notes for CS-311, Data Structures, Fall 2000.

Xiao, et al., "Reducing Routing Table Computation Cost in OSPF", printed on Jun. 7, 2005, pp. 1-11.

Y. Imai, "XCAST: eXplicit Multicast on IPv6", 2003 Symposium on Applications and tht Internet Workshops, pp. 27-31, Jan. 20003.

Jukan et al. (A. Jukan et al.), "Constraint-based Path Selection Methods for On-demand Provisioning in WDM Networks," IEEE INFOCOM 2002.

N. Golmie et al., "A Differentiated Optical Services Model for WDM Networks," IEEE Communications Magazine, Feb. 2000.

Date, "An Introduction to Database Systems" by C. Date, Addision-Wesley, 1986, pp. 5-9, 29-41.

S. Sengupta et al., "Analysis of Enhanced OSPF for Routing Lightpaths in Optical Mesh Networks," IEEE 2002.

Moy, RFC-2328, "OSPF Version 2," IEFT, Apr. 1998.

"Telecommunication System Engineering" by R. Freeman, John Wiley & Sons, 1980, pp. 99-103.

"Graph Theory with Applications to Engineering and Computer Science" by N. Deo, Prentice-Hall, 1974.

Jukan et al., Service-Specific Wavelength Allocation in QoS-Routed Optical Networks. IEEE 1998, p. 2272.

Braden et al., RFC-2205. Resource Reservation Protocol (RSVP) - Version 1 Functional Specification. IETF, 9/1997, pp. 34-35.

Francisco et al., End-to-End Signaling and Routing for Optical IP Networks. IEEE 2002, Fig. 5.

Postel, RFC-791, Internet Protocol, IETF Sep. 1981, p.16.

A. Shami et al., "Performance Evaluation of Two GMPLS-Based Distributed Control and Management Protocols for Dynamic Lightpath Provisioning in Future IP Networks," ICC 2002, Apr. 28-May 2, 2002.

* cited by examiner

FIG 4A

| PATH(S) | PATH CHANNEL SET |
|---|---|
| N1:P1:P3:N2 | λ1 |
| N1:P2:P3:N3:P1:P2:N4:P3:P1:N2 | λ1 |
| N1:P3:P2:N3:P1:P2:N4:P3:P1:N2 | λ1 |

FIG 4B

| PATH(S) | PATH CHANNEL SET |
|---|---|
| N1:P2:P3:N3 | λ1,2 |
| N1:P3:P2:N3 | λ1,2 |
| N1:P3:N2:P1:P3:N4:P2:P1:N3 | λ1 |

FIG 4C

| PATH(S) | PATH CHANNEL SET |
|---|---|
| N1:P1:P3:N2:P1:P3:N4 | λ1 |
| N1:P2:P3:N3:P1:P2:N4 | λ1,2 |
| N1:P3:P2:N3:P1:P2:N4 | λ1,2 |

FIG 4D

| PATH(S) | PATH CHANNEL SET |
|---|---|
| N1:P1:P3:N2:P1:P3:N4:P1:P3:N5 | λ1 |
| N1:P2:P3:N3:P1:P2:N4:P1:P3:N5 | λ1 |
| N1:P3:P2:N3:P1:P2:N4:P1:P3:N5 | λ1 |

N2

N3

N4

N5

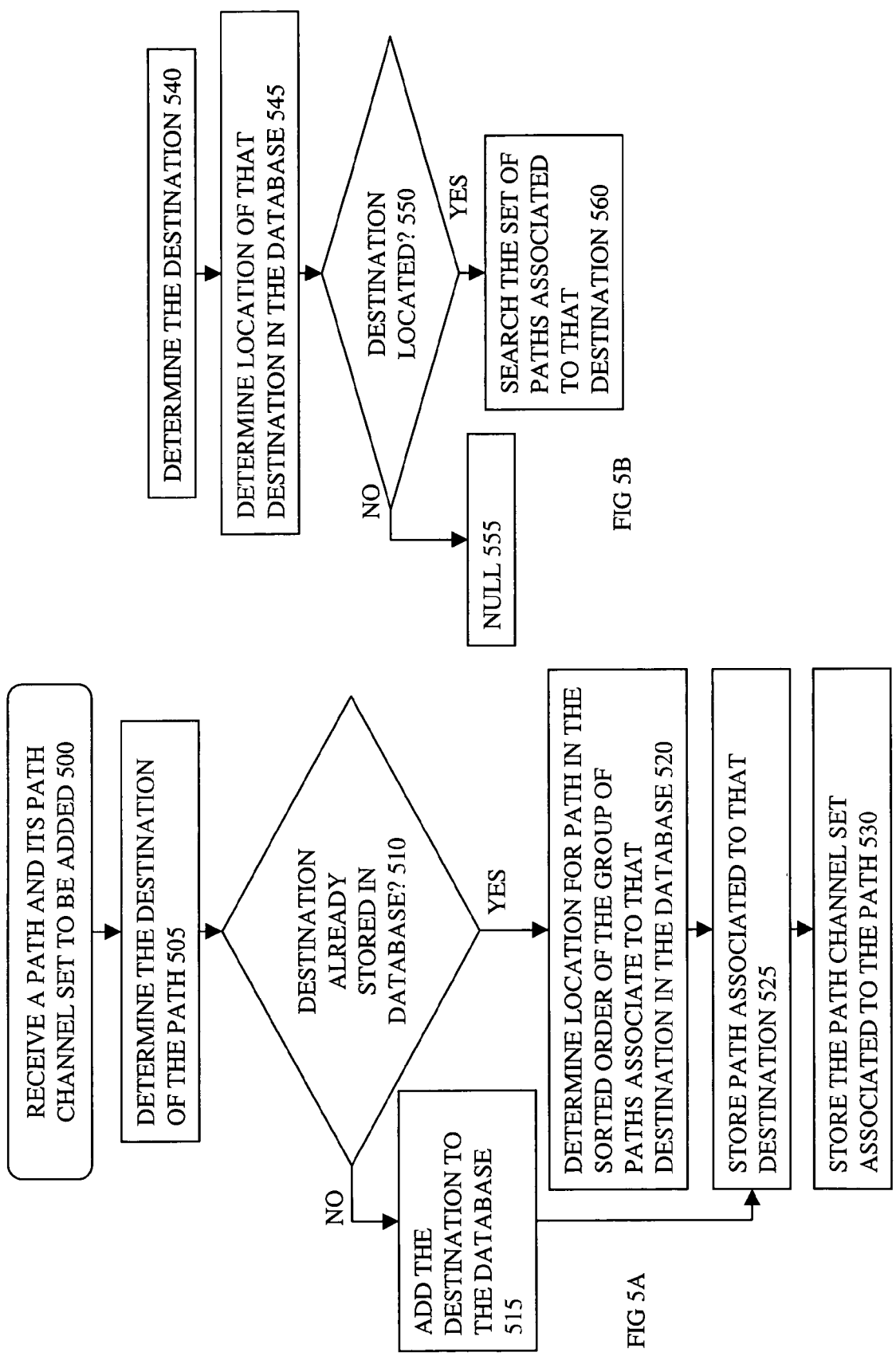

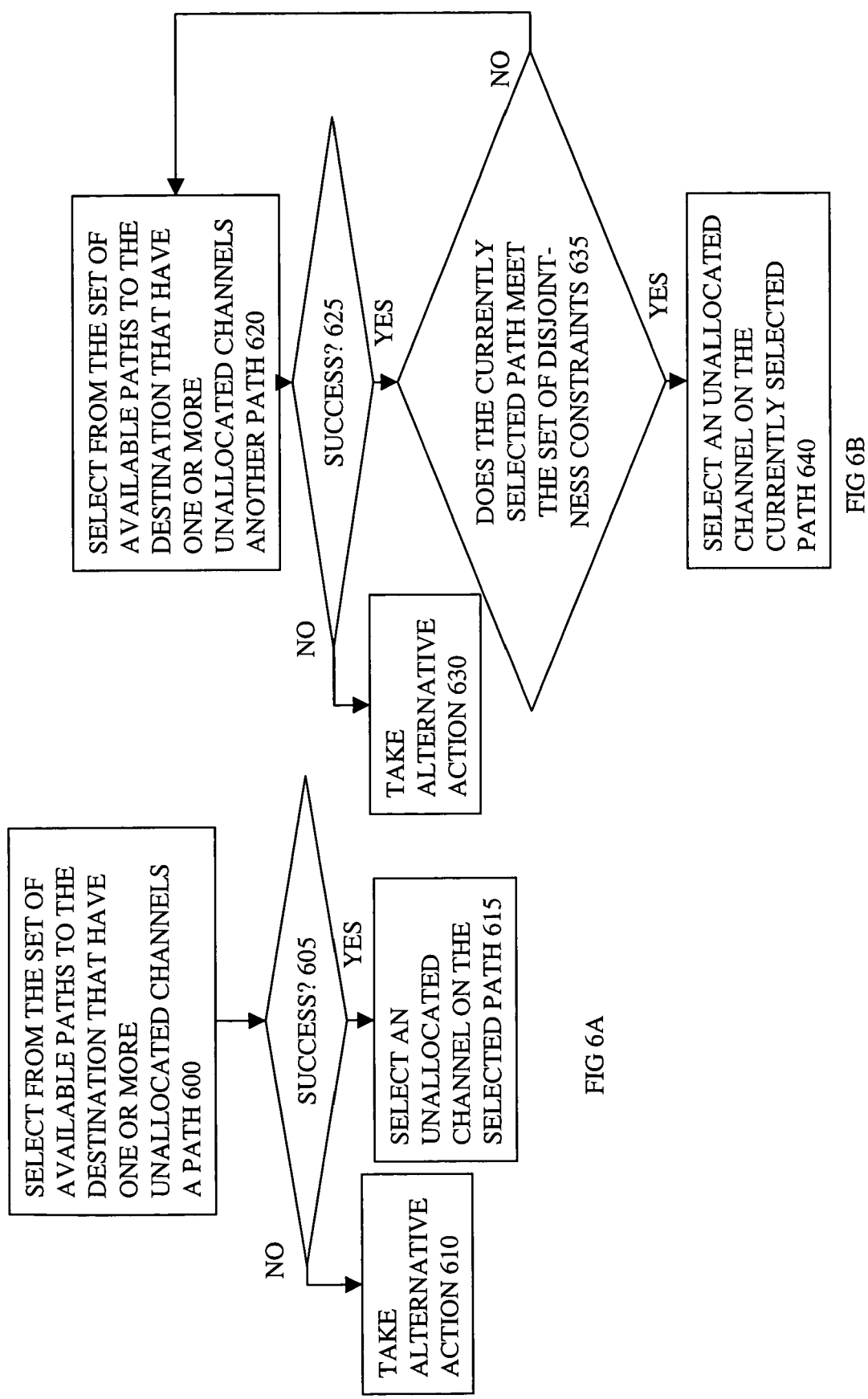

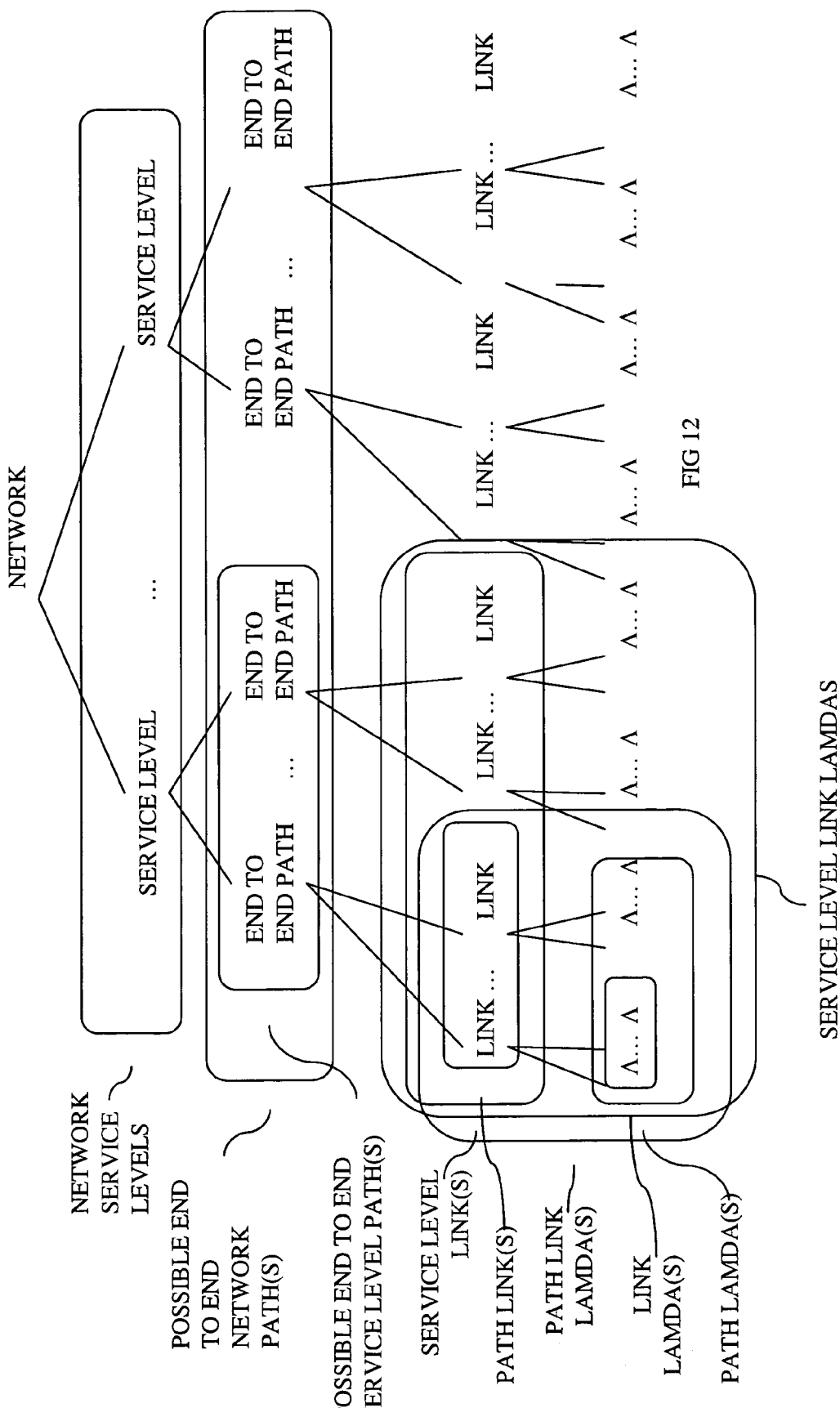

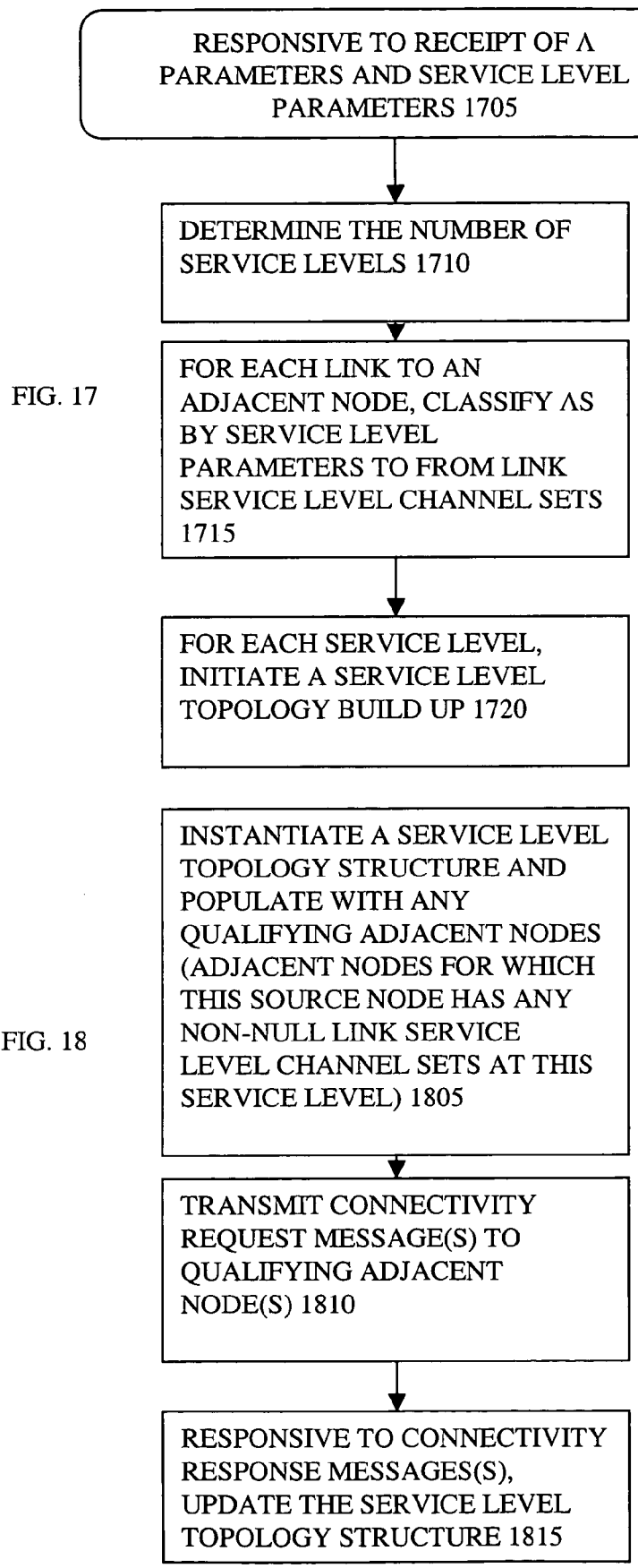

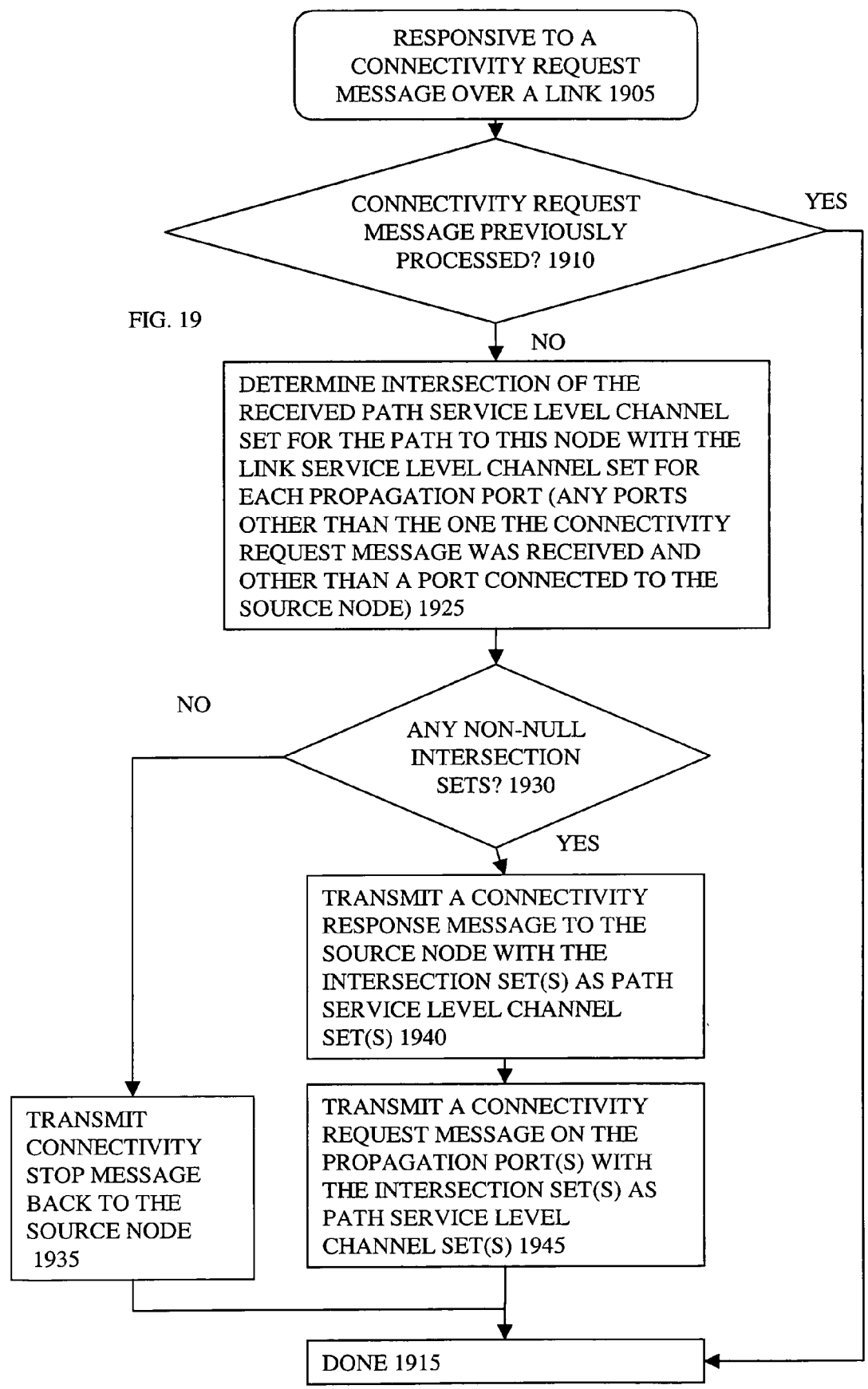

FIG. 25

RESPONSIVE TO A CHANNEL BEING ADDED OR A CHANNEL WITHOUT LIVE TRAFFIC BEING REMOVED 2505

↓

DETERMINE SERVICE LEVEL OF THE CHANNEL 2510

↓

TRANSMIT CONNECTIVITY REQUEST MESSAGE ON THE LINK WITH THE CHANNEL 2515

↓

RESPONSIVE TO CONNECTIVITY RESPONSE MESSAGES(S), UPDATE THE SERVICE LEVEL TOPOLOGY STRUCTURE 2520

↓

TRANSMIT AN UPDATE ADD/REMOVE CHANNEL MESSAGE TO THE NODES IN THE SERVICE LEVEL TOPOLOGY STRUCTURE THAT ARE NOT ON THE LINK WITH THE CHANNEL 2525

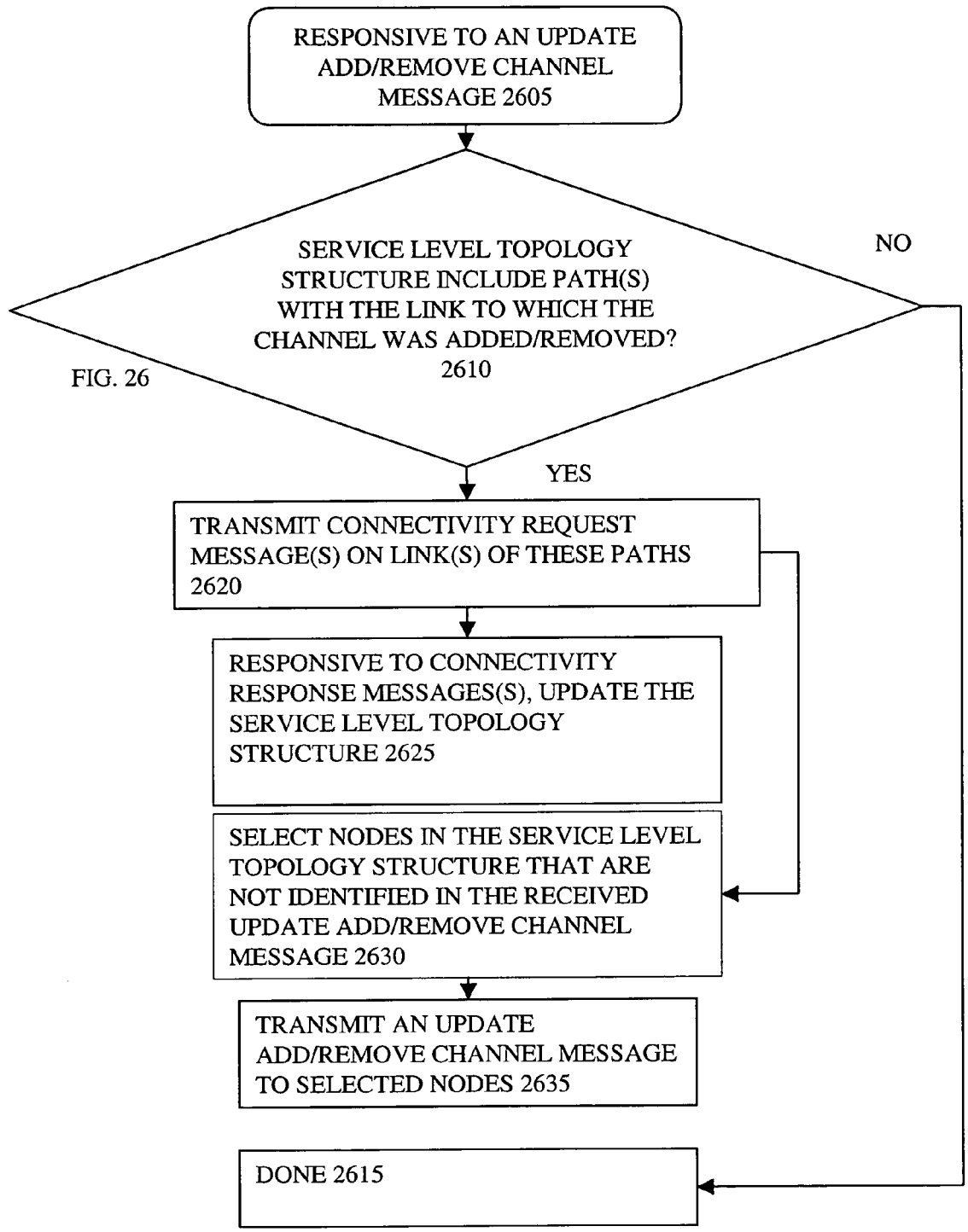

FIG. 33

```
RESPONSIVE TO A NODE ADDITION MESSAGE
3305
        ↓
TRANSMIT CONNECTIVITY
REQUEST MESSAGE(S) TO
QUALIFYING ADJACENT
NODE(S) 3310
        ↓
INSTANTIATE A NEW SERVICE
LEVEL TOPOLOGY STRUCTURE
AND UPDATE IT RESPONSIVE
RECEIVED CONNECTIVITY
RESPONSE MESSAGES 3315
        ↓
SELECT NODES IN THE SERVICE LEVEL
TOPOLOGY STRUCTURE THAT ARE
NOT IDENTIFIED IN THE RECEIVED
NODE ADDITION MESSAGE 3320
        ↓
TRANSMIT A NODE ADDITION
MESSAGE TO SELECTED NODES
2525
```

OPTICAL REROUTABLE REDUNDANCY SCHEME

CROSS-REFERENCE TO RELATED APPLICATIONS

This is a continuation of application Ser. No. 10/754,931, filed Jan. 9, 2004, which is a continuation-in-part of application Ser. No. 10/455,933, filed Jun. 6, 2003, which are hereby incorporated by reference.

BACKGROUND

1. Field

Embodiments of the invention relate to the field of networking; and more specifically, to optical networks.

2. Background

Generalized Multiprotocol Label Switching (GMPLS) [RFC3471] extends the Multiprotocol Label Switching (MPLS) architecture [RFC3031] to encompass time-division (e.g., Synchronous Optical Network and Synchronous Digital Hierarchy, SONET/SDH), wavelength (optical lambdas) and spatial switching (e.g., incoming port or fiber to outgoing port or fiber).

GMPLS extends MPLS to include network devices whose forwarding plane recognizes neither packet, nor cell boundaries, and therefore, can't forward data based on the information carried in either packet or cell headers. Specifically, such network devices include devices where the forwarding decision is based on time slots (TDM), wavelengths (lambda), or physical (fiber) ports. GMPLS supports unidirectional label switched paths (LSPs) and bi-directional LSPs (For bi-directional LSPs, the term "initiator" is used to refer to a node that starts the establishment of an LSP and the term "terminator" is used to refer to the node that is the target of the LSP; Note that for bi-directional LSPs, there is only one "initiator" and one "terminator") and a special case of Lambda switching, called Waveband switching (A waveband represents a set of contiguous wavelengths which can be switched together to a new waveband; The Waveband Label is defined to support this special case; Waveband switching naturally introduces another level of label hierarchy; As far as the MPLS protocols are concerned there is little difference between a waveband label and a wavelength label.).

To deal with the widening scope of MPLS into the optical and time domain, there are several new forms of "label." These new forms of label are collectively referred to as a "generalized label." A generalized label contains enough information to allow the receiving node to program its cross connect, regardless of the type of this cross connect, such that the ingress segments of the path are properly joined. The Generalized Label extends the traditional label by allowing the representation of not only labels which travel in-band with associated data packets, but also labels which identify time-slots, wavelengths, or space division multiplexed positions. For example, the Generalized Label may carry a label that represents (a) a single fiber in a bundle, (b) a single waveband within fiber, (c) a single wavelength within a waveband (or fiber), or (d) a set of time-slots within a wavelength (or fiber). It may also carry a label that represents a generic MPLS label, a Frame Relay label, or an ATM label (VCI/VPI).

Thus, GMPLS forms label switched paths (LSPs) through the network. These paths may be connection oriented or connectionless. For instance, the Resource Reservation Protocol (RSVP) is often used to deploy connection oriented LSPs, whereas a label management protocol (LMP), such as the label distribution protocol (LDP), is often used to provision connectionless LSPs.

Optical Networks

An optical network is a collection of optical network devices interconnected by links made up of optical fibers. Thus, an optical network is a network in which the physical layer technology is fiber-optic cable. Cable trunks are interconnected with optical cross-connects (OXCs), and signals are added and dropped at optical add/drop multiplexers (OADMs). The optical network devices that allow traffic to enter and/or exit the optical network are referred to as access nodes; in contrast, any optical network devices that do not are referred to as pass-thru nodes (an optical network need not have any pass-thru nodes). Each optical link interconnects two optical network devices and typically includes an optical fiber to carry traffic in both directions. There may be multiple optical links between two optical network devices.

A given fiber can carry multiple communication channels simultaneously through a technique called wavelength division multiplexing (WDM), which is a form of frequency division multiplexing (FDM). When implementing WDM, each of multiple carrier wavelengths (or, equivalently, frequencies or colors) is used to provide a communication channel. Thus, a single fiber looks like multiple virtual fibers, with each virtual fiber carrying a different data stream. Each of these data streams may be a single data stream, or may be a time division multiplex (TDM) data stream. Each of the wavelengths used for these channels is often referred to as a lamda.

A lightpath is a one-way path in an optical network for which the lamda does not change. For a given lightpath, the optical nodes at which its path begins and ends are respectively called the source node and the destination node; the nodes (if any) on the lightpath in-between the source and destination nodes are called intermediate nodes. An optical circuit is a bi-directional, end to end (between the access nodes providing the ingress to and egress from the optical network for the traffic carried by that optical circuit) path through the optical network. Each of the two directions of an optical circuit is made up of one or more lightpaths. Specifically, when a given direction of the end to end path of an optical circuit will use a single wavelength, then a single end to end lightpath is provisioned for that direction (the source and destination nodes of that lightpath are access nodes of the optical network and are the same as the end nodes of the optical circuit). However, in the case where a single wavelength for a given direction will not be used, wavelength conversion is necessary and two or more lightpaths are provisioned for that direction of the end to end path of the optical circuit. Thus, a lightpath comprises a lamda and a path (the series of optical nodes (and, of course, the interconnecting links) through which traffic is carried with that lambda).

Put another way, when using GMPLS on an optical network, the optical network can be thought of as circuit switched, where LSPs are the circuits. Each of these LSPs (uni-directional or bi-directional) forms an end to end path where the generalized label(s) are the wavelength(s) of the lightpath(s) used. When wavelength conversion is not used for a given bi-directional LSP, there will be a single end to end lightpath in each direction (and thus, a single wavelength; and thus, a single generalized label).

The term disjoint path is used to describe a relationship between a given path and certain other network resources (e.g., nodes, links, etc.). There are various levels of disjointness (e.g., maximally link disjoint, fully link disjoint, maximally node disjoint, and fully node disjoint; and each can additionally be shared risk group (SRG) disjoint). For instance, a first and second path are disjoint if the network resources they use meet the required level of disjointness.

Disjoint paths are formed for a variety of reasons, including to form restricted paths and protection paths. Restricted paths are formed to carry traffic that is not to travel through certain network resources for security reasons. Protection paths are used to provide redundancy; that is, they are used as alternate paths to working paths in case of a network failure of some kind. Protection paths are commonly implemented as either: 1) 1+1 protected; 2) 1:1 protected; or 3) 1:N mesh restored. A 1+1 or 1:1 protected path is a disjoint path from node A to node B in the network where one of the paths is a working path, and the other is a protection path. The working path and the protection path are typically established at the same time. In the case of a 1+1 protected path, the same traffic is carried on both paths, and the receiving node selects the best of the paths (i.e., if the one currently selected by the receiving node degrades or fails, that node will switch to the other). In contrast, in the case of a 1:1 protected path, traffic is transmitted on the working path; when a failure occurs on the working path, traffic is switched to the protection path. A mesh restored path from node A to node B is a pair of shared resource group disjoint paths in the network, where one of the routes is a working path and the other is a backup path. The capacity dedicated on the backup path can be shared with backup paths of other mesh-restored lightpaths.

An optical network device can be thought of comprising 2 planes: a data plane and a control plane. The data plane includes those components through which the light travels (e.g., the switch fabric or optical crossconnect; the input and output ports; amplifiers; buffers; wavelength splitters or optical line terminals; adjustable amplifiers; etc.), add/drop components (e.g., transponder banks or optical add/drop multiplexers, etc.), and components that monitor the light. The control plane includes those components that control the components of the data plane. For instance, the control plane is often made up software executing on a set of one or more microprocessors inside the optical network device which control the components of the data plane. To provide a specific example, the software executing on the microprocessor(s) may determine that a change in the switch fabric is necessary, and then instruct the data plane to cause that switch to occur. It should also be noted that the control plane of an optical network device is in communication with a centralized network management server and/or the control planes of one or more other network devices.

A number of different network topologies have been developed for optical network devices, including ring and meshed based topologies. Similarly, a number of different control planes and data planes have been developed for optical network devices. For instance, wavelength division multiplexing (WDM) necessitated an alteration of the data plane and the control plane. As another example, various different techniques have been used for implementing the switch fabric, including optical cross connects such as MEMS, acousto optics, thermo optics, holographic, and optical phased array.

There are generally three approaches to operating an optical network: 1) centralized static provisioning; 2) source based static provisioning; and 3) hybrid static provisioning. In centralized static provisioning, a separate centralized network management server communicates with each of the optical network devices of a network and maintains a network topology database. In response to some predefined demands for an optical circuit, the network management server finds the shortest path/wavelength. The network management server then causes the allocation of the path/wavelength and the configuring of the switch fabrics.

In source based static provisioning, each of the access nodes of the network performs the work of building/maintaining a network topology database (e.g., using OSPT-TE). In response to some predefined demands for an optical circuit received by an access node, that node: 1) buffers the traffic as necessary; 2) finds the shortest path/wavelength; and 3) causes the allocation of the path/wavelength and the configuring of the switch fabrics.

In hybrid static provisioning, each of the nodes of the network use OSPF-TE to build network topology databases, and from there a network topology database is built and maintained in a centralized network management server. The network management server initiates a form of source based provisioning. This allows a network administrator to maintain control over provisioning of each lightpath.

Regardless of the approach used, operating an optical network typically requires: A) building and maintaining network databases; and B) establishing lightpaths. For example, the network databases can include: 1) link state databases that track information (e.g., the link(s), lamda(s), lamda bandwidths, etc.) regarding adjacent optical nodes (e.g., using a link management protocol (LMP)); and 2) topology databases that track information (e.g., nodes, links, lamdas, etc.) for the physical connectivity of the nodes in a domain and/or the entire network (e.g., using OSPF-TE). In order to establish an LSP, the following operations are typically performed offline: 1) determining a shortest path/wavelength between the source and destination; and 2) allocate that path/wavelength (often referred to as signaling the path; effectively telling the involved optical network devices how to configure their switch fabrics; e.g., using RSVP or CR-LDP based signaling with GMPLS). Steps 1 and 2 can be reversed.

Generally, OSPF-TE operates by performing periodic operations to maintain a routing table that includes the next hop for each destination. Within each period: every node in the network is discovered with the help of the "Hello Protocol;" every node in the network floods its link state information in the network; every node processes this information and builds a network map (this network map is built later on spread around to decrease processing); each node brings down these network maps to graph structures (adding redundant/dummy nodes to cover multiple channels on an optical link - thus, the graph separately represents the path/wavelength combinations on a given physical link as separate links); each node uses its graph structures as an input to a shortest path first algorithm (e.g., Dijkstra's algorithm, BFS algorithm, etc.) to from a shortest path first tree (which is actually a shortest path/wavelength combination first tree) that stores the shortest path/wavelength combination to each destination; and each node uses its shortest path first tree to update its maintained routing table. In addition, the graph structures may also be used as an input to a disjoint shortest path first algorithm (e.g., Vertex splitting Method1 algorithm, vertex splitting Method2 algorithm, Surballes Algorithm (for calculation of edge disjoint paths), etc.) that relies on applying a shortest path first algorithm to the graph structure. (see Bhandari, Ramesh. *Survivable Networks Algorithms for Diverse Routing*, Kluwer Academic Publishers (1999). The results of such a disjoint shortest path first algorithm are used to install an alternative next hop for a destination in the routing table.

Ultimately, the routing table is maintained period to period and stores basically the next hop for each possible destination (it does not store the path/wavelength combinations).

One problem with the above approach is the relatively high computational intensity; especially in WDM optical networks. For example, a typical optical network having 10 nodes, each with 8 optical fibers capable of carrying 40 channels going out, results in 320 channels per node. In addition, as indicated above, the redundant/dummy nodes are added to represent multiple channels on each physical link, so each channel is associated with a separate node data structure so that it is represented as a separate link (that is, every path/wavelength combination on a physical link is represented in the graph as if it were a separate physical link). As such, the graph structure stores every node with degree 320 to represent a network having 3200 links. OSPF provides little information other than link state information, from which each node must generate their graph structures. Each of these relatively large graph structures are then operated on: 1) by a shortest path first algorithm to select path/wavelength combinations from the resulting shortest path/wavelength combination first tree; and/or 2) by a disjoint shortest path first algorithm to select path/wavelength combinations from the result. In addition, OSPF requires periodic spreading of link state information irrespective of network changes.

Another problem with existing optical networks is the network topology databases used and the manner in which they are built and maintained. Specifically, these monolithic physical topology databases (e.g., built with OSPF-TE) are very large because they must store all of the data to give a physical view of the network (not only connectivity at the link level, but connectivity at the lamda level because there are multiple lamdas per link and because different lamdas on a given link may provide different bandwidths; etc.). These large network databases are relatively time consuming to parse and require a relatively long time and a relatively large amount of node intercommunication to propagate changes. In addition, such network topology databases would become even larger if QoS type information needed to be recorded.

BRIEF SUMMARY

A method and apparatus for an optical reroutable redundancy scheme is described. According to one embodiment of the invention, a wavelength division multiplexing optical network includes a number of nodes each having an optical cross connect and each having stored therein a database representing conversion free connectivity from that node to others of the nodes. In addition, each of the nodes employs a source based scheme with the database to provision optical circuits in real time and an optical reroutable redundancy scheme.

BRIEF DESCRIPTION OF THE DRAWINGS

The invention may best be understood by referring to the following description and accompanying drawings that are used to illustrate embodiments of the invention. In the drawings:

FIG. 4A illustrates the paths in FIG. 2 from N1 to N2, as well as the path channel set for each path, according to one embodiment of the invention.

FIG. 4B illustrates the paths in FIG. 2 from N1 to N3, as well as the path channel set for each path, according to one embodiment of the invention.

FIG. 4C illustrates the paths in FIG. 2 from N1 to N4, as well as the path channel set for each path, according to one embodiment of the invention.

FIG. 4D illustrates the paths in FIG. 2 from N1 to N5, as well as the path channel set for each path, according to one embodiment of the invention.

FIG. 5A is a flow diagram for adding a path to the database according to one embodiment of the invention.

FIG. 5B is a flow diagram for walking the database according to one embodiment of the invention.

FIG. 6A is a flow diagram for selecting a regular path according to one embodiment of the invention.

FIG. 6B is a flow diagram for selecting a disjoint path according to one embodiment of the invention.

FIG. 12 is a block diagram illustrating a hierarchy of terms according to certain embodiments of the invention.

FIG. 17 is a flow diagram performed by each access node when joining an optical network according to embodiments of the invention.

FIG. 18 is a flow diagram illustrating a service level topology build-up for a single service level according to embodiments of the invention.

FIG. 19 is a flow diagram illustrating operations performed by nodes responsive to a connectivity request message received over a link according to certain embodiments of the invention.

FIG. 25 is a flow diagram illustrating the operations performed by the access nodes connected by the link on which the channel is added/removed according to certain embodiments of the invention.

FIG. 26 is a flow diagram illustrating the operations performed by an access node responsive to receiving an update add/remove channel message according to certain embodiments of the invention.

FIG. 33 is a flow diagram illustrating the operations performed by an access node responsive to receiving a node addition message according to certain embodiments of the invention.

DETAILED DESCRIPTION

Figure 1A:
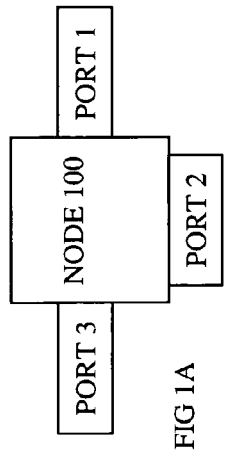
FIG. 1A is a block diagram of a node of an optical network according to one embodiment of the invention.

In the following description, numerous specific details are set forth (e.g., such as logic resource partitioning/sharing/duplication implementations, types and interrelationships of system components, and logic partitioning/integration choices). However, it is understood that embodiments of the invention may be practiced without these specific details. In other instances, well-known circuits, software instruction sequences, structures and techniques have not been shown in detail in order not to obscure the understanding of this description.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct contact with each other (e.g., physically, electrically, optically, etc.). "Coupled" may mean that two or more elements are in direct contact (physically, electrically, optically, etc.). However, "coupled" may also mean that two or more elements are not in direct contact with each other, but yet still co-operate or interact with each other.

Overview

According to one aspect of the invention, a database is built and maintained that stores available paths from a source node to reachable destinations nodes in a network in which the links between nodes can carry multiple channels. Each of the available paths being a series of nodes and interconnecting links from the source node to one of the reachable destination nodes. In certain embodiments of the invention, the paths are stored in said database grouped by common destination nodes, there is a cost stored with each of the paths, and/or the paths are sorted. For example, in one embodiment of the invention, there is a cost stored with each of the paths, the paths are grouped by common destination node, and the paths in a group are sorted at least in part by their cost. In addition, each of the available paths has associated to it in the database a set of one or more of the channels on the interconnecting links available to form path/channel combinations (in a WDM network, these path/channel combinations would be path/wavelength combinations). While the invention is not limited to WDM network, the invention will be described with reference to WDM networks for illustrative purposes. Such a database may be built, maintained, structured, used, etc. in a variety of ways; exemplary ones of which are described herein.

According to another aspect of the invention, a database that stores available paths from a source node to reachable destinations nodes is used for the selection of paths and wavelengths thereon. In certain embodiments of the invention, a path is selected from the database based on its destination. Following the selection of the path, a wavelength available on that path is selected from the database. In certain embodiments of the invention, such paths are paths that meet a set of disjointness constraints (e.g., maximally link disjoint, fully link disjoint, maximally node disjoint, fully node disjoint; as well as optionally shared risk group disjoint) selected through the determination of intersection sets of the network resources (e.g., nodes and/or links) of available paths in the database.

Since each of the above aspects is independent, different embodiments may implement one or both of the above aspects of the invention. Of course, one or more parts of an embodiment of the invention may be implemented using any combination of software, firmware, and/or hardware. Such software and/or firmware can be stored and communicated (internally and with other access nodes over the network) using machine-readable media, such as magnetic disks; optical disks; random access memory; read only memory; flash memory devices; electrical, optical, acoustical or other form of propagated signals (e.g., carrier waves, infrared signals, digital signals, etc.); etc.

Exemplary Network

To describe exemplary embodiment of the invention, an exemplary network will first be described. It should be understood that in a network with a single link between nodes, a path may be described by the series of nodes through which that path travels (the links are impliedly distinguished). However, in a network with multiple links between nodes, a path is described by the series of nodes and interconnecting link(s) over which that path travels. There are a variety of ways to distinguish the links of an optical network (e.g., links could be individually labeled; if multiple line cards are used and each line card has one port, then "node number, outgoing line card, incoming line card, node number" may be used; if multiple line cards are used where some have different ports, then "node number, outgoing line card, outgoing port, incoming port, incoming line card, node number" may be used; if ports in a node are individually labeled (irrespective of which line card they are on), then "node number, outgoing port number, incoming port number, node number" may be used; etc.). By way of illustration, and not by limitation, the format "node number, outgoing port number, incoming port number, node number" is used herein to indicate there is an optical link between those nodes.

FIGS. 1A and B are a block diagram illustrating an exemplary optical network according to one embodiment of the invention. FIG. 1A is a block diagram of a node of an optical network according to one embodiment of the invention. In FIG. 1A, node 100 is illustrated having three ports: port 1 (P1) on the right, port 2 (P2) on the bottom, and port 3 (P3) on the left. These ports and their orientation are just for illustrative purposes; Specifically, the orientation is used for the nodes in FIG. 1B. Thus, a node of the optical network may have more or less ports and ports oriented in a variety of ways.

Figure 1B:
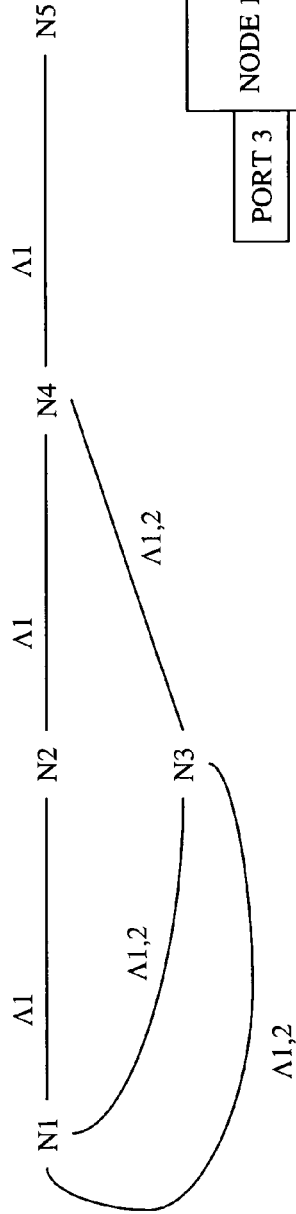
FIG. 1B is a block diagram illustrating an exemplary optical network according to one embodiment of the invention.

FIG. 1B is a block diagram illustrating an exemplary optical network according to one embodiment of the invention. The optical network of FIG. 1 includes 5 access nodes labeled N1, N2, N3, N4, and N5. The ability to implement multiple lamdas on a single link is represented in simplified form by numbering the lamdas; lamdas having the same number are the same wavelength. FIG. 1 shows the numbered lamdas available on each optical link of the exemplary optical network. The term "available" when used in conjunction with a lamda number indicates that the node is capable of producing that wavelength; the terms allocated and unallocated are used to identify whether or not that available wavelength is currently provisioned. The format node number, outgoing port number, incoming port number, node number equals lamda number(s) indicates the wavelengths available on that link. Using the exemplary discussed above, FIG. 1 shows: N1:P1:P3:N2=lamda 1; N2:P1:P3:N4=lamda 1; N4:P1:P3:N5:=lamda 1; N1:P2:P3:N3=lamda 1, 2; N1:P3:P2:N3=lamda 1, 2; and N3:P1:P2:N4=lamda 1, 2, 4.

It should be understood that the topology in FIG. 1 is exemplary, and that the invention can be used with any number of different topologies. In addition, while FIG. 1 illustrates different wavelengths being available on different optical links, it is understood that the same wavelengths may be available on all of the optical links. Furthermore, while specific wavelengths are identified as being available in FIG. 1, optical network devices may be implemented with lasers to allow them to generate a variety of different wavelengths and the invention is equally applicable to optical networks containing one or more such optical network devices. However, for purposes of illustration, embodiments of the invention will be described with reference to the wavelengths illustrated in FIG. 1. While the exemplary optical network in FIG. 1 is made up of access nodes, embodiments of the invention are equally applicable to optical networks that include pass through nodes.

Exemplary Database Embodiments

Figure 2:
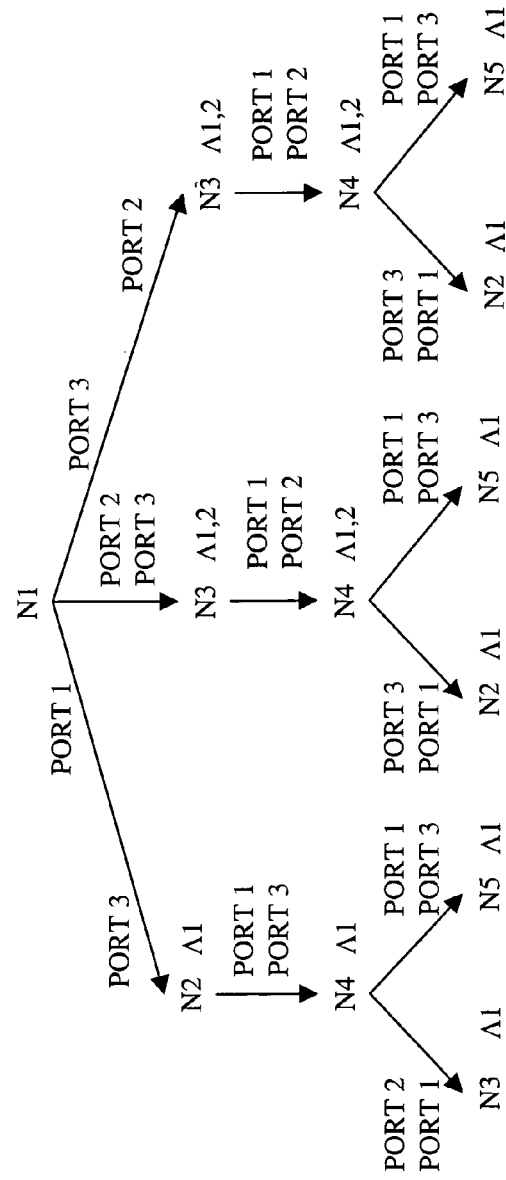
FIG. 2 illustrates the conversion free available paths for N1 of the optical network in FIG. 1 according to certain embodiments of the invention.

FIG. 2 illustrates the conversion free available paths for N1 of the optical network in FIG. 1 according to certain embodiments of the invention. Specifically, FIGS. 2 illustrates the conversion free topology in the form of a tree having N1 as the root with branches representing links from node to node through the network. As used below, the phrase "path channel set" refers to the intersection set of the lamdas on the links of the path. For example, the path channel set for the path N1:P2:P3:N3:P1:P2:N4:P1:P3:N5 is the intersection set of the "link channel sets" of links N1:P2:P3:N3; N3:P1:P2:N4; and N4:P1:P3:N5. It should be understood that where a path has a length of a single link, the link channel set will be the same as the path channel set.

In FIG. 2, the root N1 has a branch to N2. With regard to the branch to N2, lamda 1 is available (i.e., the link channel set of the link N1:P1:P3:N2 is lamba 1). Thus, for the path from N1 to N2, lamda 1 makes up the path channel set. From this representation of N2 in FIG. 2, there is a branch to a representation of N4. The branch from N2 to N4 represents the path N1:P1:P3:N2:P1:P3:N4. Since the link channel sets for N1:P1:P3:N2 and for N2:P1:P3:N4 each include lamda 1, the intersection of these link channel sets includes lamda 1. As such, the path service level channel set for the path N1:P1:P3:N2:P1:P3:N4 includes lamda 1. From this representation of N4, there is a branch to each of N3 and N5. The branch to N3 represents the path N1:P1:P3:N2:P1:P3:N4:P2:P1:N3. Since the link channel sets for N1:P1:P3:N2, N2:P1:P3:N4, and N4:P2:P1:N3 respectively include lamda 1, lamda 1, and lamda 1, 2, the intersection of these link channel sets includes only lamda 1. As such, the path service level channel set for the path N1:P1:P3:N2:P1:P3:N4:P2:P1:N3 includes only lamda 1. The branch to N5 represents the path N1:P1:P3:N2:P1:P3:N4:P1:P3:N5 and has the path channel set of lamda 1.

In the rest of this description, the format path=lamda number(s) will be used to identify the path channel set for that path. Returning to the root node N1, N1 has branches to two representations of N3 to reflect the two optical links between them: N1:P2:P3:N3=lamda 1,2 and N1:P3:P2:N3=lamda 1,2. Each of these has a branch to a different representation of N4 (representing the paths N1:P2:P3:N3:P1:P2:N4=lamda 1,2 and N1:P3:P2:N3:P1:P2:N4=lamda 1,2). Each of these representations of N4 have a branch to a representation of each of N2 and N5: (representing the paths N1:P2:P3:N3:P1:P2:N4:P3:P1:N2=lamda 1; N1:P2:P3:N3:P1:P2:N4:P3:P1:N2=lamda 1,2; N1:P3:P2:N3:P1:P2:N4:P3:P1:N2=lamda 1; and N1:P3:P2:N3:P1:P2:N4:P1:P3:N5=lamda 1,2).

Exemplary Database Organizations

Figure 3:
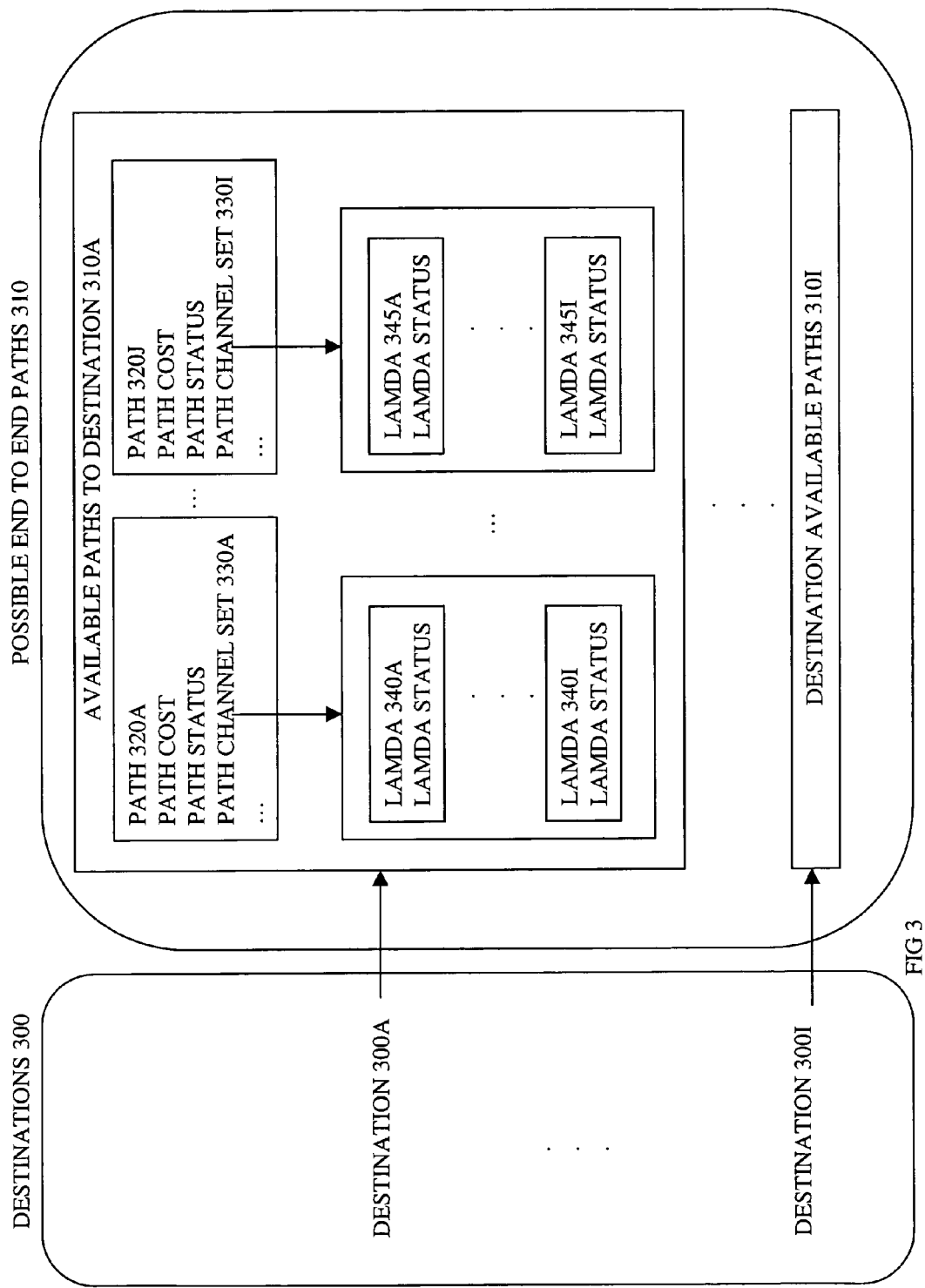
FIG. 3 is a block diagram of an exemplary database organization according to one embodiment of the invention.

FIG. 3 is a block diagram of an exemplary database organization according to one embodiment of the invention. FIG. 3 illustrates a destinations structure 300 and representation of the possible end to end paths 310. The destinations structure 300, having entries destination 300A to 300I, is to store each of the reachable destinations in a single entry. With reference to the exemplary network in FIGS. 1 and 2, for N1 this would be nodes N2, N3, N4, and N5. Each of the destination entries 300A to 300I is associated with the available paths to that destination 310A–310I. Specifically, in FIG. 3 the destination 300A has associated to it paths 320A–320J. In other words, the available paths are grouped by common destinations. Each path has associated to it its path channel set; paths 320A–320I respectively have path channel sets 330A–330I. Each of these path channel sets 330A–330I includes a set one or more lamdas (e.g., path channel set 330 includes lamdas 340A–340I; path channel set 330I includes lamdas 345A–345I).

FIG. 3 additionally shows that each path has a path cost and a path status. The path costs are to identify the relative costs of the paths so that they may be distinguished for shortest path purposes. It should be noted that this cost is on a per path basis, as opposed to a per path/wavelength combination basis. The path status identifies the status of the path (e.g., up, down, etc.—where up means that the path is usable and down means that the path is currently not usable (e.g., a path would have a status down if one or more links in the path has been removed). In addition, each lamda has stored with it a lamda status. The lamda status may not be limited to being allocated or unallocated. For example, a lamba that has failed due to a fiber cut, could be assigned a status of "broken". For embodiments in which only bi-directional paths can be allocated, the granularity for tracking allocated/unallocated status is simply the lamda level. However, in embodiments that allow for unidirectional path allocation, the granularity of allocated/unallocated status is a status for each direction for each lamda.

As a result, based on a given destination, the database can be accessed to locate the available paths to that destination (e.g., the group of paths to select from for allocation can be located). In certain embodiments of the invention, the paths for each destination are also sorted by a set of one or more path characteristics (e.g., any available wavelengths, number of available wavelengths, the cost, load balancing issues, etc.) As a result, depending on the sort, the next path to select for allocation to a given destination will be at the beginning of the group. Once a path is selected, the available wavelengths on that path and their status can be accessed for selection therefrom. In certain embodiments of the invention, the wavelengths of a path channel set are sorted by lamda status so that the next unallocated lamda to select is first.

To provide an example, FIGS. 4A–4D illustrate the paths from FIG. 2 grouped by destination, as well as the path channel set for each path, according to one embodiment of the invention. In particular, FIG. 4A illustrates the paths in FIG. 2 from N1 to N2, as well as the path channel set for each path, according to one embodiment of the invention; FIG. 4B illustrates the paths in FIG. 2 from N1 to N3, as well as the path channel set for each path, according to one embodiment of the invention; FIG. 4C illustrates the paths in FIG. 2 from N1 to N4, as well as the path channel set for each path, according to one embodiment of the invention; and FIG. 4D illustrates the paths in FIG. 2 from N1 to N5, as well as the path channel set for each path, according to one embodiment of the invention.

The exemplary organization of the database in FIG. 3 could be implemented in a variety of ways. For example, the destinations structure 400 could be stored as a separate structure (e.g., a linked list, a tree, etc.), each entry of which includes a pointer to a structure (e.g., a linked list, a tree, etc.) for each group of paths; each entry for the path group structure could include a pointer to a structure (e.g., a linked list, a set, etc.) for the path channel set of that path.

While FIG. 3 illustrates an exemplary database organization, it should be understood that alternative embodiments of the invention could have different organizations and structures. For example, rather than have a separate destinations structure, the paths could be grouped through the sorting of a table having each path as an entry. As another example, rather than having a separate lamdas structure for each path, the available lamdas could be stored along with the path. As yet another example, while certain information is stored along with the paths and lamdas (cost and status), alternatively embodiment could store more, less, and/or different information.

It should be understood that different embodiments of the invention may rely on different relationships of sorting and searching. For instance, while in certain embodiments the lamdas in the path channel sets are sorted, alternative embodiments of the invention may rely on searching an unsorted path channel set. As another example, while certain embodiments of the invention sort the paths by cost and whether there are any unallocated channels thereon, alternative embodiments of the invention may sort the paths in the groups by cost but not by whether there are any unallocated channels; such embodiments would rely on searching to locate the lowest cost path with an unallocated channel.

Database Processes

There are a variety of processes to perform on the database. For example, adding paths; selecting path and lamda combinations for allocation, and other types of updates (e.g., cost; status; deallocation; addition/removal of a channel, link, or node; etc.)

FIG. 5A is a flow diagram for adding a path to the database according to one embodiment of the invention. In block 500, a path and its channel set to be added are received, and control passes to block 505. For example, assume the source of the path is N1 and the path N1:P2:P3:N3:P1:P2:N4:P1:P3:N5=lamda 1 is received.

As shown in block 505, the destination node of the path is determined and control passes to block 510. In the above example, the destination node would be N5.

In block 510, it is determined if the destination is already stored in the database. If not, control passes to block 515. Otherwise, control passes to block 520. In the above example, the database would be searched for the destination node N5. By way of particular example, the exemplary destinations structure 400 would be searched for N5. By way of another particular example where the paths are stored as separate entries in a large collective table, the table would be searched for N5.

As shown in block 515, the destination node is added to the database and control passes to block 525. The manner of implementing this block would be dependent on the structure used to store the destination.

In block 520, the location for the path in the sorted order of the group of paths to the destination in that database is determined, and control passes to block 525. Again, the manner of implementing this block would be dependent on the structure used to store the destination. While block 520 specifies that the group is sorted, alternative embodiments of the invention may not sort the group (in which case, the location may be chosen by a variety of techniques).

As shown in block 525, the path is stored in the database associated to the destination and control passes to block 530.

In the above example, the path N1:P2:P3:N3:P1:P2:N4:P1: P3:N5 is stored associated with destination node N5. By way of particular example where the destination structure 400 is separate from the paths structures, either: 1) if there are paths to that destination already stored, the path would be added to the group of paths already associated with the destination; or 2) if there are not paths to that destination already stored, the path would be stored and a pointer in the destination entry modified to point to the path.

In block 530, the path channel set is stored associated to the path. In the above example, lamda 1 is stored associated to the path N1:P2:P3:N3:P1:P2:N4:P1:P3:N5, which has been associated to the destination.

FIG. 5B is a flow diagram for walking the database according to one embodiment of the invention. Such walking may be used to perform other types of processes that involve locating paths and/or lamdas for update. In block 540, the destination of interest is determined and control passes to block 545. The manner of performing block 540 depends on the operation being performed and the implementation. By way of example, if a path/wavelength combination needs to be allocated, the destination would be identified. By way of another example, if a path cost needed to be updated, the path would be provided that includes the destination.

As shown in block 545, the location of that destination is determined in the database, and control passes to block 550. Block 545 would be performed in a similar manner to block 510.

In block 550, it is determined if the destination was located in the database. If not, control passes to block 555. Otherwise, control passes to block 560.

As shown in block 555, a null is returned because the destination node is not in the database (e.g., it is not reachable).

In block 560, the set of paths associated to that destination node is searched. The manner of performing block 560 is dependent on how the paths are stored.

Additionally, if the processing involved the path channel set, the path channel set of the located path would be accessed.

Once the item(s) in question were located, the updating would be performed.

Exemplary Path Selection Embodiments

Regardless of the organization and structures of the database, one process to perform on the database would be the selection of path/wavelength combinations for allocation. This set of selection criteria could include a variety of different issues, including the source node (unless this is implicit in that the operations are being performed by the source node in a source based system), the destination node, different types of paths, load balancing, etc. By way of example, two types of paths are described: regular paths (paths selected irrespective of their disjoint-ness from other network resources) and disjoint paths. The set of selection criteria in the case of a disjoint path could include a set of one or more disjointness constraints (e.g., a disjointness level such as maximally link disjoint, fully link disjoint, maximally node disjoint, fully node disjoint) and the network resources to be disjoint from (e.g., a path in the case of, for example, a protection path; a set of nodes and/or links in the case of, for example, a restricted path; etc.).

Regular Paths

FIG. 6A is a flow diagram for selecting a regular path according to one embodiment of the invention. In block 600, a path that has one or more unallocated channels is selected from the set of available paths to the destination. In one embodiment of the invention, this block would be performed by, based on the destination (e.g., as described in FIG. 5B), walking/searching the database for a path to the destination with an unallocated channel. From block 600, control passes to block 605.

In block 605, it is determined if there was success in selecting the path in block 600. If not, control passes to block 610. Otherwise, control passes to block 615. There may not be success for a variety of reasons (e.g., the destination is not reachable from the source node, there are not any unallocated wavelengths on any of the set of one or more paths to the destination node, etc.).

As shown in block 610, alternative action is taken. This alternative action can take a variety of forms (e.g., see block 1425).

In block 615, an unallocated channel on the selected path is selected. The manner of performing block 615 would depend on the implementation of the database (see above).

Disjoint Paths

FIG. 6B is a flow diagram for selecting a disjoint path according to one embodiment of the invention. In block 620, a path that has one or more unallocated channels is selected from the set of available paths to the destination. In one embodiment of the invention, this block would be performed by, based on the destination (e.g., as described in FIG. 5B), walking/searching the database for a path to the destination with an unallocated channel. From block 620, control passes to block 625.

In block 625, it is determined if there was success in selecting the path in block 610. If not, control passes to block 630. Otherwise, control passes to block 635. Again, there may not be success for a variety of reasons (e.g., the destination is not reachable from the source node, there are not any unallocated wavelengths on any of the set of one or more paths to the destination node, none of the available paths to the destination with unallocated channels do not meet the set of disjointness constraints, etc.).

As shown in block 630, alternative action is taken. This alternative action can take a variety of forms and may be different depending on the use of path being requested (e.g., a protection path, a restricted path, etc.). For example, certain embodiments of the invention may lower the level of disjointness (e.g., the descending order may be fully node disjoint, maximally node disjoint, fully link disjoint, maximally link disjoint; in the case of maximally disjoint, lowering the number of network resources in common; etc.). Certain embodiments of the invention may additionally or alternatively operate as in block 1425.

In block 635, it is determined if the currently selected path meets the set of disjointness constraints. If not, control passes to block 620 for the selection of another path. If so, control passes to block 640. The manner of performing block 635 is dependent on the set of disjointness constraints. While one embodiment that supports both node disjoint and link disjoint paths is described in more detail in FIG. 7, alternative embodiments may support more, less, and/or different types of constraints.

As shown in block 640, an unallocated channel on the selected path is selected. The manner of performing block 640 would again depend on the implementation of the database (see above).

Figure 7:
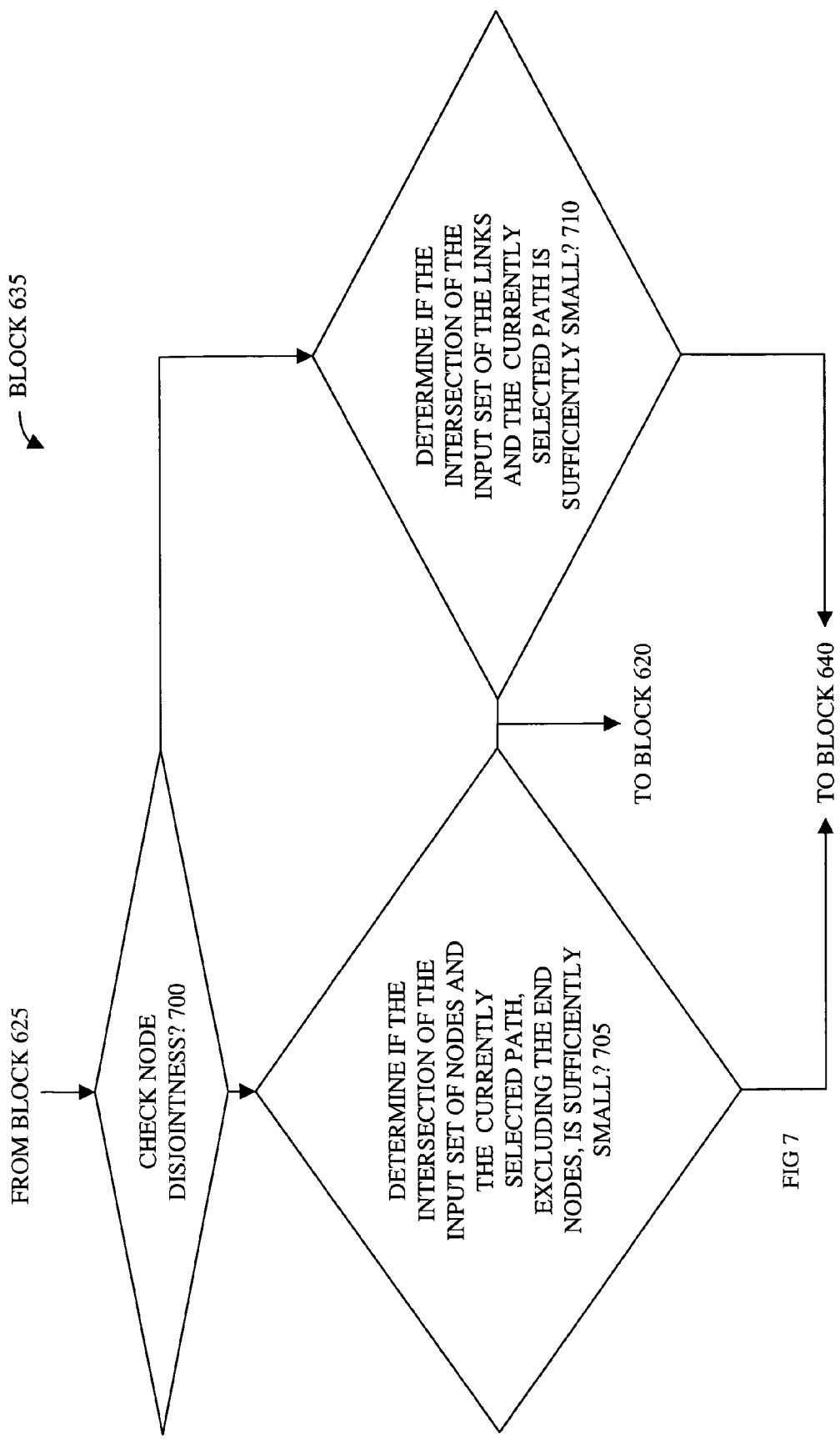
FIG. 7 is a flow diagram for block 635 of FIG. 6 according to one embodiment of the invention.

FIG. 7 is a flow diagram for block 635 of FIG. 6 according to one embodiment of the invention. In FIG. 7, control passes on the yes path from block 625 to block 700. In block 700, it is determined if the set of disjointness constraints are for a node disjoint path. If so, control passes to block 705. Otherwise, control passes to block 710.

In block 705, it is determined if the intersection of the input set of one or more nodes to be disjoint from and the path currently selected in block 620, excluding the end nodes, is sufficiently disjoint. If no, control passes to block 620 for the selection of another path. Otherwise, control passes to block 640 for the selection of an unallocated channel on that path. The term "sufficiently disjoint" is used to refer to range of required disjointness from fully node disjoint down to the lowest level of maximally node disjoint; thus, what is sufficiently disjoint would again be specified in the set of disjointness constraints. The term input set of one or more nodes refers to the network resources to be disjoint from, as discussed above with reference to the set of disjointness constraints, could be specified in a variety of ways. For example, if an input path was provided, then the input set of nodes would be the nodes of that path, excluding the source and destination nodes. By way of more particular example, assuming that a regular path and a path disjoint from that regular path are requested; in certain embodiments, the regular path would be selected and its nodes accessed from the database, and then a path other than the, path selected for the regular path would be selected for the intersection comparison (excluding source and destination nodes).

Block 705 could be performed in a variety of ways and is dependent on the organization and structures in the database. For example, in one embodiment of the invention, the nodes of the selected path are accessed from the database. Each node in the selected path, excluding the source and destination nodes, is compared to each node in the input set of nodes until either the number of intersections indicates the selected path is not sufficiently disjoint or all of the nodes have been compared.

Similarly, in block 710, it is determined if the intersection of the input set of one or more links to be disjoint from and the path currently selected in block 620 is sufficiently disjoint. If no, control passes to block 620 for the selection of another path. Otherwise, control passes to block 640 for the selection of an unallocated channel on that path. Similar to above, the term "sufficiently disjoint" is used to refer to range of required disjointness from fully link disjoint down to the lowest level of maximally link disjoint; thus, what is sufficiently disjoint would again be specified in the set of disjointness constraints. Similar to above term input set of one or more links refers to the network resources to be disjoint from, as discussed above with reference to the set of disjointness constraints, could be specified in a variety of ways. For example, if an input path were provided, then the input set of links would be the links of that path. By way of more particular example, assuming that a regular path and a path disjoint from that regular path are requested; in certain embodiments, the regular path would be selected and its links accessed from the database, and then a path other than the path selected for the regular path would be selected for the intersection comparison.

Block 710 could be performed in a variety of ways and is dependent on the organization and structures in the database. For example, in one embodiment of the invention, the links of the selected path are accessed from the database (e.g., where the format described above is used, the node:outgoing port:incoming port:node for each link is accessed). Each link in the selected path is compared to each link in the input set of links until either the number of intersections indicates the selected path is not sufficiently disjoint or all of the links have been compared.

Complexity

The complexity of the above methods of selecting node paths will now be addressed. In mathematical terms, the complexity of an algorithm is defined by the number of operations it performs. The notation is called the O notation.

For example, the complexity of the standard Dijkstra algorithm is $O(N^2)$. This means that for a graph with N nodes the number of operations that is performed is $N^2$. This directly reflects the time taken to calculate, since, for a processor(s) the time taken to perform one operation is relatively constant. For instance, assume the exemplary network from the background that had 10 nodes, up to 8 fibers per node, and up to 40 channels per fiber. The graph of path/wavelength combinations used for Dijkstra's algorithm, due to redundant/dummy nodes, includes roughly 3200 dummy nodes. Therefore the typical number of operations to calculate the shortest path would be $3210^2$.

In contrast, due to the database described herein, the task of finding a path to a destination, irrespective of it being shortest, would be driven by the complexity of the search methods used. Using the same exemplary optical network of 10 nodes, the maximum number of paths from each source to a particular destination that would be stored would be 10(number of nodes)X8(degree of the node—i.e., fibers at node)X8 (fibers at other nodes)=640. Thus, N is 640 instead of 3210. If a search mechanism like an RB tree is used which has a complexity of O (log N), or the worst case a sequential search with complexity of O(N), where N=640, the result is much less than $O(N^2)$ where N=3210. In embodiments where the database is organized by destinations, a search is performed to locate the destination; followed by a search to locate a path under that destination. The complexity of these searches depends on the search mechanisms used. In one embodiment of the invention in which an RB tree is used for the destination search and a sequential search is used for the path search, the complexity is O(P log N) where P is the number of paths and N is the number of nodes in the network. Of course, alternative embodiments could used other search mechanisms and/or database organizations.

Exemplary Access Node Embodiments

Figure 8:
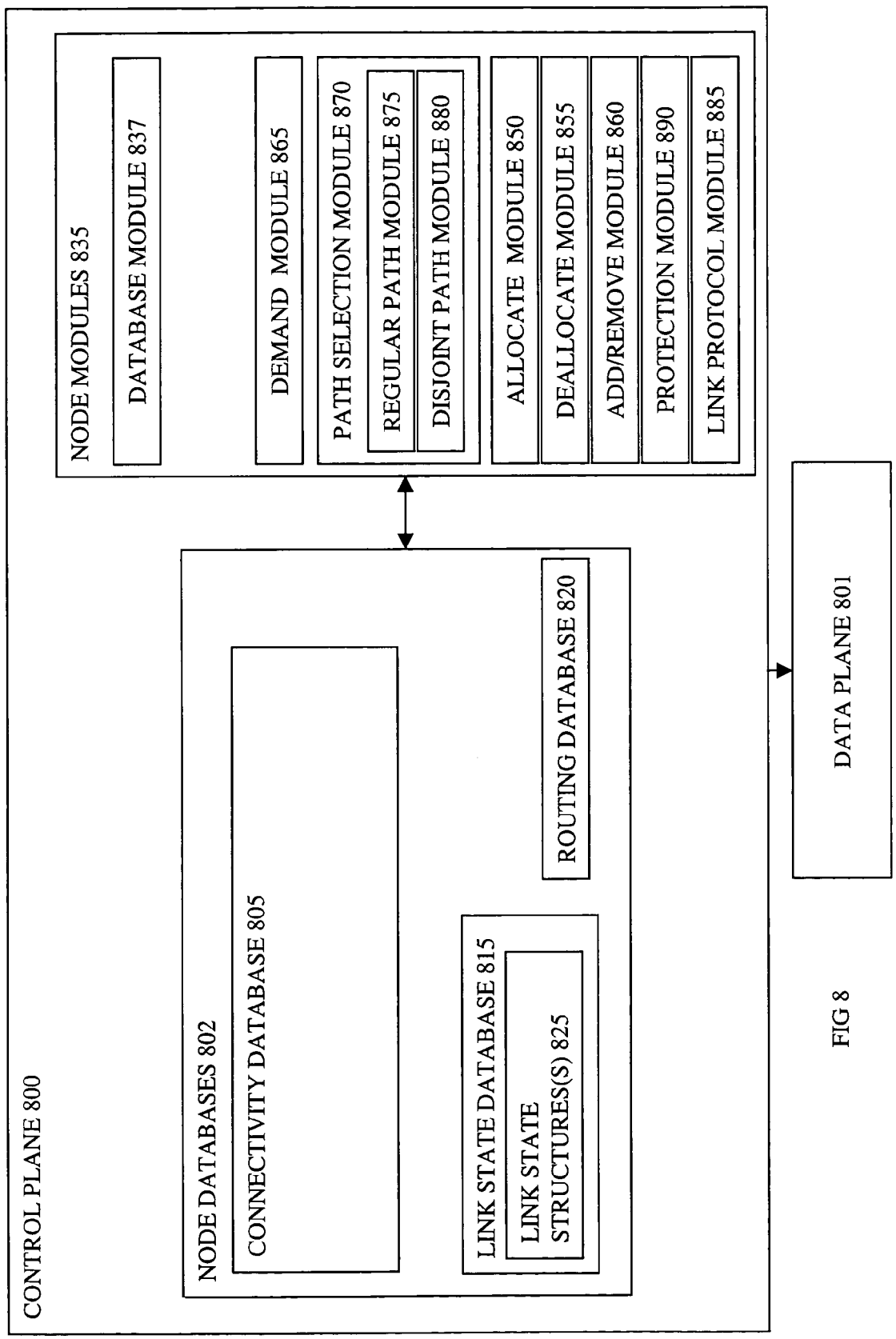
FIG. 8 is a block diagram illustrating an exemplary access node according to certain embodiments of the invention.

FIG. 8 is a block diagram illustrating an exemplary access node according to certain embodiments of the invention. While FIG. 8 illustrates an access node for use in a source based scheme, the invention is not so limited. FIG. 8 shows a control plane 800 coupled with a data plane 801. The control plane 801 includes node databases 802 coupled with node modules 835. Of course, the control plane 800 and data plane 801 include other items.

FIG. 8 shows the node databases 802 include a connectivity database 805, a link state database 815, and a routing database 820. The link state database 815 includes a set of one or more link state structures 825, one for each link connected to that node. While in certain embodiments these links are discovered through a link management protocol (link protocol module 885), alternative embodiments could use other techniques. In certain embodiments of the invention, each link state structure records a neighboring node, a port through which that neighboring node is connected (fiber links end up at a port on the node), and available wavelengths on that link (through the port).

The connectivity database 805 includes a set of one or more structures to store the available paths as previously described herein (e.g., see FIGS. 3–5 and related description). The routing database 820 stores the configuration of the cross connect of the node. In certain embodiments of the invention, the routing database 820 is redundant in that it stores a representation of the part of the paths in the connectivity database that travel through the access node.

The node modules 835 includes a database module 837, a demand module 865, a path selection module 870, an allocate module 850, a deallocate module 855, an add/remove module 860, a protection module 890, and the link protocol module 885.

The database module 840 builds and maintains the connectivity database 805. There are a variety of techniques for doing so, exemplary ones of which are described later herein. The demand module 870 receives demands for new path/wavelength combinations and invokes the path selection module 875 and allocate module 850.

The path selection module 870 includes a regular path module 875 and a disjoint path module 880. The path selection module 875 receives requests for paths and the path selection criteria previously described and invokes the appropriate one(s) of the regular path module 875 and disjoint path model 880. In at least certain embodiments of the invention, the regular path module 875 and the disjoint path module 880 respectively perform the operations in FIGS. 6A and 6B.

The allocate module 850 causes the selected path/wavelength combinations to be allocated (e.g., the access node's cross connect, routing database 820, and connectivity database 805, as well as, in certain embodiments, communication to other nodes), while the deallocate module 855 causes path/wavelength combinations to be deallocated. The add/remove module 860 addresses additions and removals of channels, links, and nodes in the optical network. The protection module 890 is called responsive to the add/remove module 860 to implement a redundancy scheme. Exemplary manners of implementing the database module 837, demand module 865, allocate module 850, deallocate module 855, add/remove module 860, and protection module 890 will be described later herein.

Exemplary Database Building/Maintaining and Path/Wavelength Combination Management Embodiments According to embodiments of the invention, a set of one or more connectivity constraints is imposed on the building/maintaining of network topology databases. As a result of the set of connectivity constraints, such network topology databases are smaller in comparison to network topology databases that represent all physical connectivity in the network. According to one aspect of the invention, the set of one or more connectivity constraints includes one or more QoS based criteria; thus, effectively dividing the optical network into QoS based logical network views that may be used to provision different wavelengths for different classes of traffic based on differing QoS requirements. According to another aspect of the invention, the set of one or more connectivity constraints includes a conversion free constraint; this allows for establishing conversion free optical circuits. According to another aspect of the invention, a distributed search based technique is used for building and maintaining network topology databases based on a set of connectivity constraints. According to another aspect of the invention, an optical network uses a source based scheme in which network topology databases, based on a set of connectivity constraints, are kept in access nodes. The reduced network topology database size (as compared to a physical network topology database) and distributed nature of this source based scheme allows for the provisioning of optical circuits in real-time (or on the fly; that is, the demands do not need to know ahead of time). Such real-time provisioning of optical circuits allows for a redundancy (protection) scheme referred to herein as optical reroutable. In the optical reroutable redundancy scheme, upon learning of a failure affecting an optical circuit, a new optical circuit is provisioned in real time and the traffic moved to it. For example, in certain embodiments of the invention in which the optical network includes optical network nodes that have optical cross-connects, upon learning of a failure affecting a given optical circuit, one end node of that optical circuit (e.g., the one that originally received the demand that caused the provisioning of that optical circuit) causes the provisioning of a new optical circuit in real time and both end nodes move the traffic to it. By way of particular example, in such embodiments of the invention that use a source based scheme and are conversion free, upon learning of a failure affecting a given optical circuit, the end node that originally received the demand causes the provisioning of a lightpath in either direction (where both lightpaths share the same path to the other end node) and both end nodes switch the traffic to these lightpaths. While some embodiments of the invention support such an optical reroutable redundancy scheme, alternative embodiments of the invention may: 1) implement optical reroutable redundancy schemes differently and/or in optical networks wherein some or all of the optical network nodes have optical-electrical-optical cross connects; or 2) not implement an optical reroutable redundancy scheme.

Since each of the above aspects is independent, different embodiments may implement different ones and/or combinations of the above aspects of the invention. For example, certain embodiments of the invention include in the set of connectivity constraints both QoS criteria and conversion free constraints. The network topology databases based on this set of connectivity constraints: 1) have reduced size over full physical connectivity network topology databases; 2) allow different traffic to be given different wavelengths based on QoS for different classes of traffic; and 3) allow for establishing conversion free optical circuits. While certain of these embodiments implement source based schemes and build/maintain the network topology databases using a distributed search based technique, others of these embodiments may use a different scheme and/or a different database building/maintaining technique (e.g., OSPF-TE is used to collect information on the network, and this information is used to build and maintain a database like that described in FIG. 3; thus, rather than using the graphs to build a shortest path first tree, the graphs would be used to build and maintain the database like that in FIG. 3.)

Exemplary QoS Embodiments

Different embodiments of the invention may support different QoS criteria. For example, the QoS critera may include bandwidth, bit error rate, optical signal to noise ratio, peak noise level, re-routing priority, etc. In other words, the QoS criteria may include any criteria that allows different wavelengths to be distinguished from each other based on quality of service. For a given wavelength on a given link, the values for the QoS criteria (the wavelength parameters) may be determined based on the configuration (e.g., the type of laser used) and/or by monitoring the light.

The QoS criteria is used to classify wavelengths on links into one of the set of supported service levels. In particular, for each of the QoS criteria, there is a service level parameter provided for each service level. The wavelength parameters of a given wavelength on a given link are compared against the service level parameters to classify that wavelength into one of the service levels.

Exemplary Network

In certain optical networks, different wavelengths in at least certain nodes have different wavelength parameters. For instance, a given optical network device may have different groups of wavelengths implemented to operate at different bandwidths (e.g., group A at OS-X, group B at OS-Y, and group C at OS-Z) and service level parameters that distinguish based on bandwidth. As a result, the optical network not only has a given interconnectivity at the physical link level (a physical topology), but also has a given interconnectivity for each service level (for each service level, a service level topology for the network and for each node), and a given interconnectivity for each conversion free service level (for each service level, a conversion free service level topology for each node).

Figure 9:
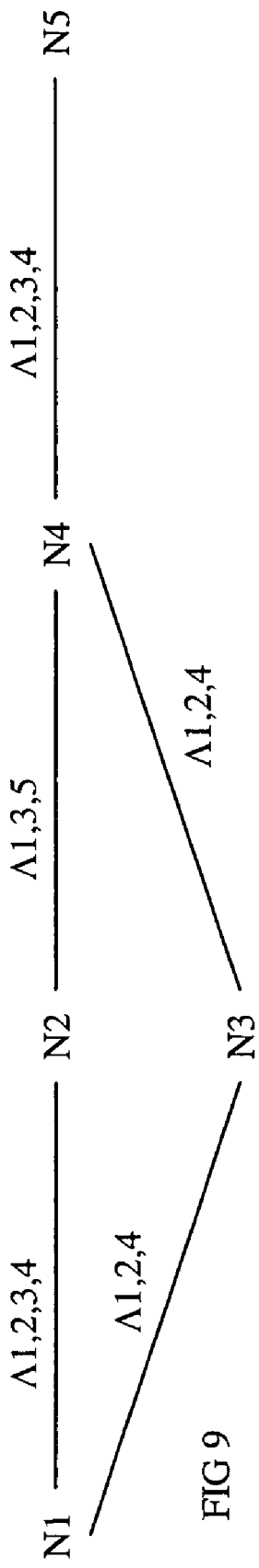
FIG. 9 is a block diagram illustrating an exemplary optical network according to one embodiment of the invention.

FIG. 9 is a block diagram illustrating an exemplary optical network according to one embodiment of the invention. The optical network of FIG. 9 includes 5 access nodes labeled N1, N2, N3, N4, and N5. The ability to implement multiple lamdas on a single link is represented in simplified form by numbering the lamdas; lamdas having the same number are the same wavelength. FIG. 9 shows the numbered lamdas available on each optical link of the exemplary optical network. The term "available" when used in conjunction with a lamda number indicates that the node is capable of producing that wavelength; the terms allocated and unallocated are used to identify whether or not that available wavelength is currently provisioned. To describe the physical connectivity illustrated in FIG. 9, the format of node number: node number is used to indicate there is an optical link between those nodes (this shorthand format is acceptable for the optical network in FIG. 9 because there are not two optical links between any two nodes so as not to obscure; however, it should be understood that such links can be distinguished as previously described here); and node number: node number equals lamda number(s) indicates the wavelengths available on that link. Using this format, FIG. 9 shows: N2:N2=lamda 1, 2, 3, 4; N2:N4=lamda 1, 3, 5; N4:N5:=lamda 1, 2, 3, 4; N1:N3=lamda 1, 2, 4; and N3:N4=lamda 1, 2, 4. It should be understood that the same alternatives previously discussed with reference to FIG. 1B are applicable here.

Figure 10:
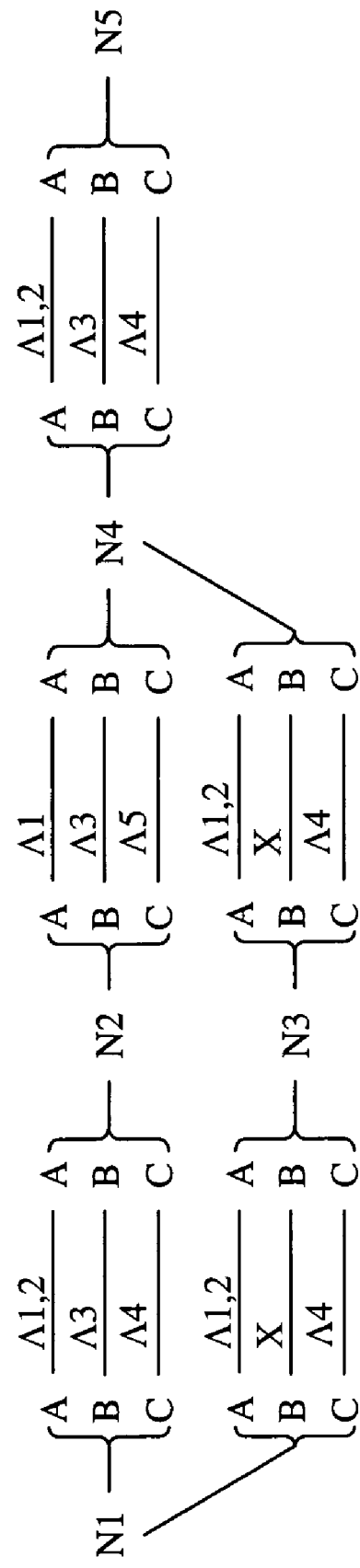
FIG. 10 is a block diagram illustrating exemplary QoS based logical network views of the exemplary optical network of FIG. 9 according to certain embodiments of the invention.

FIG. 10 is a block diagram illustrating exemplary QoS based logical network views of the exemplary optical network of FIG. 9 according to certain embodiments of the invention. In the example of FIG. 10, the set of supported service levels includes service levels A, B, and C. The wavelength parameters of each wavelength on each link have been compared against the service level parameters to classify each wavelength on each link into one of the service levels A, B, and C. To refer to a given service level, an S is placed in front of the service level label (SA, SB, SC). The format for identifying the wavelengths on a given link classified to a given service level is best provided by example. Specifically, SA (N1:N2)=lamda 1, 2 indicates that there is an optical link between N1 and N2, and that the wavelength parameters of lamda 1 and lamda 2 on that link qualify them for service level A (lamda 1 and 2 are referred to as the link service level channel set on link N1:N2 for service level A). Using this format, FIG. 10 illustrates the connectivity of service level A being: SA (N1:N2)=lamda 1, 2; SA (N2:N4)=lamda 1; SA (N4:N5)=lamda 1, 2; SA (N1:N3)=lamda 1, 2; SA (N3:N4)=lamda 1, 2. The service level connectivity for service level B is SB (N1:N2)=lamda 3; SB (N2:N4)=lamda 3; SB (N4:N5)=lamda 3; SB (N1:N3)=X; and SB (N3:N4)=X (where X indicates a null set). The connectivity of service level C is: SC (N1:N2)=lamda 4; SC (N2:N4)=lamda 5; SC (N4:N5)=lamda 4; SC (N1:N3)=lamda 4; and SC (N3:N4)=lamda 4.

Thus, while FIG. 9 illustrates the connectivity at the physical link level, FIG. 10 illustrates the connectivity for each service level (a service level topology for the network). Effectively, this service level node connectivity divides the optical network into QoS based logical network views as illustrated. Thus, for a first access node there are one or more paths across physical links to a second access node (physical topology). For any given one of these paths, there may be, on each of the link(s) making up that path, wavelengths at the same service level. For any given one of these paths, there may also be, on the link(s) making up that path, one or more of the same wavelengths at the same service level.

Figure 11B:
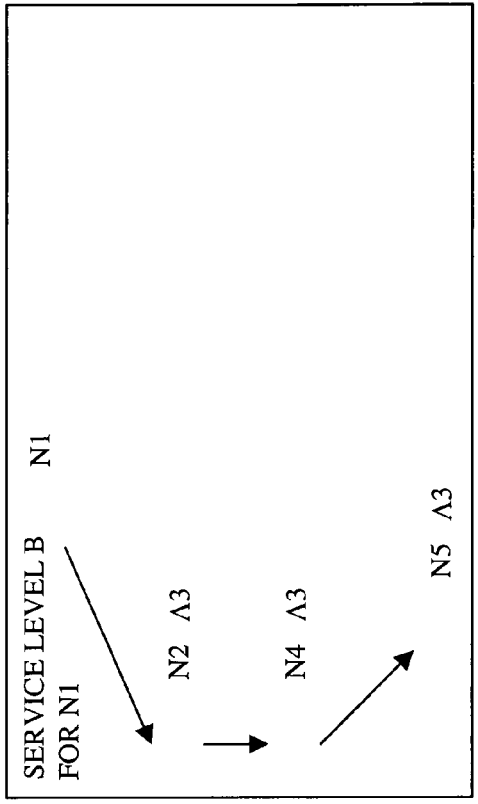
FIG. 11B illustrates service level B's conversion free service level topology for N1 of the optical network in FIG. 10 according to certain embodiments of the invention.
Figure 11A:
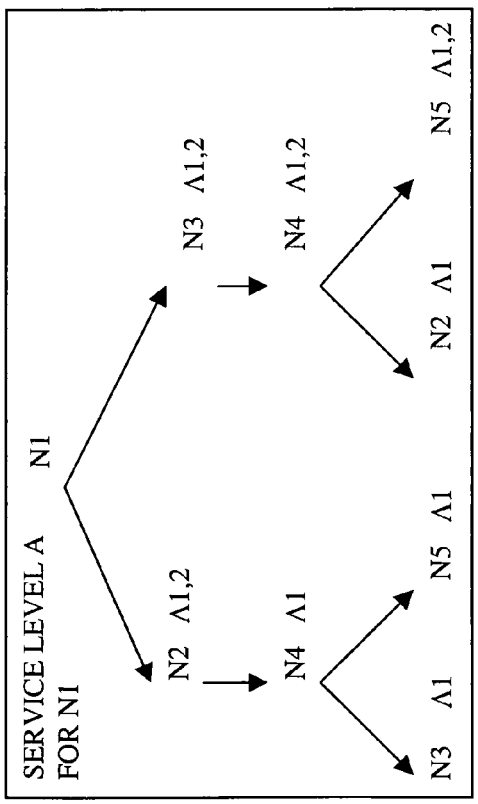
FIG. 11A illustrates service level A's conversion free service level topology for N1 of the optical network in FIG. 10 according to certain embodiments of the invention.
Figure 11C:
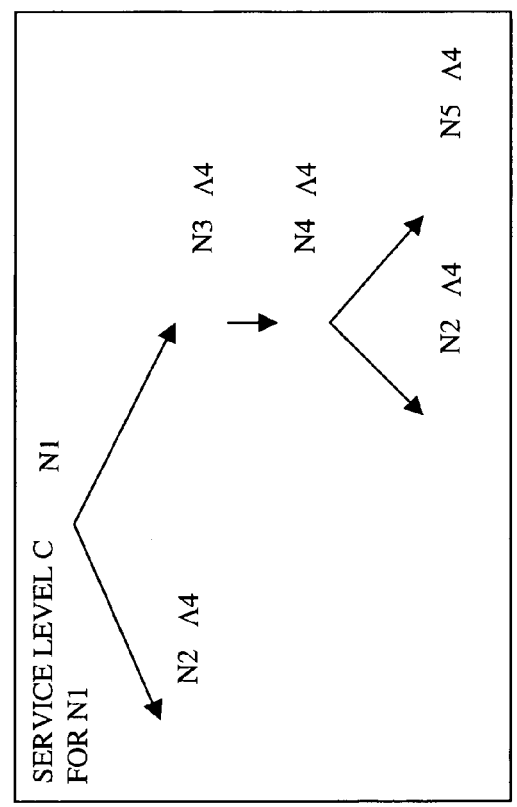
FIG. 11C illustrates service level C's conversion free service level topology for N1 of the optical network in FIG. 10 according to certain embodiments of the invention.

FIGS. 11A–C illustrate the conversion free service level topologies for service levels A–C for N1 of the optical network in FIG. 10 according to certain embodiments of the invention. Specifically, FIGS. 11A–C illustrate conversion free service level topologies in the form of trees having N1 as the root with branches representing links from node to node through the network. As previously indicated, the phrase "path service level channel set" refers to the intersection set of the link service level channel sets on the links of the path. For example, the path service level channel set for the path N1:N2:N4:N5 at service level A is the intersection set of the link service level channel sets SA (N1:N2), SA (N2:N4), and SA (N4:N5).

FIG. 11A illustrates service level A's conversion free service level topology for N1 of the optical network in FIG. 10 according to certain embodiments of the invention. In FIG. 11A, N1 has branches to N2 and N3. With regard to the branch to N2, both lamda 1 and lamda 2 are available at service level A. Thus, for the path from N1 to N2, lamda 1 and lamda 2 make up the path service level channel set for service level A. Similarly, for the branch from N1 to N3, the path service level channel set includes lamda 1 and 2. It should be noted that for paths between adjacent nodes, the link service level channel set (e.g., SA(N1:N2)=lamda 1,2) is the same as the path service level channel set.

From each of N2 and N3, there is a branch to a different representation of N4. The branch from N2 to N4 represents the path N1:N2:N4. Since the link service level channel sets for N1:N2 and for N2:N4 respectively include lamda 1,2 and lamda 2, the intersection of these link service level channel sets includes only lamda 1 (the only conversion free N1:N2:N4 path uses lamda 1 on both N1:N2 and N2:N4). As such, the path service level channel set for the path N1:N2:N4 includes only lamda 1. In contrast, the branch from N3 to N4 represents the path N1:N3:N4. Since the intersection of the link service level channel sets for N1:N3 and N3:N4 includes lamda 1 and 2, the path service level channel set for the path N1:N3:N4 includes lamda 1 and 2.

The branch from N1 to N4, through N2, branches to: 1) N3 with path service level channel set lamda 1; and 2) N5 with path service level channel set lamda 1. The branch from N1 to N4, through N3, branches to: 1) N2 with path service channel set lamda 1; and 2) N5 with path service level channel set lamda 1, 2. It should be noted that even though the link service level channel set for N4:N5 includes lamda 1,2, the path service level channel set for N1:N2:N4:N5 includes only lamda 1 to remain conversion free. This is in contrast to the path service level channel set for N1:N3:N4:N5 which includes both lamda 1 and 2 because both are available on each link of this path.

FIG. 11B illustrates service level B's conversion free service level topology for N1 of the optical network in FIG. 10 according to certain embodiments of the invention. Since there is no lamda that qualifies for service level B on the link N1:N3, the tree of FIG. 11B does not have a branch from N1 to N3. However, there is a branch from N1 to N2, and the path service level channel set for the branch from N1 to N2 includes lamda 3. N2 has a branch to N4, which branch has as its path service level channel set lamda 3. Since there is no lamda qualifying for service level B on the link from N4 to N3, there is not a branch from N4 to N3. However, there is a branch to N5, and the path service level channel set for N1:N3:N4:N5 includes lamda 3.

FIG. 11C illustrates service level C's conversion free service level topology for N1 of the optical network in FIG. 10 according to certain embodiments of the invention. The tree of FIG. 11C has branches from N1 to: 1) N2 with path service level channel set lamda 4; and 2) N3 with path service level channel set lamba 4. There is no branch from N2 because wavelength conversion would be necessary (the link service level channel set for N2:N4 is lamda 5, whereas the path service level channel set for the path from N1 to N2 includes lamda 4). There is a branch from N3 to N4, which branch has as its path service level channel set lamda 4. There are branches from N4 to each of N2 and N5, both of which the path service level channel set includes lamda 4.

It should be understood that a given topology for a node may be service level based and/or conversion free based (depending on the set of connectivity constraints used). Thus, the phrase "service level topology" for a node indicates that at least a QoS based criteria is used, but it does not exclude the use of conversion free criteria (except where otherwise indicated herein); likewise, the phrase "conversion free topology" for a node indicates that at least a conversion free criteria is used, but it does no exclude the use of a QoS based criteria (except where otherwise indicated herein). In other words, to say a topology for a node is service level based does not indicate whether or not it is also conversion free based; to say a topology for a node is conversion free based does not indicate whether or not it is also service level based; but to say a topology for a node is conversion free based and QoS based indicates it must be both.

It should also be understood that if the set of connectivity constraints includes QoS based criteria, then there are service level topologies for the network and service level topologies (or conversion free service level topologies if a conversion free criteria is also used) for each node; if the set of connectivity constraints includes a conversion free criteria, then there is a conversion free topology (or a conversion free service level topology if QoS based criteria are also used) for each node. Different embodiments may store network topology databases that represent one or more of these different topologies in different devices depending on the implementation and the set of connectivity constraints used. For example, a centralized network management server may store network topology database(s) representing: service level topologies for the network, service level topologies for each node, one or more conversion free topologies for each node, and/or conversion free service level topologies for each node. As another example, each access node may store may store network topology database(s) representing: service level topologies for the network, service level topologies for that node, one or more conversion free topologies for that node, and/or conversion free service level topologies for that node. It should be understood that other configurations are within the scope of the invention.

It should also be understood that each of these network topology databases for a node would be organized/structured and operated on as previously described above with reference to FIG. 1–8. For example, where the set of connectivity constraints includes QoS based criteria, then there are service level topologies (or conversion free service level topologies if a conversion free criteria is also used) for each node that are organized/structured and operated on as previously described above with reference to FIGS. 1–8.

FIG. 12 is a block diagram illustrating a hierarchy of terms according to certain embodiments of the invention. The terms illustrated in FIG. 12 will be used with respect to certain embodiments of the invention described below. With reference to FIG. 12, the network is divided into a set of one or more service levels, each service level includes a set of zero or more possible end to end paths, each of these possible end to end paths includes a set of one or more links, and each link includes one or more available lamdas. The possible end to end paths of a given service level are referred to as the set of possible end to end service level paths (all paths that can be made between access nodes with the available lamdas at that service level). The union of the possible end to end service level paths of all the service levels is referred to as the set of possible end to end network paths. The links making up a given path are referred to as the set of path links, whereas the union of the links of all the possible end to end paths in a set of possible end to end service level paths is referred to as the set of service level links. The lamdas on a link of a possible end to end path of a service level are referred to as the link lamdas, whereas the union of the lamdas on the links of a possible end to end path of a service level are referred to as the path lamdas. The term service level link lamdas is used to refer to the links of the service level links and the lambas thereon qualifying for that service level.

The hierarchy illustrated in FIG. 12 provides a framework for the set of connectivity constraints including one or more QoS based criteria that divide the network into service levels. When the set of one or more connectivity constraints also includes a conversion free constraint, the link lamdas of the links of a possible end to end path of a service level will all be the same. In other words, to provide a conversion free end to end path, the same lamda must be used on each link of the end to end path (that lamda must qualify for the same service level on each link of the path). In contrast, when the set of connectivity constraints does not include a conversion free constraint, the set of link lamdas may be different for different links of a possible end to end path of a service level.

Building and Maintaining Network Topology Databases with a Set of Connectivity Constraints While various techniques are described with reference to the building and maintaining of network topology databases with a set of connectivity constraints, it is understood that this is an aspect of the invention independent of other aspects of the invention; thus, the invention is not limited to the exemplary techniques of building and maintaining network topology databases with a set of connectivity constraints as described herein.

Overview

Figure 13:
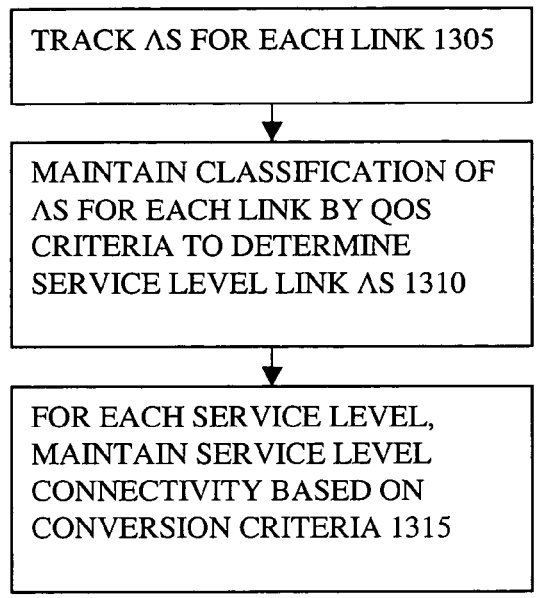
FIG. 13 is a flow diagram for building and maintaining network topology databases with a set of connectivity constraints according to certain embodiments of the invention.

FIG. 13 is a flow diagram for building and maintaining network topology databases with a set of connectivity constraints according to certain embodiments of the invention. It should be understood that different ones of the blocks in FIG. 13 could be performed in a distributed and/or centralized manner as described in more detail below.

In block 1305, the lamdas for each link are tracked and control passes to block 1305. While certain embodiments of the invention use a link management protocol (LMP) to discover the adjacent links between nodes, alternative embodiments of the inventions may use other techniques (e.g., a manual input technique into each node, a manual input technique into a centralized network management server, etc.). In addition, while certain embodiments of the invention include a monitoring unit in one or more nodes of the network to measure wavelength parameters, alternative embodiments of the invention can use other techniques (e.g., periodic external testing devices, manual input into to each node of wavelength parameters, manual input of wavelength parameters into a centralized network management server, etc.).

As shown in block 1310, a classification by QoS criteria is maintained for the lamdas of each link to determine the service level link lamdas and control flows to block 1315. While in certain embodiments block 1310 is performed by each node for its adjacent links, alternative embodiments of the invention use an alternative technique (e.g., a centralized network management server performs block 1310 responsive to receiving wavelength parameter information as discussed with reference to block 1305).

In block 1315, the service level connectivity based on the conversion criteria is maintained for each service level. The service level connectivity that is maintained would include the available lamdas and the status as either allocated or unallocated (see FIGS. 3–5 and associated description above). While in certain embodiments of the invention, the service level connectivity is built in distributed fashion and maintained in the access nodes, alternative embodiments of the invention use alternative techniques (e.g., perform such in a centralized network management server). The conversion criteria represent the number of wavelength conversions allowable for a given optical circuit. For example, if one of the connectivity constraints is a conversion free connectivity constraint, the number of wavelength conversions allowable is zero.

Figure 14:
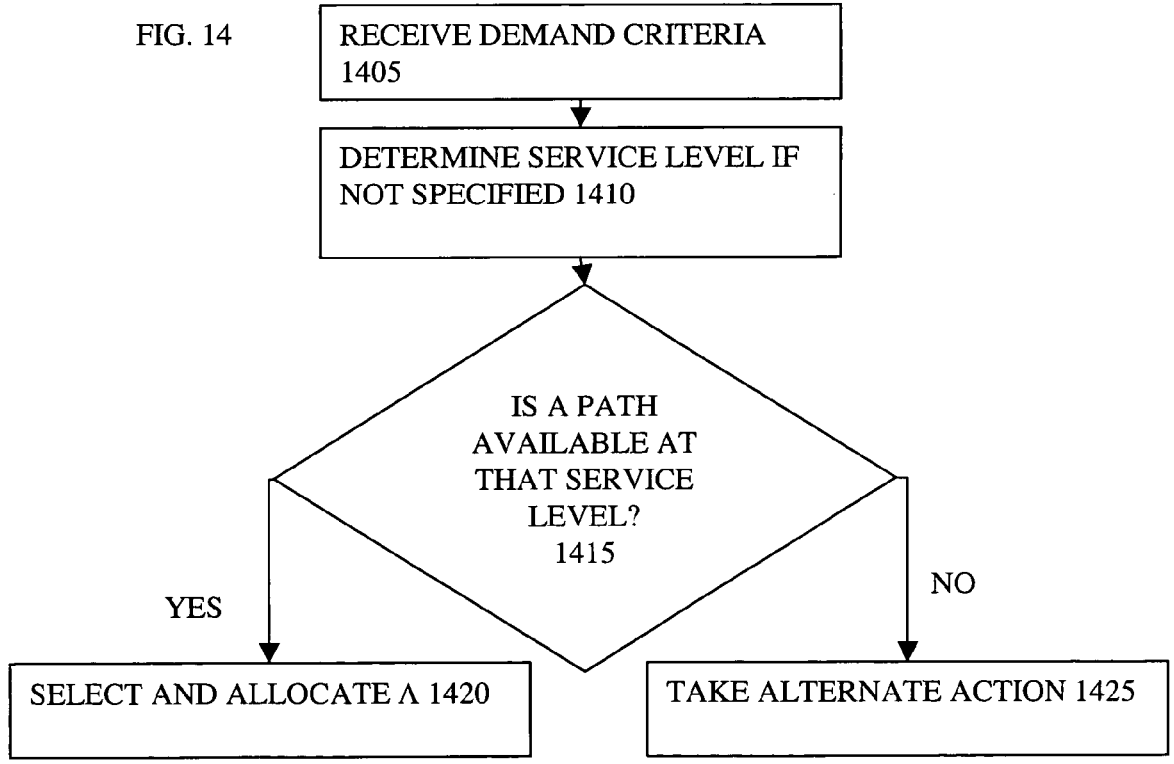
FIG. 14 is a flow diagram illustrating the provisioning of lightpaths according to certain embodiments of the invention.

FIG. 14 is a flow diagram illustrating the provisioning of lightpaths according to certain embodiments of the invention. Different embodiments of the invention may implement such provisioning using a source based, centralized, hybrid, or other provisioning scheme.

In block 1405, demand criteria are received. This demand criteria represents a request for a communication path (e.g., an optical circuit, a lightpath, a end-to-end uni-directional path, etc.). From block 1405, control passes to block 1410. In certain embodiments of the invention using a source based scheme, the demand criteria is received by an access node in the optical network. In other embodiments of the invention using a centralized network management server, such demands are received by the network management server directly from the requestor and/or from an access node in the optical network receiving the demand criteria. Of course, alternative embodiments of the invention can use other schemes and/or implement the schemes in other ways.

As shown in block 1410, the service level is determined if it was not specified and control passes to block 1415. For instance, while certain demand requests may come from entities aware of the service levels provided by the optical network, other entities making requests may not. These later entities may either not include any parameters or include parameters from which a service level can be determined.

In block 1415, it is determined if there is an end to end path available at the determined service level. If there is a path available, control passes to block 1420. Otherwise, control passes to block 1425.

In block 1420, a path and necessary lamda(s) are selected and allocated. The number of different wavelengths allocated will depend upon the wavelength conversion criteria (e.g., where a conversion free connectivity constraint is used, the same wavelength(s) will be used across each link of the selected path). Since this allocation affects the service level connectivity of block 1315, block 1315 is updated (e.g., some action is taken responsive to the allocation, periodic checks of the formed, etc.). In certain embodiments of the invention using a source based scheme, the source node performs block 1420 by: 1) selecting the path and lamda(s) (see FIGS. 6–7 and associated description); and 2) communicating with the other nodes of the optical network to allocate. In other embodiments of the invention in which a centralized network management server is used, block 1420 is performed by a network management server performing the selection (again, see FIGS. 6–7 and associated description) and communicating the allocation to the nodes on the path. Of course, alternative embodiments of the invention could implement other schemes in other ways.

In block 1425, alternative action is taken depending upon the manner in which the optical network is administered. For instance, one or more of the following may be options: using a path from a higher service level, muxing two or more paths from lower service levels, allocating a single path from a lower service level, denying, allowing for an increased amount of wavelength conversions to occur, etc.

In addition to the need to allocate responsive to demand criteria, other operations are performed as part of administration of the optical network (e.g., deallocation, addition of a new wavelength, addition of a new link, failure/restoration of a wavelength, failure/restoration of a link, failure/restoration of a node, etc.). One or more blocks of FIG. 13 are updated responsive to these changes in order to provide for a current view the optical network. For instance, if a request was made to deallocate a path, the node that initiated the allocation (source) is instructed to deallocate the path and block 1315 updates the service level connectivity of the service level, including the path that was deallocated. The addition of a wavelength, link or node (as well as the removal of a wavelength, link, or a node which was carrying no live traffic) results in an updating through blocks 1305, 1310 and 1315. The loss of a wavelength, link or node is treated as a failure upon which some action is taken depending upon the redundancy scheme being implemented (different embodiments of the invention can use different redundancy schemes) or an elimination of that wavelength, link or node from the network.

It should also be noted that a request to change the demand criteria for a given provisioned service (e.g., a request to lower or raise the service level of a given provisioned service) is also addressed by certain embodiments of the invention. In particular, certain such embodiments respond to such requests by allocating a new path, and if successful and necessary, moving the traffic from the old path to the new allocated path and deallocating the old path. While different embodiments can perform the above using of variety of different techniques, embodiments using a source based scheme are discussed by way of example, and not by limitation, below.

Exemplary Distributed Search Technique

Certain embodiments of the invention will now be described with reference to a distributed search based technique for building and maintaining in source nodes network topology databases based on a set of connectivity constraints that includes QoS criteria and conversion free constraints. However, it should be understood that alternative embodiments may use a distributed technique, but not build and maintain the service level topology databases in the source nodes (e.g., they may be built and maintained in a centralized network management server). In addition, while a distributed search based technique is described, alternative embodiments can use alternative techniques (e.g., a centralized technique). Similarly, alternative embodiments of the invention may not include the conversion free connectivity constraint, or relax it when necessary (e.g., when there is no conversion free end to end path at the requested service level).

Figure 15:
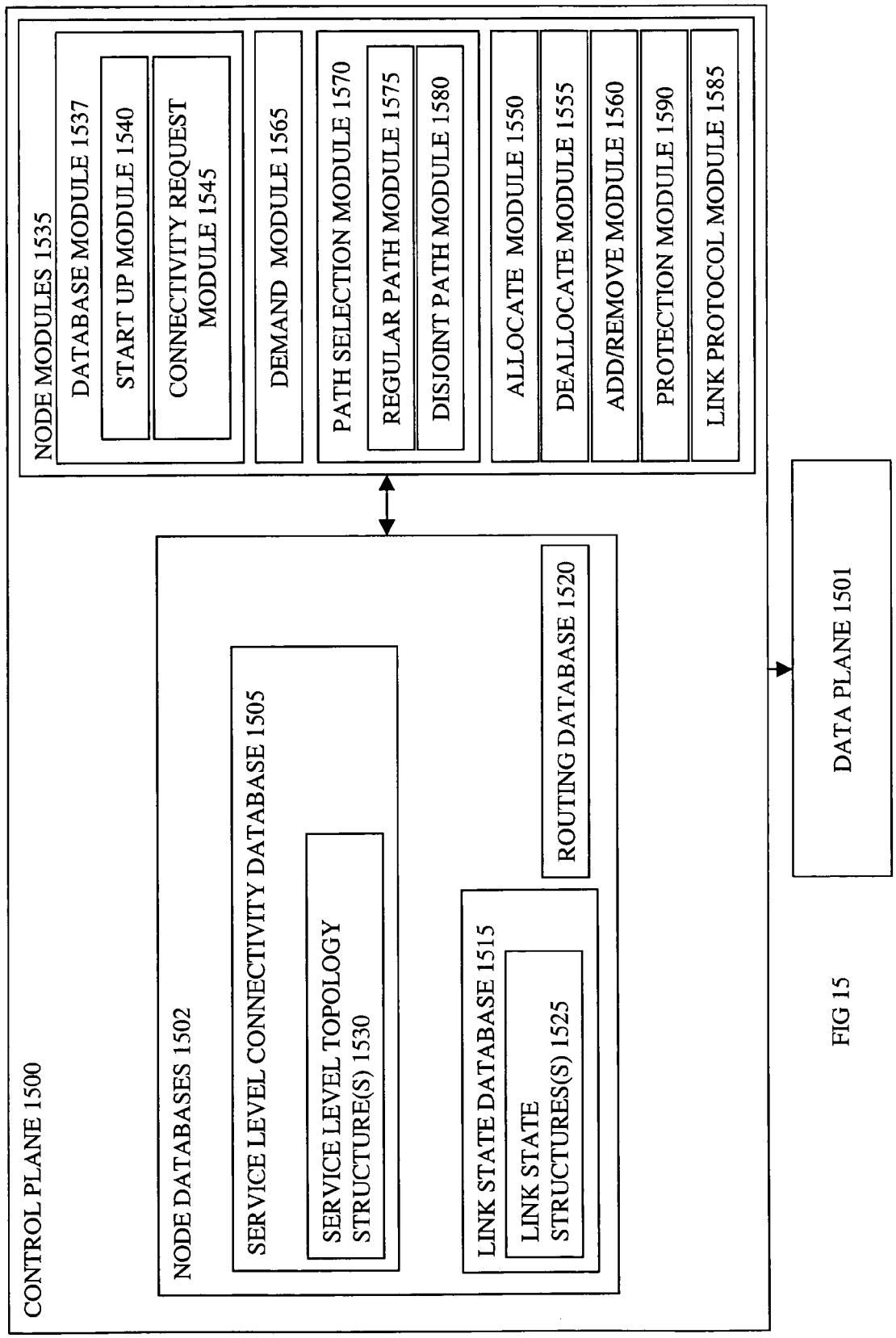
FIG. 15 is a block diagram illustrating an exemplary access node according to certain embodiments of the invention.

FIG. 15 is a block diagram illustrating an exemplary access node according to certain embodiments of the invention. FIG. 15 shows a control plane 1500 coupled with a data plane 1501. The control plane 1501 includes node databases 1502 coupled with node modules 1535. Of course, the control plane 1500 includes other items FIG. 15 shows the node databases 1502 include a service level connectivity database 1505, a service level parameter database 1510, a link state database 1515, and a routing database 1520. Similar to the link state database 815 of FIG. 8, the link state database 1515 includes a set of one or more link state structures 1525, one for each link connected to that node. While in certain embodiments these links are discovered through a link management protocol (e.g., link protocol module 1585), alternative embodiments could use other techniques as described above. Each link state structure records a neighboring node, a port through which that neighboring node is connected (fiber links end up at a port on the node), available wavelengths on that link (through the port), as well as each wavelength's parameters.

The service level parameter database 1510 stores the service level parameters previously discussed herein. The service level connectivity database includes a set of one or more service level topology structures 1530, one for each service level (e.g., a database as described in FIGS. 3–5 and related description for each service level). Each of these service level topology structures stores a representation of the conversion free service level topology for that node (e.g., see FIGS. 11A–C). Similar to the routing database 820, the routing database 1520 stores the configuration of the cross connect of the node.

The node modules 1535 include a database module 1537, a demand module 1565, a path selection module 1570, a start up module 1540, a connectivity request module 1545, an allocate module 1550, a deallocate module 1555, an add/remove module 1560, a protection module 1590, and link protocol module 1585.

Similar to the database module 840, the database module 1537 builds and maintains the service level connectivity database 1505. The database module 1537 includes a startup module 1540 and a connectivity request module 1545.

The demand module 870 receives demands for new path/wavelength combinations and invokes the path selection module 875 and allocate module 850. There are various mechanisms through which such a demand for a path may be received by the access node. For instance, in certain embodiments of the invention OIF-UNI and/or OIF-NNI interfacing protocols are used to communicate with nodes and domains, respectively, which do not support GMPLS or MPLS. Based on the demand, the set of path selection criteria (see FIGS. 6–7 and associated text) is determined, which set will additional include a service level. The demand module 870 then: 1) invokes the path selection module 1575 to select one or more path/wavelength combination(s) on that service level; and 2) if path selection was successful, invokes the allocate module 1550 to allocate each of the one or more path/wavelength combinations (similar to block 1405 of FIG. 14).

Similar to the path selection module 870, the path selection module 1575 includes a regular path module 1575 and a disjoint path module 1580. In addition, the path selection module 1575 receives requests for paths and the path selection criteria previously described and invokes the appropriate one(s) of the regular path module 875 and disjoint path model 1580. In at least certain embodiments of the invention, the regular path module 1575 and the disjoint path module 1580 respectively perform the operations in FIGS. 6A and 6B. It should be understood that the path selection module would parse the service level topology structure for the identified service level topology. It should also be understood that the alternative actions discussed in block 1425 are applicable here. While in certain embodiments, the service level topology structure is parsed responsive to a demand, alternative embodiments of the invention generate derivative structures that are faster to parse and/or pre-select (and may pre-allocate) various paths (e.g., see discussion later herein).

Similar to the allocate module 850, the allocate module 1550 causes the selected path/wavelength combinations to be allocated (e.g., the access node's cross connect, routing database 1520, and service level connectivity database 1505, as well as communication to other nodes). Similar to the deallocate module 855, the deallocate module 1555 causes path/wavelength combinations to be deallocated. Similar to the add/remove module 860, the add/remove module 1560 addresses additions and removals of channels, links, and nodes in the optical network. Similar to the protection module 890, the protection module 1580 is called responsive to the add/remove module 1560 to implement a redundancy scheme. Exemplary manners of implementing the start up module 1540, connectivity request module 1545, allocate module 1550, deallocate module 1555, and add/remove module 1560 are described respectively with respect to FIGS. 17–18, 19, 20–22, 23–24, and 25–33.

Start Up

Figure 16:
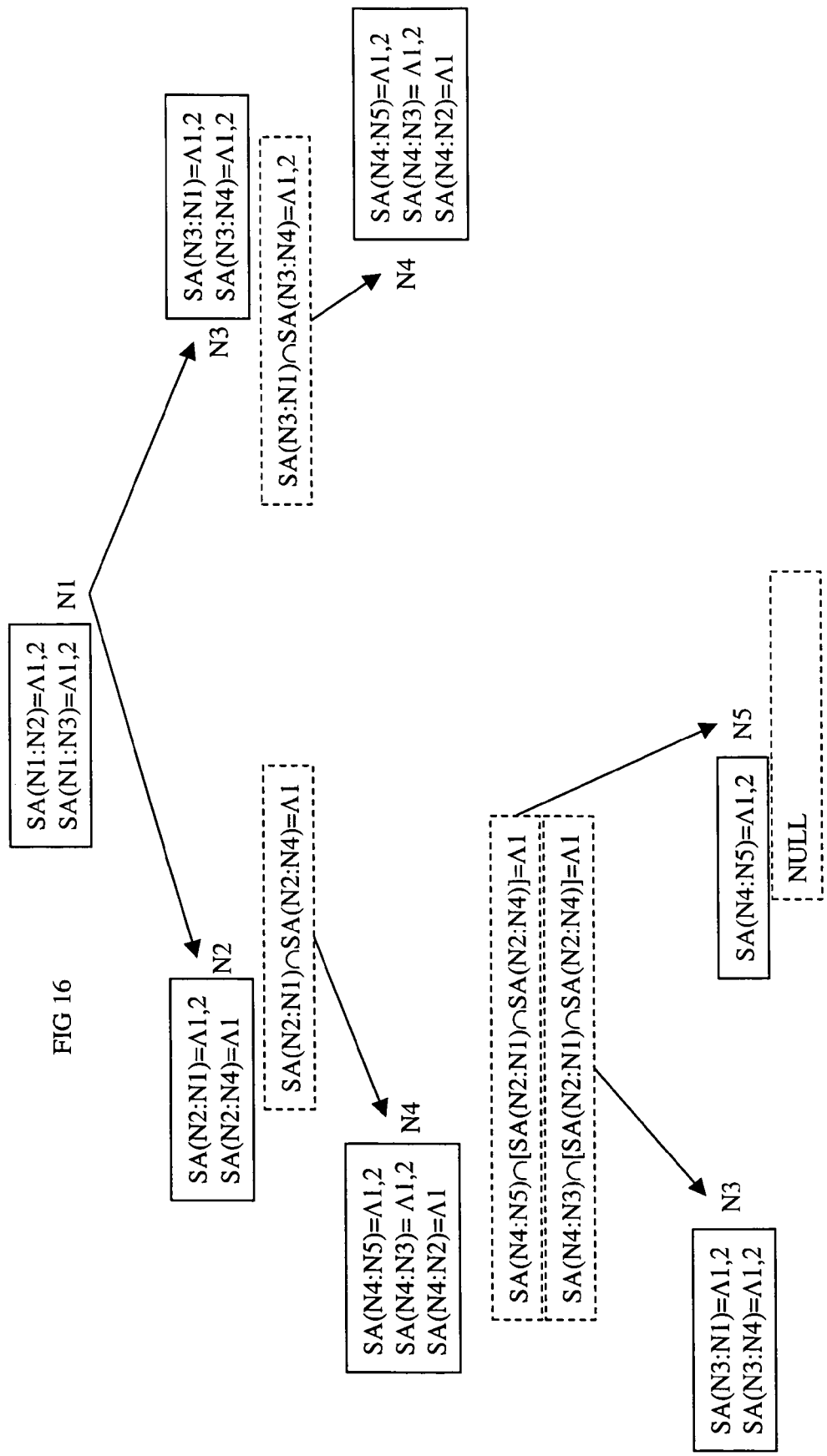
FIG. 16 is an exemplary data flow diagram of a distributed search based technique's formation of service level A's service level topology for N1 of the optical network in FIG. 10 according certain embodiments of the invention.

FIG. 16 is an exemplary data flow diagram of a distributed search based technique's formation of service level A's service level topology for N1 of the optical network in FIG. 10 according certain embodiments of the invention. FIG. 17–19 are flow diagrams for a distributed search based technique for building service level topologies, using a set of connectivity constraints including QoS criteria and conversion free criteria, in access nodes of an optical network. To provide an example, FIGS. 17–19 will be described with reference to the exemplary data flow diagram of FIG. 16. The operations of this and other flow diagrams will be described with reference to the exemplary embodiments of the other diagrams. However, it should be understood that the operations of the flow diagrams can be performed by embodiments of the invention other than those discussed with reference to these other diagrams, and the embodiments of the invention discussed with reference these other diagrams can perform operations different than those discussed with reference to the flow diagrams.

FIG. 17 is a flow diagram performed by each access node when joining an optical network according to embodiments of the invention. This flow diagram begins responsive to provision of wavelength parameters and service level parameters (905). With reference to the databases in FIG. 15, this would occur responsive to the populating of the service level parameter database 1510 and the link state database 1515. In certain embodiments, the service level parameter database is populated by the service provider through the network management interface.

In block 1710, the number of service levels are determined and control passes to block 1715. In certain embodiments of the invention, block 1710 is performed by parsing the service level parameter database.

As shown in block 1715, for each link to an adjacent node, the lamdas on that link are classified by the service level parameters to form link service level channel sets. With reference to FIG. 16, the link service level channel set for service level A for each node shown in FIG. 16 is illustrated by a box next to that node. From block 1715, control passes to block 1720.

In block 1720, a service level topology build-up is initiated for each service level.

FIG. 18 is a flow diagram illustrating a service level topology build-up for a single service level according to embodiments of the invention. Thus, the flow of FIG. 18 would be performed for each service level responsive to block 1720.

In block 1805, a service level topology structure is instantiated and populated with any qualifying adjacent nodes (adjacent nodes for which this source node has any non-null link service channel sets at this service level) and control passes to block 1810. With reference to FIG. 16, N1 would instantiate a service level topology structure 1530 in its service level connectivity database 1505. The service level topology structure would include at its root N1, as well as a branch to each of N2 and N3.

As shown, in block 1810, connectivity request message(s) are transmitted to the qualifying adjacent node(s) and control passes to block 1815. In certain embodiments of the invention, each connectivity request message includes a request ID, a source node ID, a forward node ID, a service level, and a computed set (a set of one or more paths, as well as the path service level channel set for each). While all of these fields are not needed for block 1810 (e.g., the source node is the same as the forward node, the needed information in the computed set is already known by the adjacent nodes), they are used as the search moves through the network (see FIG. 19). While in certain embodiments of the invention each connectivity request message includes the above noted fields, alternative embodiments could be implemented other ways (e.g., while full versions of connectivity request message could be used for FIG. 19, reduced versions of connectivity request messages could be used for block 1810; such reduced versions could include simply the request ID, source node ID, and service level). With respect to FIG. 16, N1 transmits a connectivity request message to each of N2 and N3 (the source node ID is N1, and the service level is A).

In block 1815, the service level topology structure is updated responsive to connectivity response messages received. The nodes transmitting such connectivity response messages and the contents of such connectivity response messages are described later herein with respect to FIG. 19. For instance, upon receipt of a connectivity response message, the received data is added to the appropriate branch of the appropriate service level topology structure. Upon receipt of a connectivity stop message, the path, identified in the received message, of the service level topology structure, for the service level identified in the received message, is complete. With respect to the example optical network described herein, the service level topology structure for service level A would represent something similar to that shown in FIG. 11A with an organization and structure the same as or similar to FIGS. 3–5 and the associated description. It should also be noted that, at least in certain embodiments of the invention, such database is maintained during operation of the access node (as opposed to being flushed and recalculated on a periodic basis as in the case with OSPF-TE graphs); that is, it is not rebuilt unless there is some failure that compromises it.

FIG. 19 is a flow diagram illustrating operations performed by nodes responsive to a connectivity request message received over a link according to certain embodiments of the invention. With respect of FIG. 16, node N2 receives the connectivity request message from node N1.

In block 1910, it is determined if the connectivity request message was previously processed. If so, control passes to block 1915; at which point this flow is complete. Otherwise, control passes to block 1920. A connectivity request message could have been previously processed because it was received from a different adjacent node. The determination as to whether a connectivity request message was previously processed could be performed in a number of different ways. For example, in an embodiment in which connectivity request messages include the request ID and the source node ID, this determination can be made by comparing this request ID and source node ID of the current connectivity request message to a log of such for previous connectivity request messages.

As shown in block 1925, the intersection of the received path service level channel set for the path to this node with the link service level channel set for each propagation port is determined. From block 1925, control passes to block 1930. The phrase propagation port is used to refer to any ports other than: 1) the one the connectivity request message was received on; and 2) a port connected to the source node (i.e., the source node is adjacent to this node). In certain embodiments of the invention, the propagation ports are determined by selecting links from the link state database that are not connected to the forward node ID and source node ID identified in the connectivity request message. With reference to FIG. 16, since N2 received the connectivity request over the link to N1 and since N1 is the source node, N2 would select the port through which a link to node N4 is connected. N2 would then determine the intersection of the path service level channel set for N1:N2 with the link service level channel set for N2:N4. This intersection set is the path service level channel set for N1:N2:N4 and is included in the computed set (path service level channel sets are shown in FIG. 16 by dashed boxes, such as the one under N2). Specifically, N2 determines the intersection of the path service level channel set (SA (N1:N2)=lamda 1, 2) and the link service level channel set (SA (N2:N4)=lamda 1) to be lamda 1 (which is also represented herein using the format SA (N1:N2:N4)=lamda 1).

Thus, the computed set represents the intersection of the preceding link service level channel sets for the path the connectivity request message has traveled. In the case of block 1810, the computed set is the same as the link service level channel set for the link over which the connectivity request message was transmitted. However, as the connectivity request message gets retransmitted to other nodes, the computed set will represent the paths traveled and the intersection set for each such path.

In block 1930, it is determined if there are any non-null intersection sets. If so, control passes to block 1940. Otherwise, control passes to block 1935.

As shown in block 1940, a connectivity response message, with the intersection set(s) as path service level channel set(s), is transmitted to the source node and control passes to block 1945. In certain embodiments of the invention, each connectivity response message includes the service level, request ID, response node ID, and computed set. With regard to node N2, N2 would transmit to N1 a connectivity response message including as the computed set N1:N2:N4, lamda 1.

In block 1945, a connectivity request message, with the intersection set(s) as path service level channel set(s), is transmitted on the propagation ports and control passes to block 1915. With regard to node N2, N2 would transmit to N4 a connectivity request message. With regard to embodiments of the invention in which connectivity request messages include request ID, a source node ID, a forward node ID, a service level, and a computed set, N2 would respectively fill these fields with the request ID, N1, N2, A, and the computed set N1:N2:N4, lamda 1.

In block 1935, a connectivity stop message is transmitted back to the source node and control passes to block 1915. In certain embodiments, such a connectivity stop message includes the source node ID.

To complete the example of FIG. 16, responsive to the connectivity request message from N1, N3 determines the intersection set to N4 for service level A. N3 transmits this intersection set back to N1 in a connectivity response message, as well as to N4 in a connectivity request message. Meanwhile, responsive to N2's connectivity request message, N4 determines intersection sets to N3 and N5 for service level A. N4 transmits these back to N1 in a connectivity response message and transmits these to N3 and N5 in connectivity request messages. Responsive to N4's connectivity request messages: 1) N3 does nothing because it has seen this request ID before (the above connectivity request message from N1); and 2) N5 transmits back to N1 a connectivity stop message. Responsive to N3's connectivity request message, N4 does nothing because it has seen this request ID before (the above connectivity request message from N2).

Allocate

Figure 20:
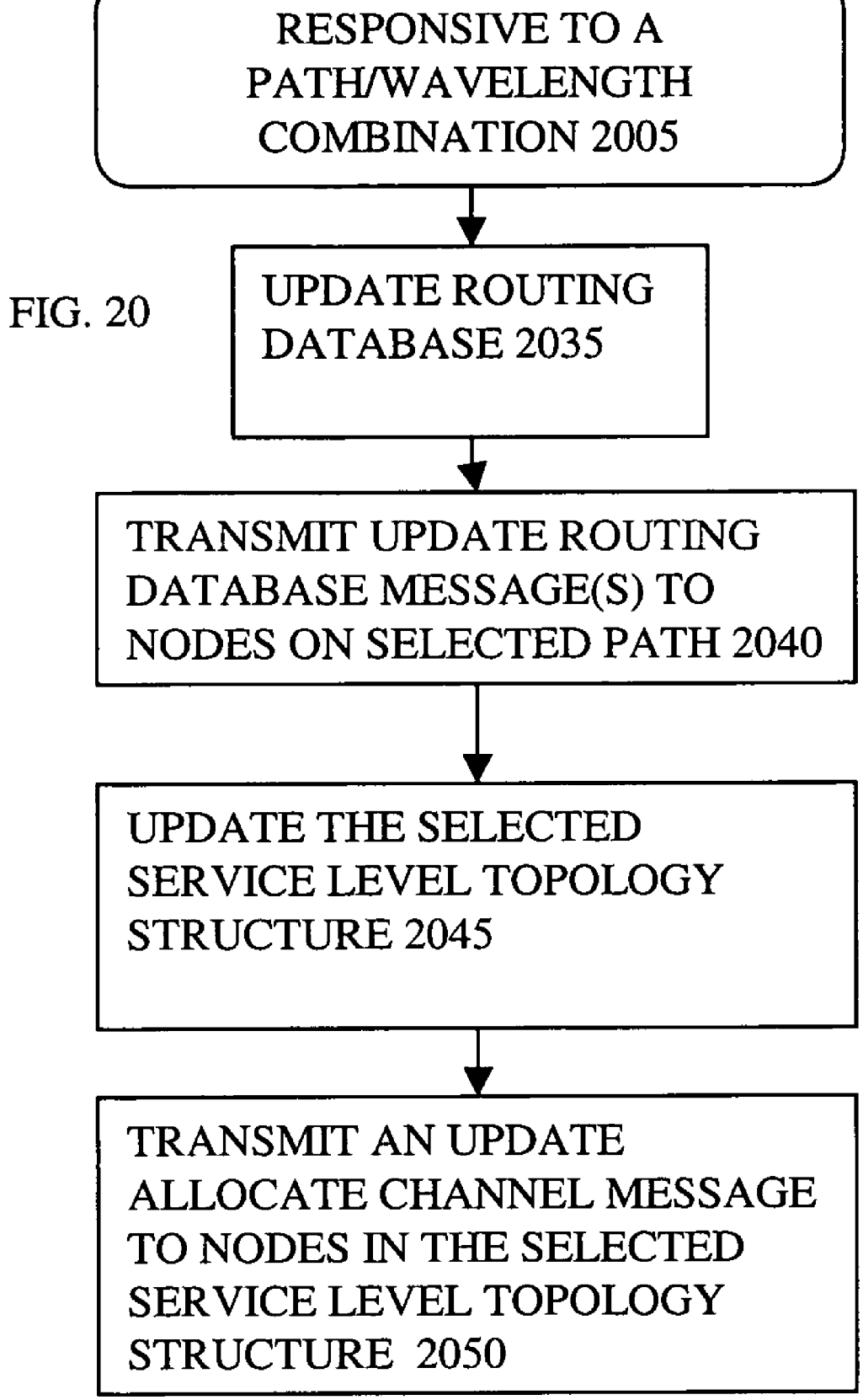
FIG. 20 is the flow diagram illustrating operations performed by an access node to allocate a path according to certain embodiments of the invention.
Figure 21:
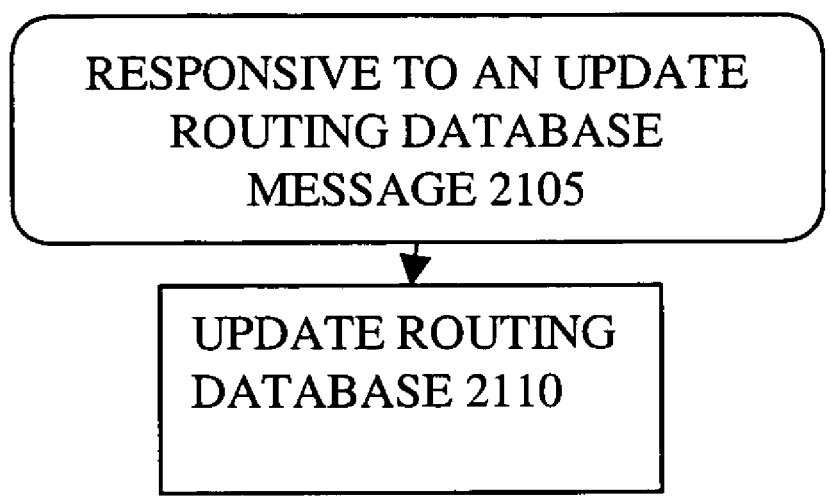
FIG. 21 is a flow diagram illustrating operations performed by an access node responsive to an update routing database message according to certain embodiments of the invention.
Figure 22:
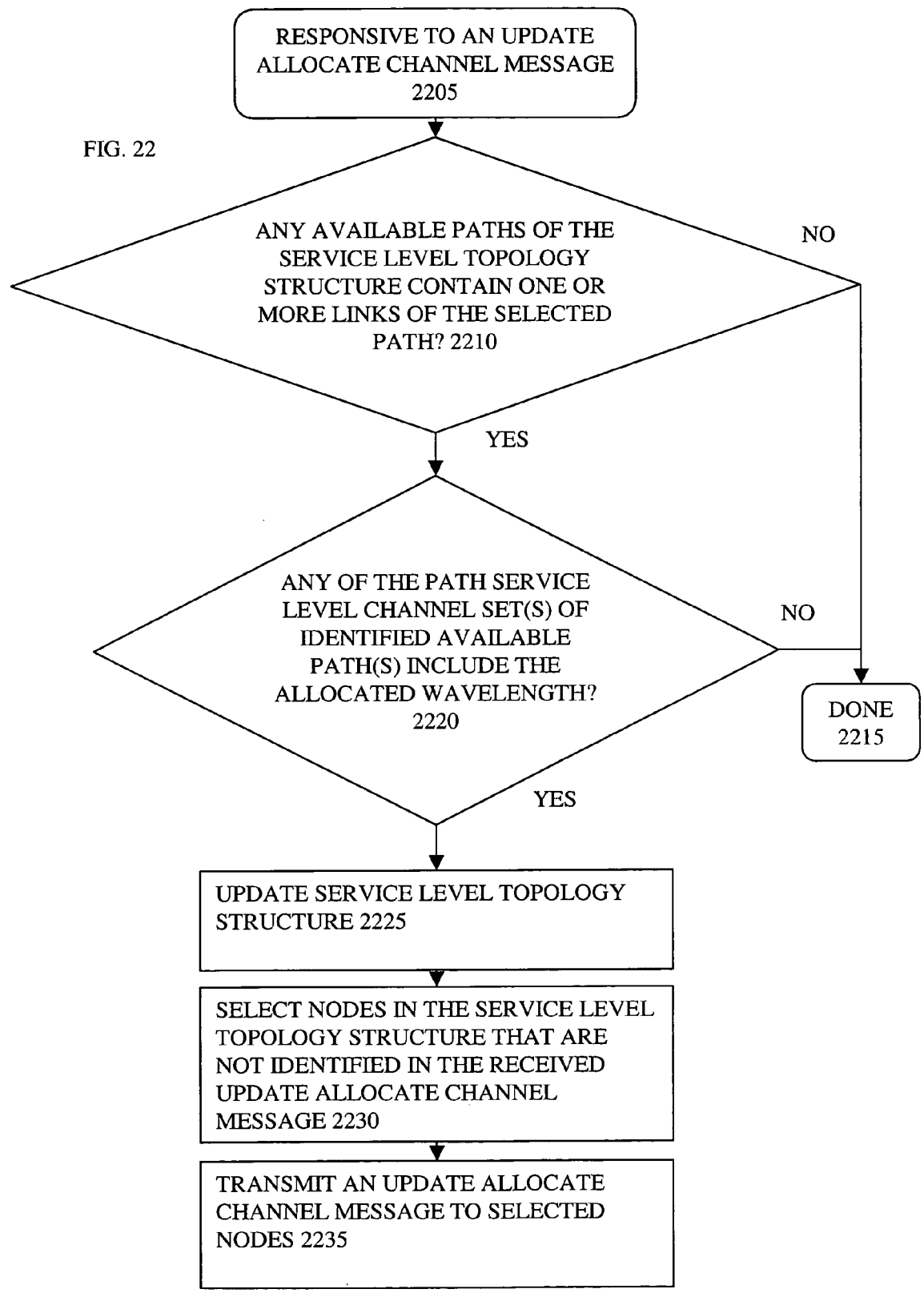
FIG. 22 is a flow diagram illustrating operations performed by an access node responsive to an update allocate channel message according to certain embodiments of the invention.

FIGS. 20–22 are flow diagrams illustrating the allocation of a path according to certain embodiments of the invention. FIG. 20 is the flow diagram illustrating operations performed by an access node to allocate a path according to certain embodiments of the invention. The operations in FIG. 20 result in: 1) update routing database message(s) being sent to the nodes along the selected path being allocated; and 2) update allocate channel message(s) being sent to certain nodes. FIG. 21 is a flow diagram illustrating the operations performed by an access node responsive to an update routing database message according to certain embodiments of the invention; FIG. 22 is a flow diagram illustrating the operations performed by an access node responsive to an update allocate channel message according to certain embodiments of the invention.

In block 2005, a path/wavelength combination for a particular service level to be allocated is received and control passes to block 2035. As shown in block 2035, the routing database is updated and control passes to block 2040. The routing database is updated to reflect the connection of the incoming port identified in block 2005 with the outgoing channel: port of the selected path. In certain embodiments, responsive to the updating the routing database, well-known techniques are used to modify the data plane of the access node accordingly. Whether a path in the opposite direction is also allocated depends on whether the implementation requires all paths to be bi-directional and/or a bi-directional path was requested in the demand.

In block 2040, update routing database message(s) are transmitted to nodes on the selected path and control passes to block 2045. In certain embodiments of the invention, each update routing database message includes an update ID, as well as the channel and port information relevant to the recipient node of the message.

As shown in block 2045, the selected service level topology structure is updated and control passes to block 2050. In particular, the selected channel is marked as allocated in all path service level channel sets down stream of a link in the selected path. In other words, the selected channel is marked allocated in the path service level channel set(s) of the available path(s) that include one or more links of the selected path. To provide an example, assume the path N1:N2:N4 is allocated with lamda 1 in FIG. 10. With reference to FIG. 11A, lamda 1 would need to be marked as allocated from the path service level channel set of N1:N2, N1:N2:N4, N1:N2:N4:N3, N1:N2:N4:N5, and N1:N3:N4:N2 because each contains one or more links on the selected path. While in one embodiment block 2045 is performed at this point, in alternative embodiments of the invention the path selection module 1570 performs this update when the path and wavelength are selected.

In block 2050, an update allocate channel message is transmitted to nodes in the selected service level topology structure. In certain embodiments, each update allocate channel message includes an update ID, a service level, a path, an allocated channel, and a sent-to-set. The sent-to-set represents the set of nodes to which the message is going to be sent. While the nodes to which the message is to be sent can be determined in a variety of ways, certain embodiments of the invention parse the service level topology structure to identify all of the nodes (removing duplicates) apart from the source node.

FIG. 21 is a flow diagram illustrating operations performed by an access node responsive to an update routing database message according to certain embodiments of the invention. In block 2110, the routing database is updated. Block 2110 is performed in a similar fashion to block 2035 of FIG. 20. The receiving node's routing database is updated to reflect the connection identified in the received message. In certain embodiments, responsive to the updating of the routing database, well-known techniques are used to modify the data plane of the access node accordingly.

In alternative embodiments of the invention, the updating of the data plane and/or the updating of the routing database (e.g., blocks 2035, 2040, and FIG. 21) may be handled differently. For example, rather than modifying the data planes of the access nodes along the selected path responsive to the routing database, in certain alternative embodiments a signaling protocol (e.g., RSVP, CR-LDP, etc.) may be used on the source node, responsive to the demand and the selected path/wavelength combination, to: 1) cause modification of that access node's cross connect; and 2) signal the path (communicate with the other access nodes on the path to cause them to modify their cross connects). Where such a signaling protocol is used, either: 1) the routing database update (blocks 2035 and 2110) and update routing database message(s) are still sent (see block 2040 and FIG. 21); or 2) the routing databases are updated responsive to the signaling protocol and the update routing database message(s) need not be sent.

FIG. 22 is a flow diagram illustrating operations performed by an access node responsive to an update allocate channel message according to certain embodiments of the invention. In block 2210, it is determined if any of the available paths of the service level topology structure for the service level of the allocated path contain one or more links of the selected path. If not, control passes to block 2215 where the flow diagram ends. If so, control passes to block 2220. In certain embodiments of the invention, block 2210 is performed by parsing the appropriate service level topology structure to determine if any links on the selected path are represented therein.

As shown in block 2220, it is determined if any of the path service level channel set(s) of the available paths identified in block 2210 include the allocated wavelength. If not, control passes to block 2215. Otherwise, control passes to block 2225. In certain embodiments of the invention, block 2220 is performed by parsing the path service level channel set(s) of the identified path(s) to determine if the allocated wavelength is present.

As shown in block 2225, the selected service level topology structure is updated and control passes to 2230. In certain embodiments of the invention, block 2225 is performed by marking the allocated wavelength as allocated in the path service level channel set(s) identified in block 2220.

As shown in block 2230, nodes are selected from the service level topology structure that are not identified in the received allocate channel message and control passes to block 2235. In certain embodiments of the invention, block 2230 is performed by: 1) identifying as "new set" all of the nodes in the service level topology structure that are not in the sent-to-set in the received update allocate channel message (1405); and 2) forming an updated version of the sent-to-set that is the union of the new set and the sent-to set in the received update allocate channel message (1405).

In block 2235, an update allocated channel message is transmitted to the selected nodes. In certain embodiments of the invention, block 2235 is performed by transmitting an update allocate channel message with the updated sent-to-set to all nodes in the new set of block 2230.

Deallocate

Figure 23:
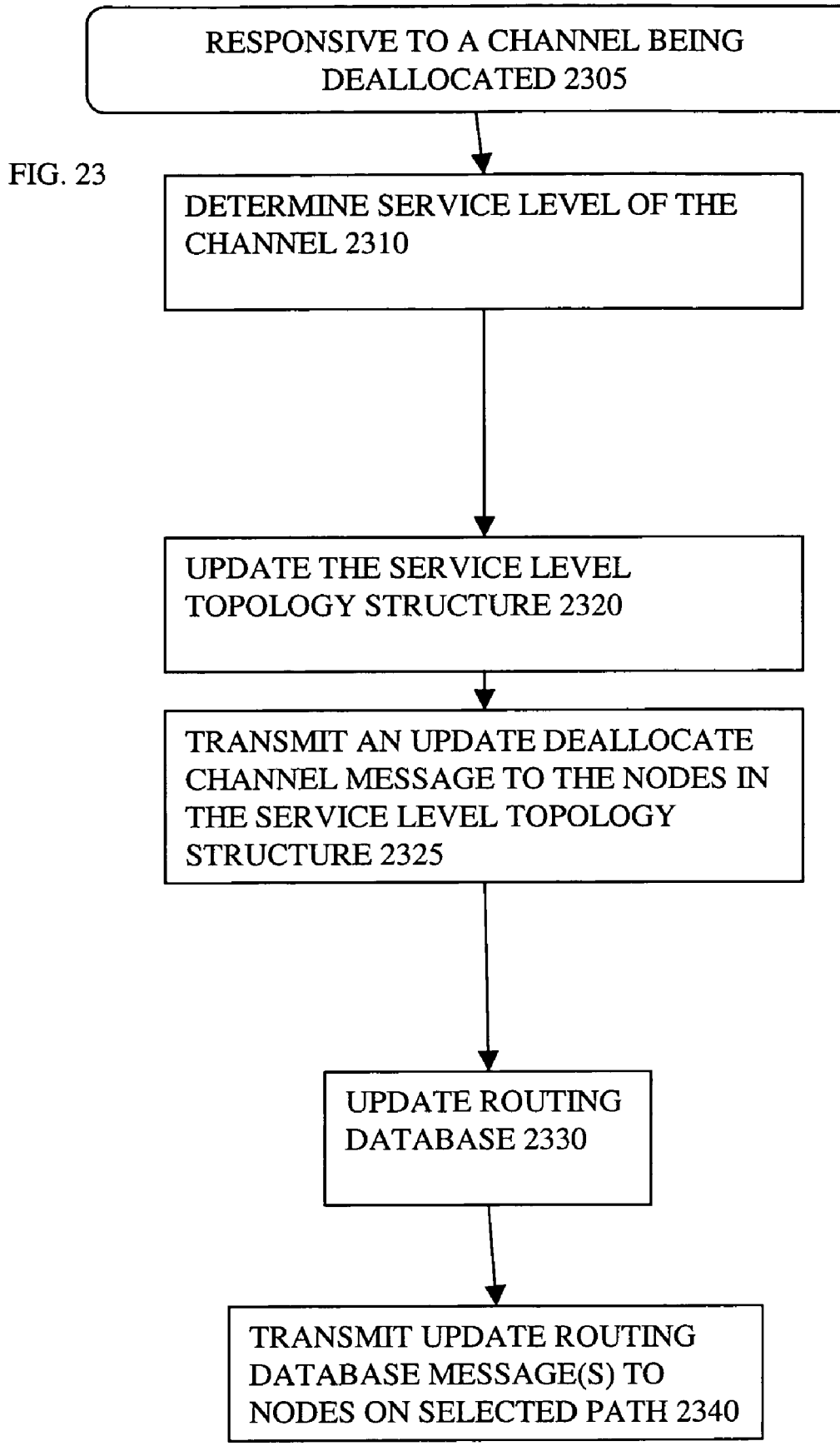
FIG. 23 is a flow diagram illustrating operations performed by the source node of a path responsive to that path being deallocated according to certain embodiments of the invention.
Figure 24:
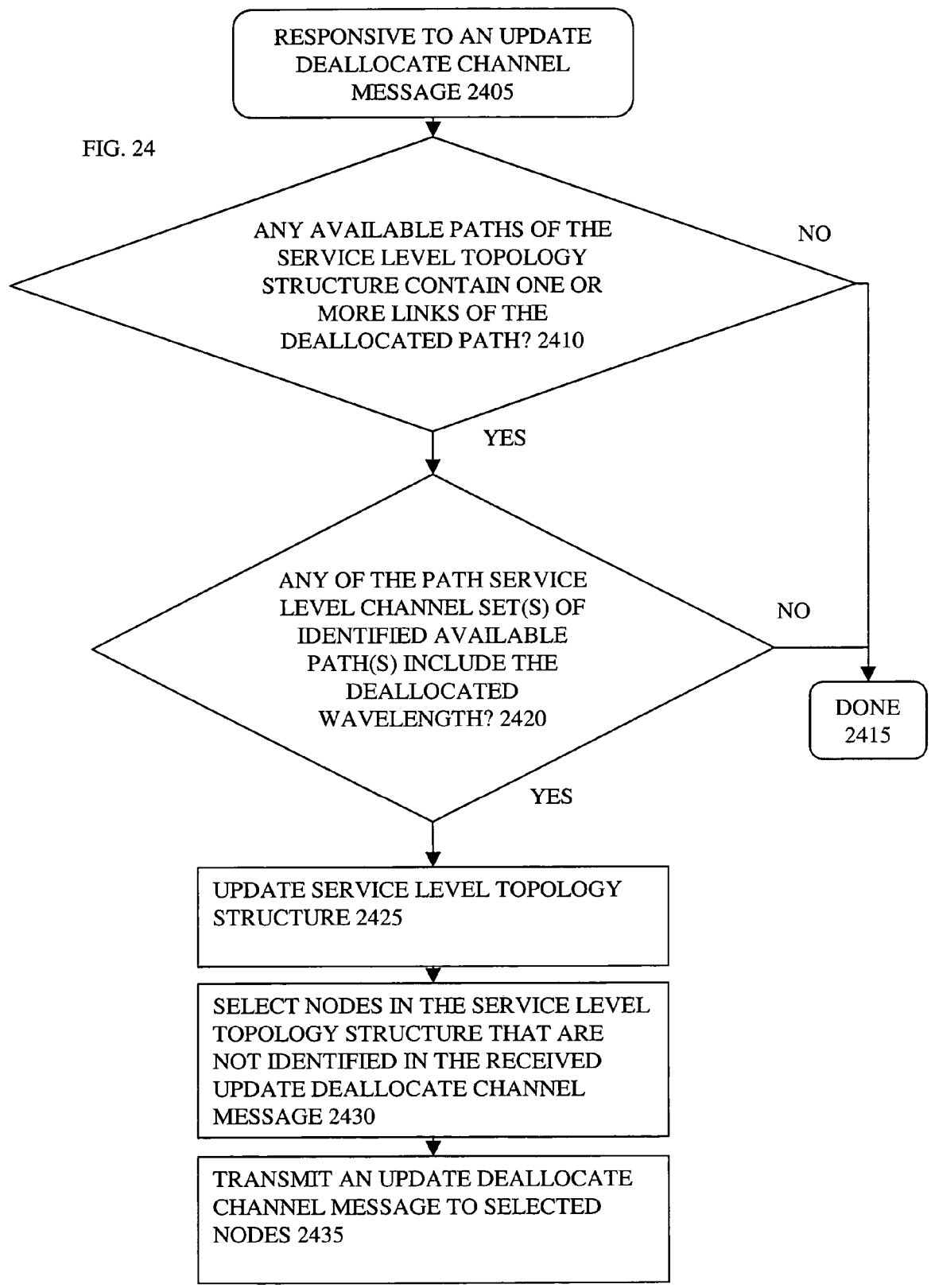
FIG. 24 is a flow diagram illustrating operations performed by access nodes responsive to an update deallocate channel message according to certain embodiments of the invention.

Responsive to a request to deallocate a channel (e.g., communication received by the source node for the path using the channel), signaling is used to disconnect the existing cross connects on the path. FIG. 23 is a flow diagram illustrating operations performed by the source node of a path responsive to that path being deallocated according to certain embodiments of the invention. As part of the flow diagram in FIG. 23, the source node of the path transmits update deallocate channel message(s) to certain other nodes. FIG. 24 is a flow diagram illustrating the operations performed by access nodes responsive to receiving an update deallocate channel message according to certain embodiments of the invention.

In block 2310, the service level of the channel being deallocated is determined and control passes to block 2315. In certain embodiments, the service level is determined by parsing the link state database to locate the channel being deallocated.

As shown in block 2320, the service level topology structure is updated and control passes to block 2325. Block 2320 is performed in a similar fashion to block 2045, with the exception that the channel is marked unallocated. In particular, the deallocated channel is marked as unallocated in all path service level channel sets down stream of a link in the deallocated path. In other words, the deallocated channel is marked unallocated in the path service level channel set(s) of the available path(s) that include one or more links of the deallocated path. To provide an example, assume the path N1:N2:N4 is deallocated with lamda 1 in FIG. 10. With reference to FIG. 11A, lamda 1 would need to be marked as unallocated from the path service level channel set of N1:N2, N1:N2:N4, N1:N2:N4:N3, N1:N2:N4:N5, and N1:N3:N4:N2 because each contains one or more links on the deallocated path.

As shown in block 2325, an update deallocate channel message is transmitted to nodes in the service level topology structure and control passes to block 2330. The set of nodes to which this message is sent is referred to the sent-to-set. In certain embodiments of the invention, the update deallocate channel message includes the source node ID, the adjacent node ID, the path, the channel deallocated, the update ID, the service level, and the sent-to-set. While the nodes to which the message is to be sent can be determined in a variety of ways, certain embodiments of the invention parse the service level topology structure to identify all of the nodes (removing duplicates) apart from the source node.

As shown in block 2330, the routing database is updated and control passes to block 2340. With reference to the exemplary embodiment of FIG. 15, the routing database 1520 would be modified to remove the connection of the deallocated channel. Whether a path in the opposite direction is also deallocated depends on whether the implementation requires all paths to be bi-directional and/or the path being deallocated was bi-directional.

In block 2340, update routing database message(s) are transmitted to nodes on the selected path. In certain embodiments of the invention, each update routing database message includes an update ID, as well as the channel and port information relevant to the recipient node of the message. A recipient access node responds to the receipt of such a message by modifying its routing database to reflect the disconnection of the incoming channel:port and the outgoing channel:port as specified in the message.

As previously described with reference to blocks 2035/2040 and FIG. 21, in certain embodiments of the invention, responsive to updating the routing database (blocks 2330 and 2340), well-known techniques are used to modify the data plane of the access node accordingly. As also previously described, alternative embodiments of the invention use a signaling protocol to cause modifications to the data plane, as well as, in certain of these embodiments, cause modifications to the routing database (making the need the update routing database messages optional).

In this manner, the nodes along the path are updated to reflect the deallocation; in addition, update deallocate channel messages have been sent to initiate any necessary updating at such nodes.

FIG. 24 is a flow diagram illustrating operations performed by access nodes responsive to an update deallocate channel message according to certain embodiments of the invention. In block 2410, it is determined if any of the available paths of the service level topology structure for the service level of the deallocated path contain one or more links of the deallocated path. If not, control passes to block 2415 where the flow diagram ends. If so, control passes to block 2420. In certain embodiments of the invention, block 2410 is performed by parsing the appropriate service level topology structure to determine if any links on the deallocated path are represented therein.

As shown in block 2420, it is determined if any of the path service level channel set(s) of the available paths identified in block 2410 include the deallocated wavelength. If not, control passes to block 2415. Otherwise, control passes to block 2425. In certain embodiments of the invention, block 2420 is performed by parsing the path service level channel set(s) of the identified path(s) to determine if the allocated wavelength is present.

As shown in block 2425, the selected service level topology structure is updated and control passes to 2430. In certain embodiments of the invention, block 2425 is performed by marking the deallocated wavelength as unallocated in the path service level channel set(s) identified in block 2420.

In block 2430, the nodes in the service level topology structure that are not identified in the received update deallocate channel message are selected and control passes to block 2435. In certain embodiments of the invention, block 2430 is performed by: 1) identifying as "new set" all nodes in the service level topology structure that are not in the sent-to-set in the received update deallocate channel message (1605); and 2) forming an updated version of the sent-to-set that is the union of the new set and the sent-to-set in the received update deallocate channel message (1605).

As shown in block 2435, an update deallocate channel message is sent to the selected nodes and control passes to block 2415. In certain embodiments of the invention, this update deallocate channel message includes the new sent-to-set determined in block 2430 as opposed to the sent-to-set in the received update deallocate channel message (1605).

Dynamic Provisioning

As previously noted, a request to change the demand criteria for a given provisioned service (e.g., a request to lower or raise the service level of a given provisioned service) is also addressed by certain embodiments of the invention. In particular, certain such embodiments respond to such requests by allocating a new path, and if successful and necessary, moving the traffic from the old path to the new allocated path and de-allocating the old path.

The reduced network topology database size (as compared to a physical network topology database) and distributed nature of this source based scheme allows for the provisioning of optical circuits in real-time (or on the fly; that is, the demands do not need to know ahead of time). Furthermore, the QoS based criteria allows for differentiation of traffic types at the optical layer. Thus, for example, a given service to a customer can be at a higher service level during the day, and dropped down to the lower service level at night. Of course, such switches can occur even more often.

In addition, implementations can push SONET out to the edge of the network. For instance, as opposed to carrying stacks of network layers (IP over ATM over SONET) over optical, network layers can be directly carried over optical (e.g., IP or ATM, or SONET).

Add and Remove Channels

When a channel is added or removed, the LSD is updated in the access nodes connected to the link (e.g., in certain embodiments of the invention, LMP recognizes the channel added or removed). FIGS. 25 and 26 are flow diagrams illustrating operations performed when either a channel is added or a channel without live traffic is removed according to certain embodiments of the invention. The operations of FIG. 25 are performed by the access nodes connected by the link on which the channel is added or removed (also referred to as the adjoining nodes or the access nodes made adjacent by that link). As part of these operations, an update add/remove channel message is transmitted to certain other nodes. The operations of FIG. 26 are performed by an access node responsive to such an update add/remove channel message.

FIG. 25 is a flow diagram illustrating the operations performed by the access nodes connected by the link on which the channel is added/removed according to certain embodiments of the invention. In block 2510, the service level of the channel is determined and control passes to block 2515. When a channel is being added, block 2510 is performed, according to certain embodiments of the invention, by comparing that channel's wavelength parameters to the service level parameters to classify it into one of the service levels. When a channel is being removed, block 2510 is performed, according to certain embodiments of the invention, by accessing the link state database of FIG. 15.

As shown in block 2515, a connectivity request message is transmitted on the link carrying the channel and control passes to blocks 2520 and 2525. Block 2515 is performed in a similar manner to block 2315 of FIG. 23.

In block 2520, the service level topology structure is updated responsive to connectivity response messages received. In certain embodiments of the invention, block 2520 is performed in a similar manner to block 1815 of FIG. 18 with a variation. Since certain data already exists in the service level topology structure, the received data in the connectivity response messages is used to update (add, remove, and/or alter) the existing service level topology structure. In the case of a channel removal, in certain embodiments of the invention, the channel on each path with the link may be either removed from the service level topology structure or marked broken. In the case of a channel addition where the channel already exists but is marked broken, in certain embodiments of the invention the channel may be marked unallocated.

As shown in block 2525, an update add/remove channel message is transmitted to the nodes in the service level topology structure that are not on the link with the channel. In certain embodiments of the invention, each update add/remove channel message includes an update ID, the wavelength, whether this is an addition or removal, the source node ID, the source adjacent node ID, the service level, and the sent-to-set. The source node and the source adjacent node identified are the access nodes connected by the link on which the channel was added/removed. The sent-to-set includes the nodes in the service level topology structure that the message is sent to in block 2525 (all nodes in the service level topology structure other than the source node and source adjacent node).

FIG. 26 is a flow diagram illustrating the operations performed by an access node responsive to receiving an update add/remove channel message according to certain embodiments of the invention. As shown in block 2610, it is determined if the service level topology structure includes path(s) with the link to which the channel was added/removed. If not, control passes to block 2615 where the flow diagram ends. If so, control passes to block 2620. In certain embodiments of the invention, block 2610 is performed by searching the service level topology structure (for the service level identified in the received update add/remove channel message) for the link identified in the received update add/remove channel message (based on the source node ID and source adjacent node ID contained therein).

In block 2620, connectivity request message(s) are transmitted on link(s) of these paths and control passes to blocks 2625 and 2630. In particular, the access node transmits a connectivity request message on each of its links that are part of these paths.

In block 2625, the service level topology structure is updated responsive to connectivity response messages received. Block 2625 is performed in a similar fashion to block 2520 of FIG. 25.

As shown in block 2630, nodes are selected from the service level topology structure that are not identified in the received update add/remove channel message and control passes to block 2635. In certain embodiments of the invention, block 2630 is performed by: 1) identifying as "new set" all of the nodes in the service level topology structure that are not in the sent-to-set in the received update add/remove channel message (1805); and 2) forming an updated version of the sent-to-set that is the union of the new set and the sent-to set in the received update add/remove channel message (1805).

In block 2635, an update add/remove channel message is transmitted to the selected nodes. As before, this update add/remove channel message will: 1) identify whether this is an addition or removal; and 2) include the updated sent-to-set as opposed to the sent-to-set in the received update add/remove channel message (1805).

With regard to the removal of a channel with live traffic, in certain embodiments of the invention, the source nodes of any allocated path(s) that includes the link and uses the removed channel execute a redundancy (protection) scheme. These source nodes can learn of the failure any number of ways (e.g., these access nodes may learn responsive to the operations in FIGS. 25 and 26—In particular, each involved access node (the access nodes connected by the link with the channel and the access nodes that receive an update add/remove channel message), determines if they are the source node of any allocated path(s) that includes the link and uses the removed channel).

Link Removal

Figure 27:
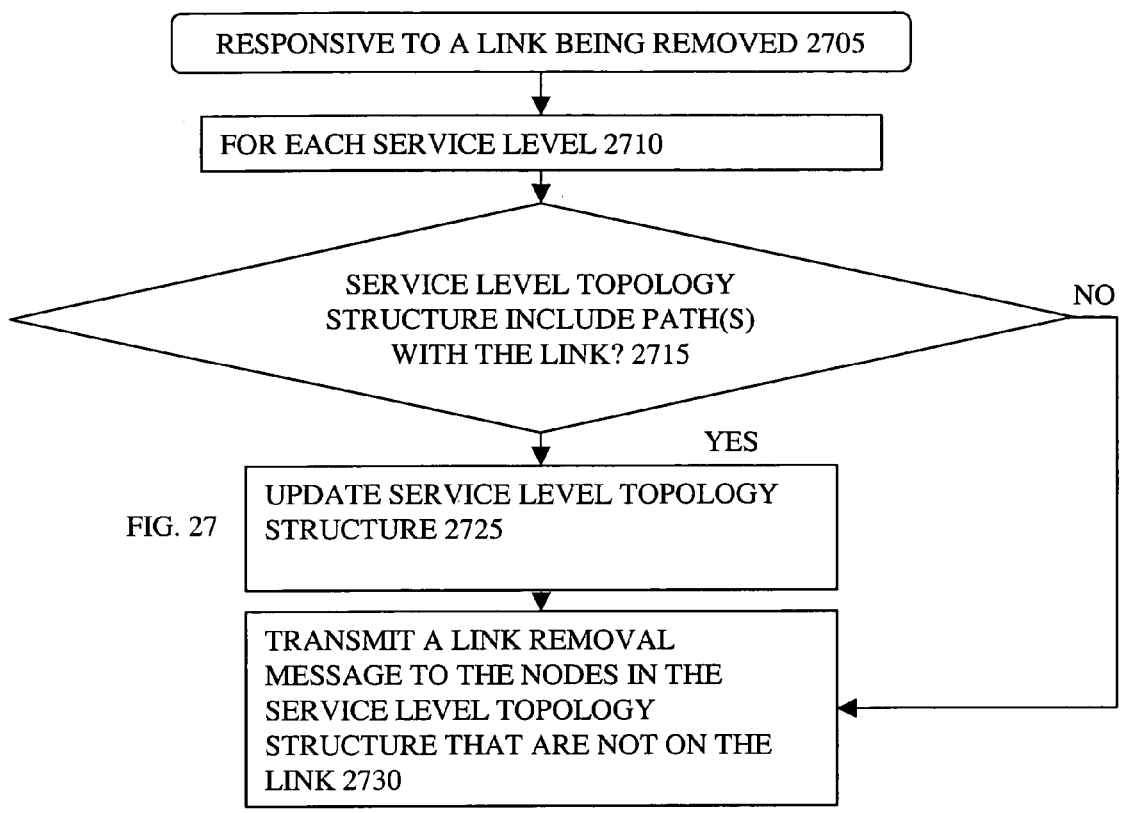
FIG. 27 is a flow diagram illustrating the operations performed by the access nodes connected by the removed link according to certain embodiments of the invention.
Figure 28:
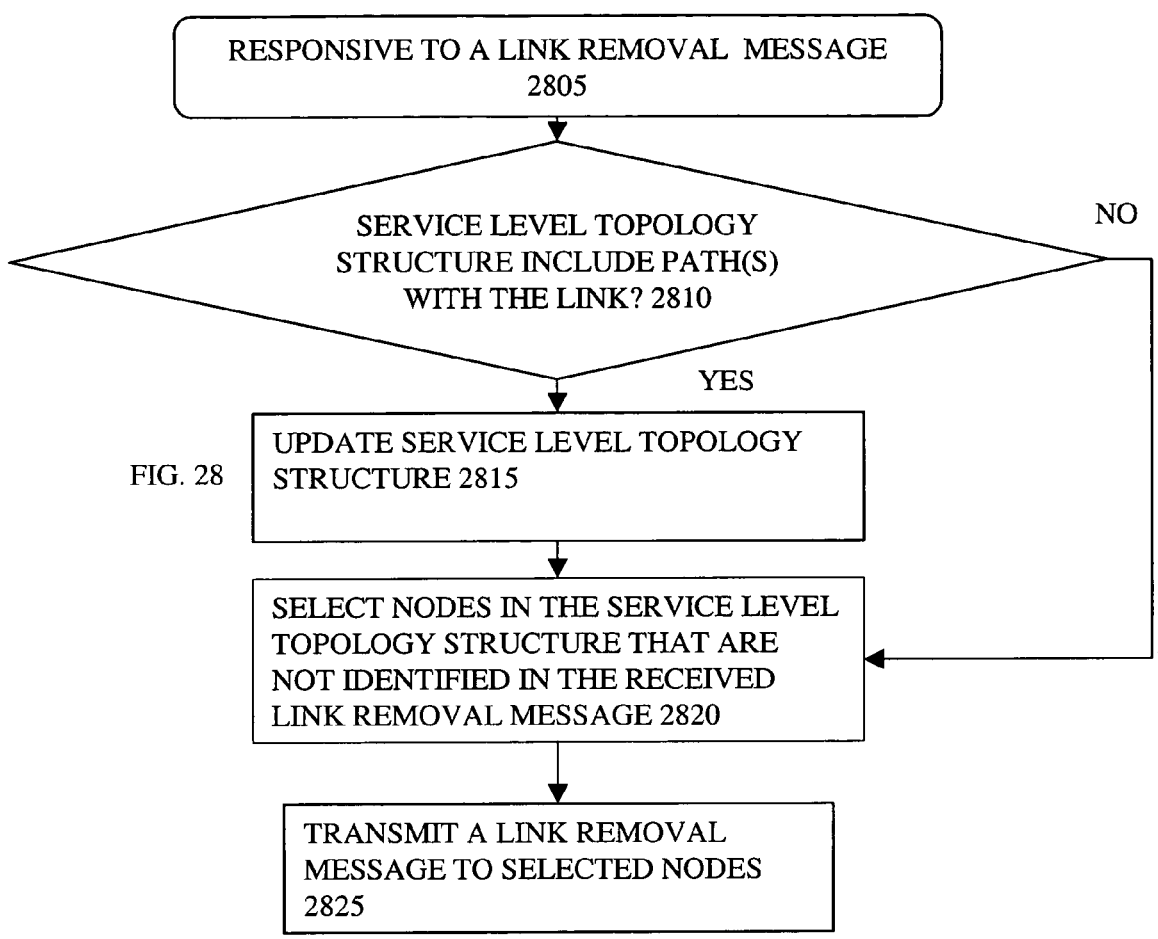
FIG. 28 is a flow diagram illustrating the operations performed by an access node responsive to receiving a link removal message according to certain embodiments of the invention.

When a link is removed (e.g., it fails or is permanently removed) between two nodes within the network, all the channels on that link are lost. When a link is removed, the LSD is updated in the access nodes connected to the link (e.g., in certain embodiments of the invention, LMP recognizes the removal of the link). While certain embodiments perform the channel removal operations of FIGS. 25 and 26 for each such channel, other embodiments of the invention reduce the number of messages generated by addressing the link as a whole. In particular, FIGS. 27 and 28 are flow diagrams illustrating operations performed when a link is removed according to certain embodiments of the invention. The operations of FIG. 27 are performed by the access nodes connected by the link (also referred to as the adjoining nodes or the access nodes made adjacent by that link). As part of these operations, a link removal message is transmitted to certain other nodes. The operations of FIG. 28 are performed by an access node responsive to such a link removal message.

FIG. 27 is a flow diagram illustrating the operations performed by the access nodes connected by the removed link according to certain embodiments of the invention. Block 2710 is used to indicate that the following blocks are performed for each service level.

As shown in block 2715, it is determined if the service level topology structure includes path(s) with the removed link. If not, control passes to block 2730. If so, control passes to block 2725. In certain embodiments of the invention, block 2715 is performed by searching the service level topology structure for the presence of the removed link.

In block 2725, the service level topology structure is updated and control passes block 2730. In certain embodiments of the invention, these paths are marked down and any of the channels in these path's path service level channel set(s) that are in common with the link service level channel set of the removed link are marked broken (indicating that the channel(s) cannot be used). In other embodiments of the invention, alternative marking schemes may be used (e.g., only the paths or the channels are altered). While in certain embodiments of the invention channels and/or paths marked broken/down are maintained indefinitely, other embodiments of the invention delete such channels and paths after a period of time if the link is not reestablished. In other embodiments of the invention, these path(s) and channels are simply deleted immediately and added back in (see the link addition section) if they are reestablished.

As shown in block 2730, a link removal message is transmitted to the nodes in the service level topology structure that are not on the link. In certain embodiments of the invention, each link removal message includes the link service level channel set of the removed link, the source node ID, the source adjacent node ID, an update ID, the service level, and the sent-to-set. The source node and the source adjacent node identified are the access nodes connect to the removed link. The sent-to-set includes the nodes in the service level topology structure that the message is sent to (all nodes in the service level topology structure other than the source node and source adjacent node).

FIG. 28 is a flow diagram illustrating the operations performed by an access node responsive to receiving a link removal message according to certain embodiments of the invention. As shown in block 2810, it is determined if the service level topology structure includes path(s) with the removed link. If not, control passes to block 2820. If so, control passes to block 2815. In certain embodiments of the invention, block 2810 is performed by searching the service level topology structure (for the service level identified in the received link removal message) for the link identified in the received link removal message (based on the source node ID and source adjacent node ID contained therein).

In block 2815, the service level topology structure is updated and control passes block 2820. In certain embodiments of the invention, these paths are marked down and any of the channels in these path's (identified in block 2810) path service level channel set(s) that are in common with the link service level channel set of the removed link are marked broken (indicating that the channel(s) cannot be used). In other embodiments of the invention, alternative marking schemes may be used (e.g., only the paths or the channels are altered). While in certain embodiments of the invention channels and/or path(s) marked broken/down are maintained indefinitely, other embodiments of the invention delete such channels and paths after a period of time if the link is not reestablished. In other embodiments of the invention, these path(s) and channels are simply deleted immediately and added back in (see the link addition section) if they are reestablished.

As shown in block 2820, nodes are selected from the service level topology structure that are not identified in the received link removal message and control passes to block 2825. In certain embodiments of the invention, block 2820 is performed by: 1) identifying as "new set" all of the nodes in the service level topology structure that are not in the sent-to-set in the received link removal message (2805); and 2) forming an updated version of the sent-to-set that is the union of the new set and the sent-to set in the link removal message (2805).

In block 2825, a link removal message is transmitted to the selected nodes. As before, this link removal message will include the updated sent-to-set as opposed to the sent-to-set in the received link removal message (2805).

With regard to the removal of a link with live traffic, in certain embodiments of the invention, the source nodes of any allocated path(s) that includes the link execute a redundancy (protection) scheme. These source nodes can learn of the failure any number of ways (e.g., these access nodes may learn responsive to the operations in FIGS. 27 and 20—In particular, each involved access node (the access nodes connected by the removed link and the access nodes that receive the link removal message), determines if they are the source node of any allocated path(s) that includes the link).

Link Addition

Figure 29:
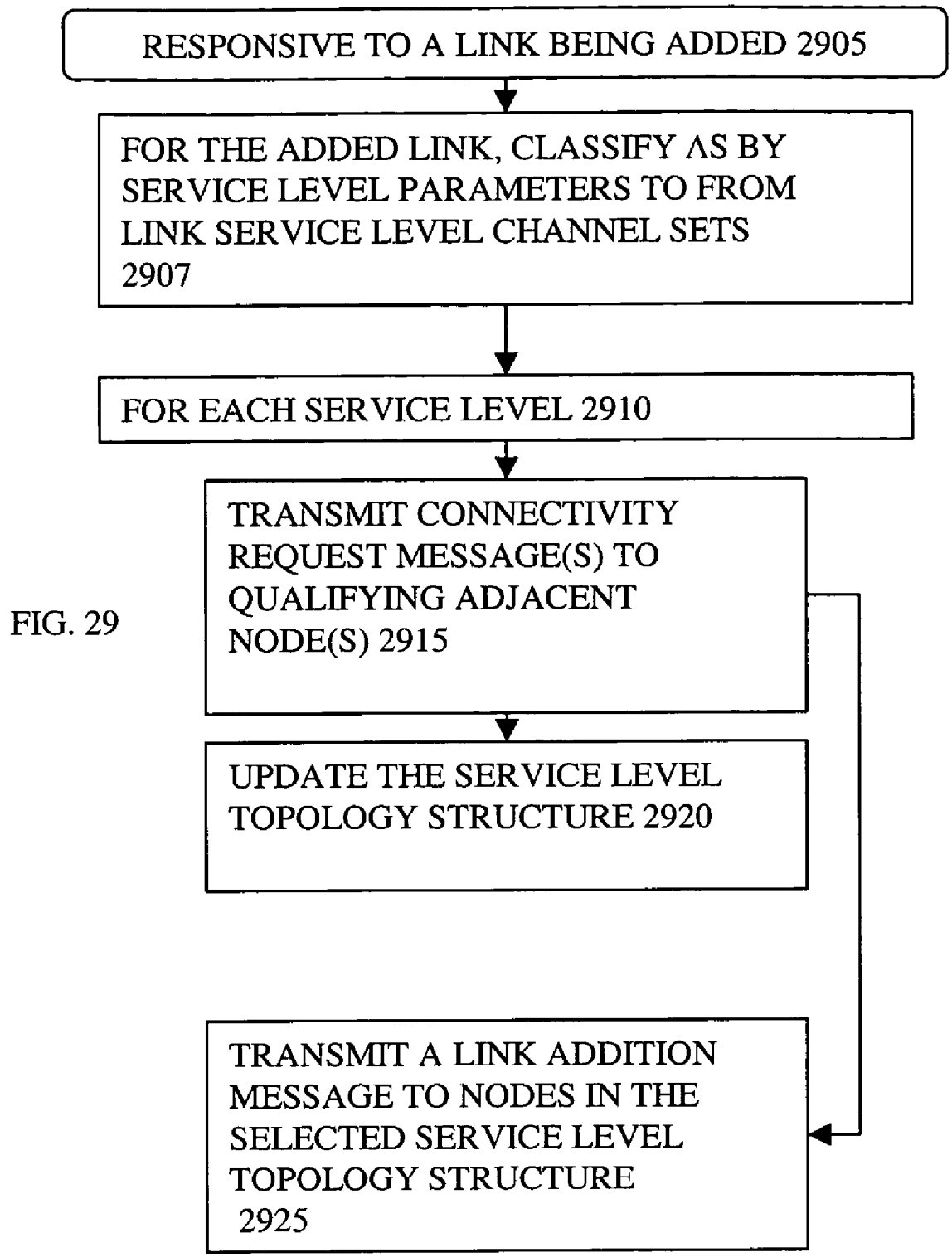
FIG. 29 is a flow diagram illustrating the operations performed by the access nodes connected by the added link according to certain embodiments of the invention.
Figure 30:
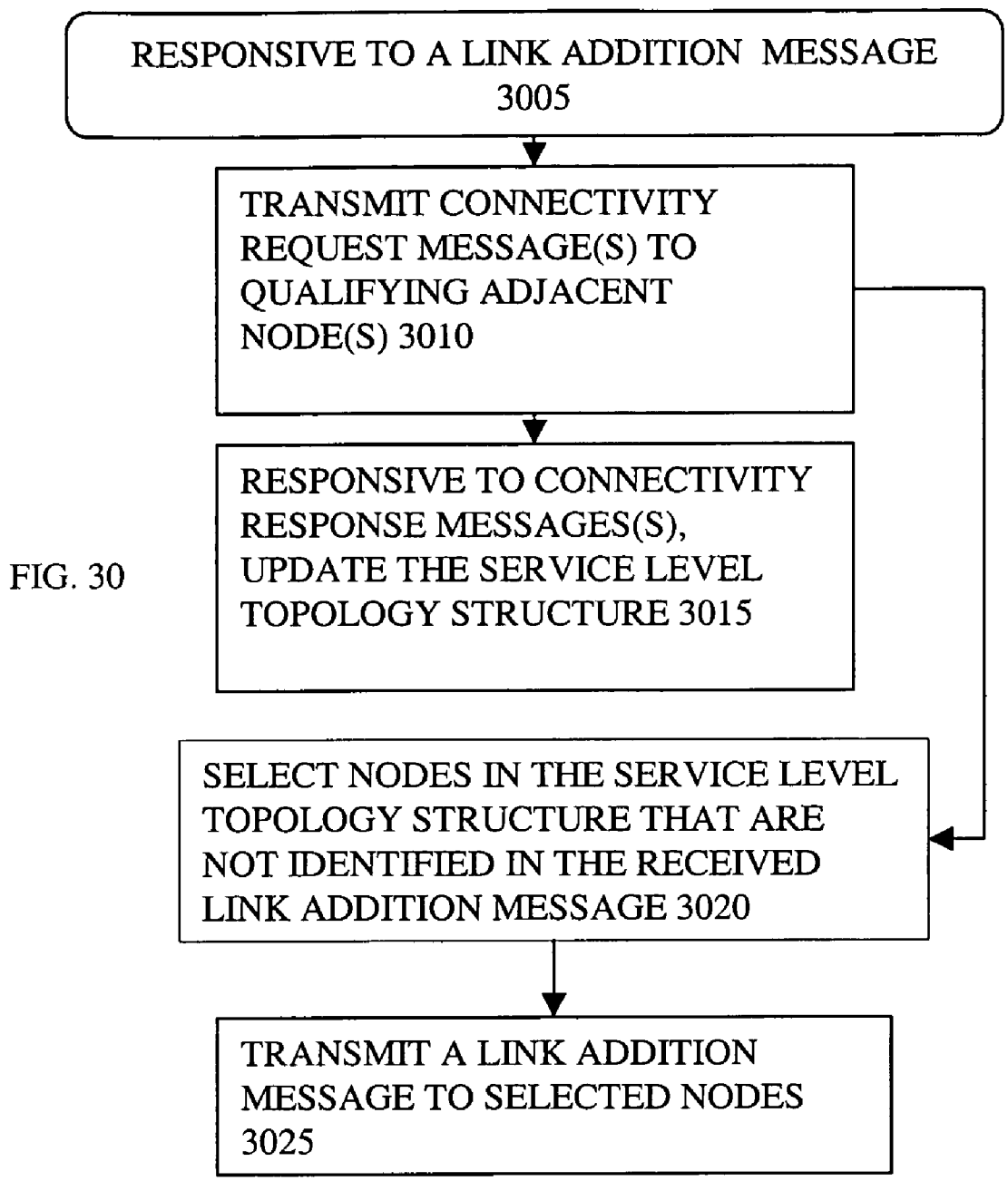
FIG. 30 is a flow diagram illustrating the operations performed by an access node responsive to receiving a link addition message according to certain embodiments of the invention.

When a link is added, the LSD is updated in the access nodes connected to the link (e.g., in certain embodiments of the invention, LMP recognizes the new link). When a link is added between two nodes within the network, a number of channels on that link can be available all at once. While certain embodiments perform the channel addition operations of FIGS. 25 and 26 for each such channel, other embodiment of the invention reduce the number of messages generated by addressing the link as a whole. In particular, FIGS. 29 and 30 are flow diagrams illustrating operations performed when a link is added according to certain embodiments of the invention. The operations of FIG. 29 are performed by the access nodes connected by the link (also referred to as the adjoining nodes or the access nodes made adjacent by that link). As part of these operations, a link addition message is transmitted to certain other nodes. The operations of FIG. 30 are performed by an access node responsive to such a link addition message.

FIG. 29 is a flow diagram illustrating the operations performed by the access nodes connected by the added link according to certain embodiments of the invention. In block 2907, the wavelength(s) on the added link are classified by service level parameters to form link service level channel set(s) and control passes to block 2910. In certain embodiments of the invention, block 2907 is performed in a similar manner to block 1715, with the exception that only the added link is processed.

Block 2910 is used to indicate that the following blocks are performed for each service level to which new channels were added (those service levels for which the link service level channel set of the added link is not null).

As shown, in block 2915, connectivity request message(s) are transmitted to the qualifying adjacent node(s) and control passes to blocks 2920 and 2925. In certain embodiments, block 2915 is performed in a similar manner to block 1810.

In block 2920, the service level topology structure is updated. In certain embodiments of the invention, block 2920 is performed in a similar manner to blocks 1805 and 1815 of FIG. 18 with a variation. With regard to the variation on block 1805, the service level topology structure is populated with the access node made adjacent by the added link (the service level topology structure was already populated with any other adjacent nodes). With regard to the variation on block 1815, since certain data already exists in the service level topology structure, the received data in the connectivity response messages is used to update the existing service level topology structure (add what is not already present, alter channel and/or path statuses, etc.).

In block 2925, a link addition message is transmitted to nodes in the selected service level topology structure. In certain embodiments, each link addition message includes a service level and a sent-to-set (all of the nodes in the service level topology apart from the source node).

FIG. 30 is a flow diagram illustrating the operations performed by an access node responsive to receiving a link addition message according to certain embodiments of the invention.

As shown, in block 3010, connectivity request message(s) are transmitted to the qualifying adjacent node(s) and control passes to blocks 3015 and 3020. In certain embodiments, block 3010 is performed in a similar manner to block 1810.

In block 3015, the service level topology structure is updated responsive to connectivity response messages received. Block 3015 is performed in a similar fashion to block 1815 of FIG. 18 with a variation. With regard to the variation on block 1815, since certain data already exists in the service level topology structure, the received data in the connectivity response messages is used to update the existing service level topology structure (add what is not already present, alter channel and/or path statuses, etc.).

As shown in block 3020, nodes are selected from the service level topology structure that are not identified in the received link addition message and control passes to block 3025. In certain embodiments of the invention, block 3020 is performed by: 1) identifying as "new set" all of the nodes in the service level topology structure that are not in the sent-to-set in the received link addition message (3005); and 2) forming an updated version of the sent-to-set that is the union of the new set and the sent-to set in the link addition message (3005).

In block 3025, a link addition message is transmitted to the selected nodes. As before, this link addition message will include the updated sent-to-set as opposed to the sent-to-set in the received link addition message (3005).

Node Removal

Figure 31:
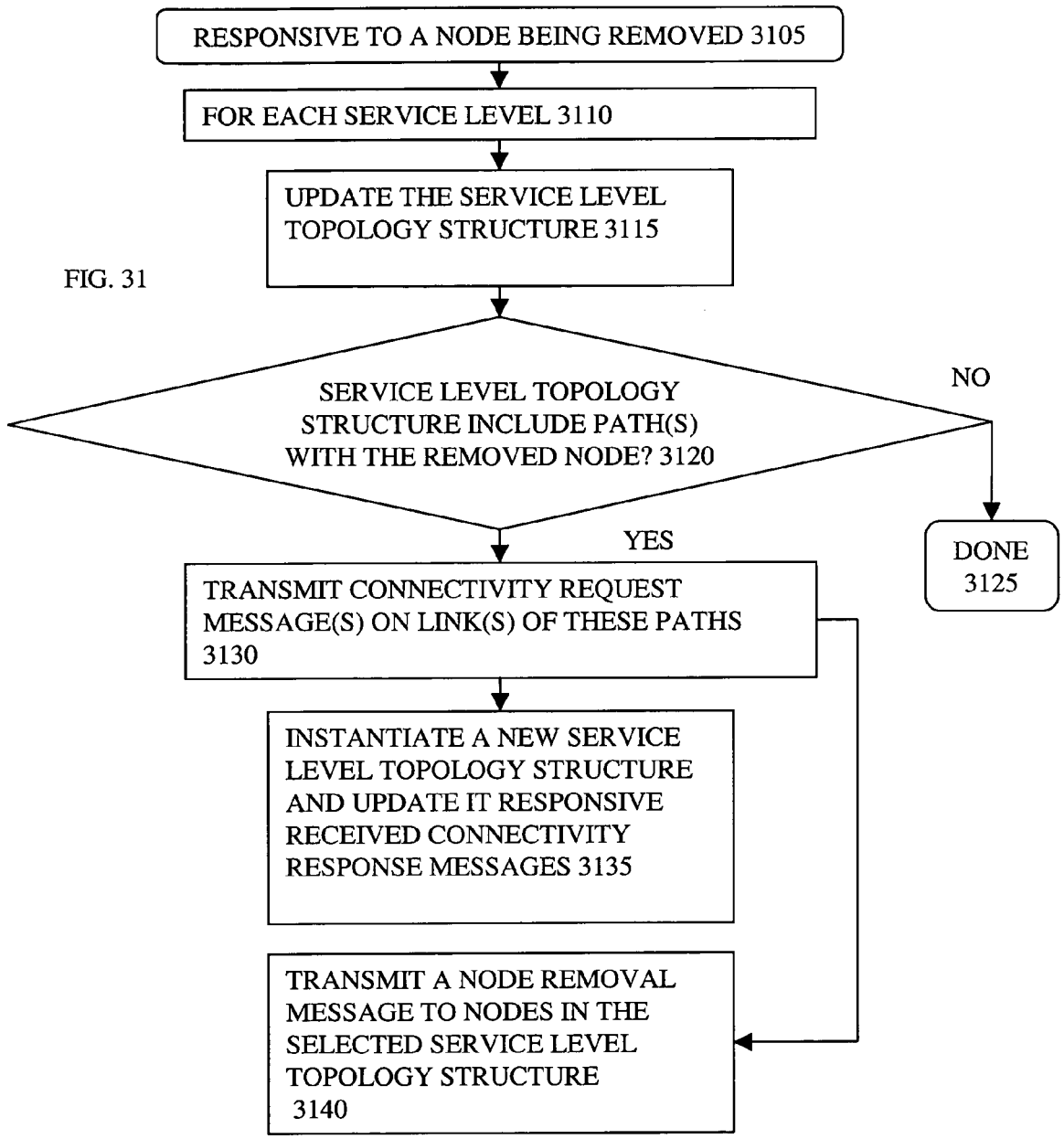
FIG. 31 is a flow diagram illustrating the operations performed by the access node(s) adjacent to a removed node according to certain embodiments of the invention.
Figure 32:
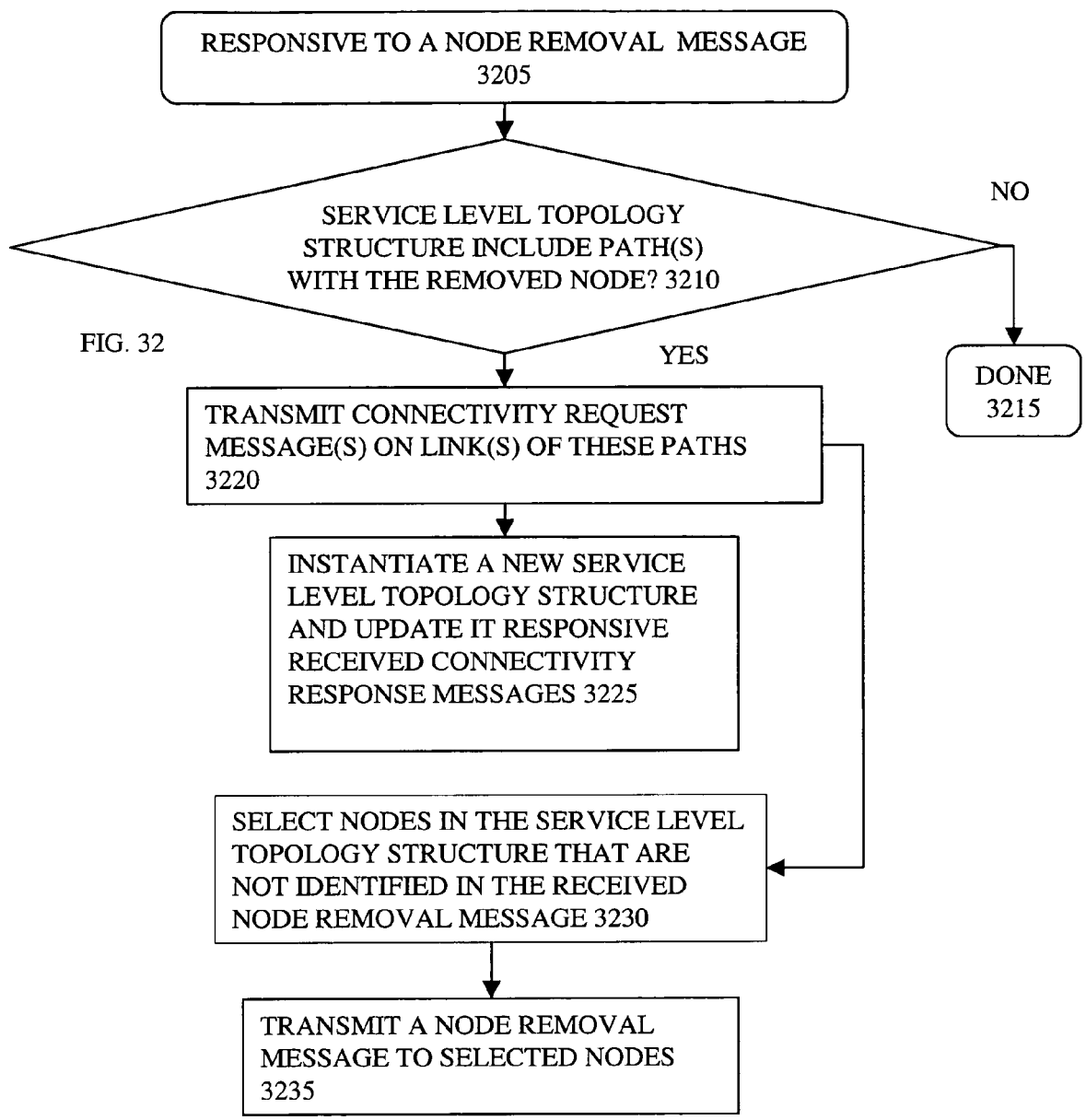
FIG. 32 is a flow diagram illustrating the operations performed by an access node responsive to receiving a node removal message according to certain embodiments of the invention.

When a node is removed, the LSD is updated in the adjacent access node(s) (e.g., in certain embodiments of the invention, LMP recognizes the removal of the node). When a node is removed, the channels on its link(s) are no longer available all at once. In certain embodiments of the invention, the link removal operations of FIGS. 27 and 28 are performed for each such link; and, in certain embodiments of the invention, added to each of FIGS. 27 and 28 are the operations of: if all the paths to a particular destination node have a path status of down, then that node and all paths that include that node (as a destination or intermediate node) are deleted. While certain embodiments perform the link removal operations of FIGS. 27 and 28 for each such link or the channel removal operations of FIGS. 25 and 26 for each channel on each such link, other embodiment of the invention reduce the number of messages generated by addressing the node as a whole. In particular, FIGS. 31 and 32 are flow diagrams illustrating operations performed when a node is removed according to certain embodiments of the invention. The operations of FIG. 31 are performed by the adjacent access node(s). As part of these operations, a node removal message is transmitted to certain other nodes. The operations of FIG. 32 are performed by an access node responsive to such a node removal message.

FIG. 31 is a flow diagram illustrating the operations performed by the access node(s) adjacent a removed node according to certain embodiments of the invention. Block 3110 is used to indicate that the following blocks are performed for each service level.

In block 3115, the service level topology structure is updated and control passes to block 3120. In certain embodiments of the invention, block 3115 is performed by removing from the service level topology structure the branch, if one exists, that has as the first hop the removed node.

As shown in block 3120, it is determined if the service level topology structure includes path(s) with the removed node. If not, control passes to block 3125 where the flow diagram ends. If so, control passes to block 3130. In certain embodiments of the invention, block 3120 is performed by searching the service level topology structure for the presence of the removed node.

As shown, in block 3130, connectivity request message(s) are transmitted on link(s) of these paths and control passes to blocks 3135 and 3140. In particular, the access node transmits a connectivity request message on each of its links that are part of these paths.

In block 3135, a new service level topology structure is instantiated and updated responsive to connectivity response messages received. In certain embodiments, block 3125 is performed in a similar manner as blocks 1805 and 1815 with a variation. In particular, the new service level topology structure preserves the channel states from the current service level topology structure (which is kept until the new service level topology structure is completed).

In block 3140, a node removal message is transmitted to nodes in the selected service level topology structure. In certain embodiments of the invention which instantiate a new service level topology structure as in block 3125, the service level topology structure used for block 3130 is the current service level topology structure. In certain embodiments, each link removal message includes a removed node ID, a service level, and a sent-to-set (all of the nodes in the service level topology apart from the removed node and the nodes adjacent the removed node).

FIG. 32 is a flow diagram illustrating the operations performed by an access node responsive to receiving a node removal message according to certain embodiments of the invention.

In block 3210, it is determined if the service level topology structure includes path(s) with the removed node. If not, control passes to block 3215 where the flow diagram ends. If so, control passes to block 3220. In certain embodiments of the invention, block 3210 is performed by searching the service level topology structure for the presence of the removed node.

As shown, in block 3220, connectivity request message(s) are transmitted on link(s) of these paths and control passes to blocks 3225 and 3230. In particular, the access node transmits a connectivity request message on each of its links that are part of these paths.

In block 3225, a new service level topology structure is instantiated and updated responsive to connectivity response messages received. In certain embodiments, block 3225 is performed in a similar manner as blocks 1805 and 1815 with a variation. In particular, the new service level topology structure preserves the channel states from the current service level topology structure (which is kept until the new service level topology structure is completed).

As shown in block 3230, nodes are selected from the service level topology structure that are not identified in the received node removal message and control passes to block 3235. In certain embodiments of the invention, block 3230 is performed by: 1) identifying as "new set" all of the nodes in the current service level topology structure that are not in the sent-to-set in the received node removal message (2405); and 2) forming an updated version of the sent-to-set that is the union of the new set and the sent-to set in the node removal message (2405).

In block 3235, a node removal message is transmitted to the selected nodes. As before, this node removal message will include the updated sent-to-set as opposed to the sent-to-set in the received node removal message (3205).

While in certain embodiments of the invention, nodes and their paths are deleted immediately and added back in (see the node addition section) if they are reestablished, alternative embodiments provide other mechanisms (e.g., marking down and either maintaining indefinitely or deleting after a period of time if the node is not reestablished, etc.).

With regard to the removal of a node with live traffic, in certain embodiments of the invention, the source nodes of any allocated path(s) that includes the removed node execute a redundancy (protection) scheme. These source nodes can learn of the failure any number of ways (e.g., these access nodes may learn responsive to the operations in FIGS. 31 and 32—In particular, each involved access node (the access nodes adjacent the removed node and the access nodes that receive the node removal message), determines if they are the source node of any allocated path(s) that includes the removed node).

Node Addition

When a node is added, the added node performs the flows in FIGS. 17 and 18. In addition, the LSD is updated in the adjacent access node(s) (e.g., in certain embodiments of the invention, LMP recognizes the removal of the node). Additionally, for each of the adjacent nodes, there has effectively been one or more links added to the new node. While certain embodiments perform the link addition operations of FIGS. 29 and 30 for each such link or the channel removal operations of FIGS. 25 and 26 for each channel on each such link, other embodiment of the invention reduce the number of messages generated by addressing the node as a whole. In particular, each of the adjacent node(s) performs the flow of FIG. 29, with the exception that block 2925 is replaced with a different operation. In particular, instead of block 2925, a node addition message is transmitted to nodes in the selected service level topology structure. In certain embodiments, each node addition message includes an added node ID, a service level and a sent-to-set. The message is sent to, and the sent-to-set includes, any nodes in the service level topology apart from the source node.

FIG. 33 is a flow diagram illustrating the operations performed by an access node responsive to receiving a node addition message according to certain embodiments of the invention.

As shown, in block 3310, connectivity request message(s) are transmitted to the qualifying adjacent node(s) and control passes to blocks 3315 and 3320. In certain embodiments, block 3310 is performed in a similar manner to block 1810.

In block 3315, a new service level topology structure is instantiated and updated responsive to connectivity response messages received. In certain embodiments, block 3315 is performed in a similar manner as blocks 1805 and 1815 with a variation. In particular, the new service level topology structure preserves the channel states from the current service level topology structure (which is kept until the new service level topology structure is completed).

As shown in block 3320, nodes are selected from the service level topology structure that are not identified in the received node addition message and control passes to block 3325. In certain embodiments of the invention, block 3320 is performed by: 1) identifying as "new set" all of the nodes in the current service level topology structure that are not in the sent-to-set in the received node addition message (2505); and 2) forming an updated version of the sent-to-set that is the union of the new set and the sent-to set in the node addition message (2505).

In block 3325, a node addition message is transmitted to the selected nodes. As before, this node addition message will include the updated sent-to-set as opposed to the sent-to-set in the received node addition message (2505).

Service Level Parameter Changes

In certain embodiments of the invention, the service provider may update the service level parameters and push a fresh copy on each node. If and when a new QoS criteria is added, certain embodiments of the invention perform the following:

1. The contents of the service level parameters database is copied and kept in the memory.
2. The service level parameters database is populated with new data.
3. Blocks 1715 and 1720 are performed to create new service level topology structures, keeping the existing service level topology structure for each service level.
4. The new service level topology structures are used for new connections.
5. The previous service levels are mapped to the current service levels by comparing the parameters.
6. The connection status from the old service level topologies are mapped to the new service level topology structures to relevant service levels.
7. The old service level topologies are deleted.

Similarly, if an when an existing service level parameter(s) is changed, certain embodiments of the invention perform the following:

1. The contents of the particular level in service level parameters database is copied and kept in the memory.
2. The service level parameters database is populated with new data.
3. New service level topology structures are built for the updated levels keeping the old service level topology structures.
4. The new service level topology structures are used for new connections.
5. The previous service levels are mapped to the current service levels by comparing the parameters.
6. The connection status from the old service level topologies are mapped to the new service level topology structures to relevant service levels.
7. The old service level topologies are deleted.

Of course, alternative embodiments may handle such changes in other ways.

Exemplary Load Balancing

Where there are multiple shortest paths available, the issue of load balancing comes into play. For instance, certain embodiments of the invention implement load balancing to allow the service provider some options. Specifically, when a demand is received, there can either be: 1) a set of multiple shortest paths; or 2) a single shortest path. Where there is a set of multiple shortest paths, wavelengths are selected from each member of the set in round robin fashion. However, when there is a single shortest path, either one of two schemes is used. In the first scheme, a threshold is specified (e.g., specified by the service provider) for any link in the network. If the number of channels for a particular service level crosses the threshold on that link, then that link becomes unavailable for any future demand. This allows the service provider to tailor the traffic flow on the network. In the second scheme, a distribution ratio system is used. Specifically, the ratio is the number of new paths "allocated to non-shortest path" to "the shortest path."

Exemplary Contention Resolution

Since requests for paths by different access nodes may overlap, there is a need for contention resolution. Certain embodiments of the invention resolve contention issues by giving priority to the source with the higher IP number. However, this brings in a special case where a source node may be receiving demand request at a higher frequency than the other source node. The other source node, thus, potentially may starve.

Other embodiments of the invention use one of the following contention resolution schemes to overcome this deficiency.

1. One such scheme is to pre-allocate a lightpath for the next demand in advance. This result in each access node preallocating lightpaths to each accessible node at each service level. As such, this scheme can put a relatively high amount of strain on network resources.
2. Another such scheme is referred to herein as highest service level preallocation. Instead of preallocating lightpaths to each accessible node for each service level, this is done only for the highest service level. In the case of an unfavorable settlement of contention during demand allocation, the demand is allocated on the preallocated lightpath at the highest service level. As such, this scheme puts a relatively lower amount of strain on network resources, but can cause the highest service level lightpaths to get used up the fastest.
3. Yet another such scheme is referred to herein as default service level preallocation. In particular, for each source to destination pair, an indication of the default service level is maintained (e.g., the most common service level for historically received demands). Instead of preallocating lightpaths to each accessible node for each service level or preallocating lightpaths to each accessible node at the highest service level, preallocation is done only for the default service level for each source to destination pair. In the case of an unfavorable settlement of contention during demand allocation, the demand is allocated on the preallocated lightpath at the default service level. As such, this scheme puts a relatively lower amount of strain on network resources than scheme 1 and attempts to avoid using up the highest service level the fastest by predicting the most common service level.

Aggregating

While embodiments have been described in which separate messages are transmitted, alternative embodiments aggregate different ones of such messages. For instance, certain embodiments aggregate messages for different service level topologies during startup.

Alternative Embodiments

While various embodiments of the invention has been described, alternative embodiments of the invention can operate differently. For instance, while the flow diagrams in the figures show a particular order of operations performed by certain embodiments of the invention, it should be understood that such order is exemplary (e.g., alternative embodiments may perform the operations in a different order, combine certain operations, overlap certain operations, etc.) In addition, while certain embodiments have been described that operate to reduce the number of communications between nodes by transmitting messages to only selected nodes (e.g., blocks 2050, 2120, 2230/2235, 2325, 2430/2435, 2525, and 2630/2635), alternative embodiments may be implemented to transmit such messages to more, less, or different nodes using different schemes (e.g., certain alternative embodiments broadcast each such message to every node). As another example, while certain embodiments of the invention have been described with respect to distributed search techniques for building/maintaining network topology databases and with respect to a source based scheme, alternative embodiments could be implemented different ways or combinations of ways (e.g., centralized network topology database building/maintaining, centralized provisioning, hybrids, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. An apparatus comprising:
    an access node, to be coupled in a wavelength division multiplexing optical network, including,
        a database organized by only the destination nodes of the available paths reachable from the access node to others of said access nodes, each such destination node having associated to it those of the available paths that lead to that destination node, each such available path having associated to it a path channel set that includes one or more wavelengths common to all of the interconnecting links of that path,
        a path selection module to select from said database ones of said available paths and unallocated wavelengths thereon,
        a protection module coupled to said path selection module to, responsive to failures affecting optical circuits, cause the provisioning of new optical circuits in real time and move the traffic to them,
        wherein in response to a failure of an optical circuit that was originated by the access node, the path selection module selects an alternative path and a wavelength of the selected alternative path from the database, wherein the protection module configures the wavelength of the alternative path with a destination node and zero and more intermediate nodes of the failed optical circuit and moves network traffic from the failed optical circuit onto the selected and configured wavelength of the alternative path,
        a start up module to generate and transmit to adjacent nodes connectivity request messages to determine possible paths having said access node as a source node and meeting a set of zero or more connectivity constraints, and
        a connectivity request module, responsive to each received connectivity request messages, to determine any adjacent nodes to which the possible path that the connectivity request message has already collected can be extended to form additional possible paths having the originating access node as the source node and meeting the set of connectivity constraints, to transmit a message carrying that determination, and to propagate said connecting request message to any adjacent nodes that may be able to determine additional possible paths having the originating access node as the source node and meeting the set of connectivity constraints,
        wherein each of the messages carrying a determination is transmitted back to the originating access node of the connectivity request message responsive to which that message was generated, and wherein each of said start up modules is also to build said database in its access node responsive to receiving the messages carrying determinations of additional possible paths having the access node as the source node and meeting the set of connectivity constraints.

2. The apparatus of claim 1, wherein each of said access node also includes an optical crossconnect.

3. The apparatus of claim 1, wherein each of the new optical circuits is a lightpath in either direction between the ends nodes of the failed optical circuit it replaced.

4. The apparatus of claim 1, wherein said protection module to cause the provisioning of new optical circuits in real time for those failed optical circuits that said access node was the originator.

5. The apparatus of claim 1, wherein said path selection module includes a disjoint path module to select, based at least in part on an input path, a disjoint path from the available paths associated in said database with the same destination nodes as said input path and select an unallocated wavelengths thereon.

6. The apparatus of claim 5, wherein said disjoint path module is at least to select one or more of fully node disjoint type paths and maximally node disjoint type paths.

7. The apparatus of claim 5, wherein said disjoint path module is at least to select one or more of fully link disjoint type paths and maximally link disjoint type paths.

8. The apparatus of claim 5, wherein said disjoint path module is at least to determine the intersection of the intermediate nodes of said input path and the intermediate nodes of a candidate path in said database that has the same source and destination nodes as said input path.

9. The apparatus of claim 5, said disjoint path module is at least to determine the intersection of the interconnecting links of said input path and the interconnecting links of a candidate path in said database that has the same source and destination nodes as said input path.

10. The apparatus of claim 1, wherein each of said available paths in each of said databases is represented by the series of two or more nodes and the interconnecting links over which the paths travels.

11. The apparatus of claim 1, wherein the path selection module further comprises:
    a regular path module to select a path from said available paths in said database associated with an input destination node and select an unallocated wavelengths thereon.

12. The apparatus of claim 1, wherein said access node also includes an allocate module, coupled to said path selection module, to allocate in real time lightpaths having that access node as a source node.

13. The apparatus of claim 1, wherein said access node including modules to participate in a distributed search based scheme to build and maintain said database.

14. The apparatus of claim 1, wherein said access node further comprises:
    for each link connected to the access node, a link channel set representing at least certain wavelengths on that link available for establishing a lightpath, wherein a lightpath is a wavelength and a path, wherein the path of a given lightpath is a series of two or more nodes and links interconnecting them through which traffic is carried by the wavelength of that lightpath, wherein said series of nodes respectively starts and ends with a source node and a destination node, wherein the available paths in said database are the lightpaths from the access node to others of said access nodes using the wavelengths in said link channel sets.

15. A method for a wavelength division multiplexing optical network employing an optical reroutable redundancy scheme and having optical crossconnects, the method comprising:
    maintaining in a database of an access node coupled to the wavelength division multiplexing optical network, organized by only the destination nodes of the available paths reachable from the access node to others of said access nodes, each such destination node having associated to it those of the available paths that lead to that destination node, each such available path having associated to it a path channel set that includes one or more wavelengths common to all of the interconnecting links of that path;

selecting via a path selection module of the access node from said database ones of said available paths and unallocated wavelengths thereon;

causing via a protection module coupled to said path selection module, responsive to failures affecting optical circuits, the provisioning of new optical circuits in real time and move the traffic to them, wherein in response to a failure of an optical circuit that was originated by the access node, the path selection module selects an alternative path and a wavelength of the selected alternative path from the database, wherein the protection module configures the wavelength of the alternative path with a destination node and zero and more intermediate nodes of the failed optical circuit and moves network traffic from the failed optical circuit onto the selected and configured wavelength of the alternative path, generating and transmitting via a start up module to adjacent nodes connectivity request messages to determine possible paths having said access node as a source node and meeting a set of zero or more connectivity constraints, and determining via a connectivity request module, responsive to each received connectivity request messages, any adjacent nodes to which the possible path that the connectivity request message has already collected can be extended to form additional possible paths having the originating access node as the source node and meeting the set of connectivity constraints, to transmit a message carrying that determination, and to propagate said connectivity request message to any adjacent nodes that may be able to determine additional possible paths having the originating access node as the source node and meeting the set of connectivity constraints, wherein each of the messages carrying a determination is transmitted back to the originating access node of the connectivity request message responsive to which that message was generated, and wherein each of said start up modules is also to build said database in its access node responsive to receiving the messages carrying determinations of additional possible paths having the access node as the source node and meeting the set of connectivity constraints.

* * * * *